(12) United States Patent
Nishi

(10) Patent No.: US 7,688,305 B2
(45) Date of Patent: Mar. 30, 2010

(54) INFORMATION INPUTTING TOOL, STORAGE DEVICE, INFORMATION INPUTTING DEVICE, AND INFORMATION PROCESSING EQUIPMENT

(76) Inventor: Kenji Nishi, Gandstage-Isogo 407, 3-1, Shiomidai 1-chome, Isogo-ku, Yokohama-shi, Kanagawa 235-0022 (JP)

( * ) Notice: Subject to any disclaimer, the term of this patent is extended or adjusted under 35 U.S.C. 154(b) by 958 days.

(21) Appl. No.: 10/580,590

(22) PCT Filed: Oct. 20, 2004

(86) PCT No.: PCT/JP2004/015474

§ 371 (c)(1),
(2), (4) Date: May 25, 2006

(87) PCT Pub. No.: WO2005/052778

PCT Pub. Date: Jun. 9, 2005

(65) Prior Publication Data

US 2007/0103430 A1    May 10, 2007

(30) Foreign Application Priority Data

Nov. 25, 2003 (JP) ............................ 2003-394444
Jun. 7, 2004 (JP) ............................ 2004-169074

(51) Int. Cl.
*H03K 17/94* (2006.01)
*G09G 5/00* (2006.01)

(52) U.S. Cl. ...................... 345/156; 345/168; 345/170; 341/20; 341/21; 341/22; 341/34

(58) Field of Classification Search ......... 345/156–184; 341/20–35
See application file for complete search history.

(56) References Cited

U.S. PATENT DOCUMENTS

| 5,581,484 | A | * | 12/1996 | Prince | ................... 341/22 |
| 5,767,842 | A | | 6/1998 | Korth | |
| 5,952,996 | A | | 9/1999 | Kim et al. | |
| 6,236,037 | B1 | * | 5/2001 | Asada et al. | ............. 250/221 |
| 6,614,422 | B1 | | 9/2003 | Rafii et al. | |
| 2004/0012557 | A1 | * | 1/2004 | Daniel | ................... 345/156 |

FOREIGN PATENT DOCUMENTS

JP    58-5145    1/1983
JP    63-24645    2/1988

(Continued)

OTHER PUBLICATIONS

Notification Concerning Transmittal of International Preliminary Report on Patentability, Chapter I of the Patent Cooperation Treaty for PCT/JP2004/015474, 8 sheets.

*Primary Examiner*—David L Lewis
(74) *Attorney, Agent, or Firm*—Frishauf, Holtz, Goodman & Chick, P.C.

(57) ABSTRACT

The present invention provides, among other things, an information inputting tool that can be made space-saving and places small constraint on key touch actions. For that purpose, an information inputting tool of the present invention is provided with a reflection portion (11B) provided with a single or a plurality of reflection members (11C) having retroreflectivity, with an attaching gadget (11c, etc.) that attaches said reflection portion to a finger of an operator, and with a change mechanism (11S, $11a_1$, etc.) that changes the reflectance distribution of said reflection portion in accordance with a finger pressure applied to the finger end of said finger.

29 Claims, 35 Drawing Sheets

FOREIGN PATENT DOCUMENTS

| | | |
|---|---|---|
| JP | 6-083512 | 3/1994 |
| JP | 7-191791 | 7/1995 |
| JP | 7-325655 | 12/1995 |
| JP | 9-034634 | 2/1997 |
| JP | 11-053153 | 2/1999 |
| JP | 11-312033 | 11/1999 |

* cited by examiner (a)

(b)

(a)

(b)

At the time of storage

At the time of attaching

At the time of detaching (a)

(b)

(b')

(a)

(b)

(a')

(b')

(a)

(b)

(a)

(b)

(a')

(b')

(a)

(b)

ably to input information.
INFORMATION INPUTTING TOOL, STORAGE DEVICE, INFORMATION INPUTTING DEVICE, AND INFORMATION PROCESSING EQUIPMENT This application is a U.S. National Phase Application under 35 USC 371 of International Application PCT/JP2004/015474 filed Oct. 20, 2004.

TECHNICAL FIELD

The present invention relates to an information inputting tool that is attached to an operator's hands, a storage device for the information inputting tool, an information inputting device that takes, from the operator's finger region, the finger actions of the operator, and information processing equipment.

Information inputting systems called, e.g., virtual keyboard, have been proposed. These systems are for taking information from an operator who is performing key touch actions in the same manner as in operating an existing keyboard (i.e., actions performed when operating a keyboard device) or is performing pointing actions (i.e., actions performed when operating a pointing device, e.g., a mouse).

As the recognition methods for finger actions during key touch actions in these information inputting systems, there are the following four kinds of recognition methods.

(1) Image Recognition (e.g., Patent Document 1 and Non-patent Document 1)

In this method, an operator performs key touch actions on a space (virtual keyboard) having the same size as an existing keyboard; the hand images during the key actions are videotaped; and with the captured video data being analyzed and with the hands' contours being three-dimensionally recognized, it is recognized whether there is a key touch with respect to each key on the virtual keyboard.

(2) Sound Wave or Light Wave Illumination (e.g., Patent Document 2)

In this method, an operator performs key touch actions on a space (virtual keyboard) having the same size as an existing keyboard; each finger is illuminated, from a plurality of positions, with a sound wave or a light wave; and with, based on the principle of Doppler effect, the movement velocity in each direction of each finger being calculated from the sound wave or light wave returning from each finger, it is recognized whether there is a key touch with respect to each key on the virtual keyboard.

(3) Use of a Touch Panel

In this method, an operator performs key touch actions (using fingertips if necessary) on a special flat panel (a panel provided with electric capacitance detection devices or magnetic field variation detection devices), and it is detected whether there is a key touch with respect to each key on the special flat panel.

(4) Use of Gloves (e.g., Patent Document 1)

In this method, gloves provided with a plurality of electronics parts, such as light emitting elements, acceleration sensors, and finger pressure sensors are attached an operator's hands; the operator performs key touch actions; and the key touch actions are detected based on the outputs from the sensors during the key touch actions.

Patent Document 1: Japanese Unexamined Patent Publication Hei 7-191791

Patent Document 2: U.S. Pat. No. 6,614,422

Non-patent Document 1: Nozomu MATSUI and Yoshikazu YAMAMOTO, Virtual Keyboard: Realization of Robust Real-Time Fingertip Detection from Video-Image, The third programming and application system workshop SPA2000, On-line Proceedings, Session 8, Database and Application, Japan Society for Software Science and Technology (May 21, 2000)

DISCLOSURE OF THE INVENTION

Problems to be Solved by the Invention

However, each technique of the recognition methods (1)-(4) has its peculiar problem or problems. Thus, techniques combining some of these recognition methods are also considered at laboratory level, but these techniques are not yet in practical use. Each of the problems will be described below.

First, the recognition methods (1)-(3) are inadequate in that they cannot be made space-saving. More specifically, while they do not require a keyboard, they require the same space as that necessary to position a keyboard.

Furthermore, with respect to the method (1), there is another problem that its response time is extremely long. Response time required for the method (1) is 150 ms or less (because the key touch frequency of a person having a high speed key touch ability is about 10 Hz, and the video data capturing frequency amounts to about from 20 to 60 Hz). The method (1), however, requires complicated three-dimensional image analyses for precisely distinguishing, based on the acquired image data, significant data portions from noise portions, which makes it difficult to achieve the required response time. Further, even if an extremely long response time was allowed, this principle, i.e., a principle in which three-dimensional information is extracted (inferred) from a two-dimensional image, has also a problem of low recognition accuracy.

On the other hand, the method (4) is problematic in that the key touch actions are heavily constrained. While the operator's hands are required to be provided with hard wiring in order to supply electric power to the electronics parts provided to the gloves, the mechanisms around the gloves become complicated, and constraint on the key touch actions inevitably occur. Further, when the number of the electronics parts is increased in order to improve the detection accuracy, the constraint becomes even larger. Still further, with the hard wiring being omitted, a battery may be provided; however, in this case, the gloves' weight becomes larger, and constraints due to the weight becomes larger. In particular, since acceleration sensors and finger pressure sensors are complicated in structure and are also heavy in weight, the problem becomes notable when these sensors are used as the electronics parts.

An object of the present invention is to provide an information inputting tool that can be made space-saving and places small constraint on key touch actions.

Another object of the present invention is to provide a storage device suitable for an information inputting tool of the present invention.

Another object of the present invention is to provide an information inputting device that properly utilizes an information inputting tool of the present invention.

Another object of the present invention is to provide an information processing equipment suitable for an information inputting device of the present invention.

Another object of the present invention is to provide an information processing equipment that can save the space required to input information.

Another object of the present invention is to provide a storage device that facilitates the handling of the information inputting tool.

Means for Solving Problem

An information inputting tool of the present invention is characterized in that it is provided with a reflection portion provided with a single or a plurality of reflection members having retroreflectivity, with an attaching gadget that attaches said reflection portion to a finger of an operator, and with a change mechanism that changes the reflectance distribution of said reflection portion in accordance with a finger pressure applied to the finger end of said finger.

Preferably, said change mechanism shields/releases at least a portion of said reflection portion.

Further, preferably, a plurality of reflection members having retroreflectivity are provided side by side on said reflection portion, and said change mechanism shields/releases at least one reflection member of said plurality of reflection members having retroreflectivity.

Further, preferably, a plurality of, three or more reflection members having retroreflectivity are provided side by side on said reflection portion, and said change mechanism shields/releases at least one reflection member thereof having retroreflectivity that is located between two or more reflection members having retroreflectivity of said plurality of reflection members.

Further, preferably, at least one of the reflection surfaces constituting said reflection member is a reflection type diffractive optical surface that transforms, relative to the wavefront shape of the incident light, the wavefront shape of the reflection light.

Further, preferably, said reflection member also functions as an identification mark that indicates the kind of said finger.

Further, preferably, said reflection portion is provided with at least two kinds of corner-shaped reflection surfaces whose postures are different from each other.

Further, preferably, said reflection portion is provided with said at least two kinds of corner-shaped reflection surfaces having orientation angle difference $\theta$ that satisfies $0°<90°$.

Further, preferably, said attaching gadget has a stopper mechanism that fixes said reflection portion to said finger of the operator and a release mechanism that releases said reflection portion from said finger of the operator.

Further, a storage device of the present invention is characterized in that it is provided with a storage pit that stores an information inputting tool of the present invention, a means for driving said stopper mechanism of said information inputting tool, and a means for driving said release mechanism of said information inputting tool.

Further, a storage device of the present invention is characterized in that it is provided with storage pits that individually store a plurality of information inputting tools of the present invention that are individually attached to each of a plurality of fingers of an operator and with a detection means that individually detects whether each of said plurality of information inputting tools is stored.

Preferably, said storage device is provided to a face following type display.

Further, an information inputting device of the present invention is characterized in that it is provided with an illumination optical system that illuminates with an illumination light the hand region of an operator to which an information inputting tool of the present invention is attached, with an optical system that leads from said hand region of the operator the reflection light of said illumination light and forms an image of said reflection portion in a predetermined position, and with a two-dimensional light receiving device that images said image in the predetermined position.

An information processing equipment of the present invention is characterized in that it is provided with a control portion that is applied to an information inputting device of the present invention and that recognizes, based on the position and the luminance distribution, of said image of said reflection portion, on said image acquired by said two-dimensional light receiving device, the finger end actions of said operator with the coordinates on said two-dimensional light receiving device.

Preferably, said control portion recognizes, along with said finger end actions, the kind of said finger.

Further, preferably, said control portion, at least, performs said recognition of said finger end actions by, after recognizing the position of said finger end, recognizing whether there is said finger pressure.

Further, preferably, said control portion displays on an outside or inside display a keyboard image indicating a key top layout of a keyboard device and, at the same time, while coordinate-transforming the position of said finger end on said two-dimensional light receiving device into the coordinates on said display, displays in real time on said display a finger end image indicating said finger end actions; adopts a coordinate transformation that transforms the position of said finger end into reference coordinates on said display in a time period that ends when a predetermined signal is given from said operator; and after said predetermined signal is given from said operator, adopts a coordinate transformation that transforms the position of said finger end at the timing when said signal is given into said reference coordinates on said display.

Further, preferably, said control portion accepts, via said information inputting device, said predetermined signal from said operator.

Further, preferably, said control portion displays a key, among said keyboard image, at least the position of which overlaps with said finger end image with a color different from that of the other keys.

Further, preferably, said control portion changes the display color of said key at a timing when a finger pressure is applied to said finger end.

Further, preferably, in the display area displayed by said display is secured, in addition to a special field on which said keyboard image is to be displayed, a general field on which an image and/or a letter inputted from the outside are to be displayed, and said control portion displays, when said finger end image is displayed on said general field, a pointer image of a pointing device at the position of the finger end, in addition to or instead of the finger end image.

Further, preferably, said control portion, when it recognizes said finger end actions of a plurality of finger ends, adopts for the coordinate transformation of the position of each finger end a coordinate transformation that transforms the position of a specified finger end into reference coordinates on said display in a time period that ends when a predetermined signal is given from said operator and after said predetermined signal is given from said operator, adopts for the coordinate transformation of the position of each finger end a coordinate transformation by which the position of said specified finger end at the timing when said signal is given is transformed into said reference coordinates on said display.

Further, preferably, said control portion, when it recognizes said finger end actions of the right and left hands, performs said coordinate transformations independently with respect to the right and left hands.

Further, an information processing equipment of the present invention is an information processing equipment that is provided with a control portion that is applied to an information inputting device that acquires information of the right and left finger actions of an operator and processes the information, and said control portion displays on an outside or inside display a keyboard image indicating a key top layout of a keyboard device and, at the same time, while coordinate-transforming the positions of each finger end on the right and left hand regions of said operator into the coordinates on said display, displays in real time on said display finger end images indicating said finger end actions; adopts, in a time period that ends when a predetermined signal is given from said operator, a coordinate transformation that transforms the position of a specified left finger end into left reference coordinates on said display for the coordinate transformation of the position of each of said left finger ends and adopts, at the same time, a coordinate transformation that transforms the position of a specified right finger end into right reference coordinates on said display for the coordinate transformation of the position of each of said right finger ends; and, after said predetermined signal is given from said operator, adopts for the coordinate transformation of the position of each of said left finger ends a coordinate transformation by which the position of said specified left finger end at the timing when said signal is given is transformed into said left reference coordinates on said display and adopts, at the same time, for the coordinate transformation of the position of each of said right finger ends a coordinate transformation by which the position of said specified right finger end at the timing when said signal is given is transformed into said right reference coordinates on said display.

Further, a storage device of the present invention is characterized in that it is provided with storage pits that individually store a plurality of information inputting tools that are individually attached to a plurality of fingers of an operator and with a detection means that individually detects whether each of said plurality of information inputting tools is stored.

Further, preferably, said storage device is further provided with a means that attaches said information inputting devices to said fingers of the operator and with a means that detaches said information inputting devices from said fingers of the operator.

Further, preferably, said storage device is provided to a face following type display.

Effect of the Invention

In accordance with the present invention, an information inputting tool that can be made space-saving and place small constraint on key touch actions is realized.

Further, in accordance with the present invention, a storage device suitable for an information inputting tool of the present invention is realized.

Further, in accordance with the present invention, an information inputting device that properly utilizes an information inputting tool of the present invention is realized.

Further, in accordance with the present invention, an information processing equipment suitable for an information inputting device of the present invention is realized.

Further, in accordance with the present invention, an information processing equipment that can save the space required to input information is realized.

Further, in accordance with the present invention, a storage device that facilitates the handling of the information inputting tool is realized.

BEST MODE FOR CARRYING OUT THE INVENTION

Figure 1:
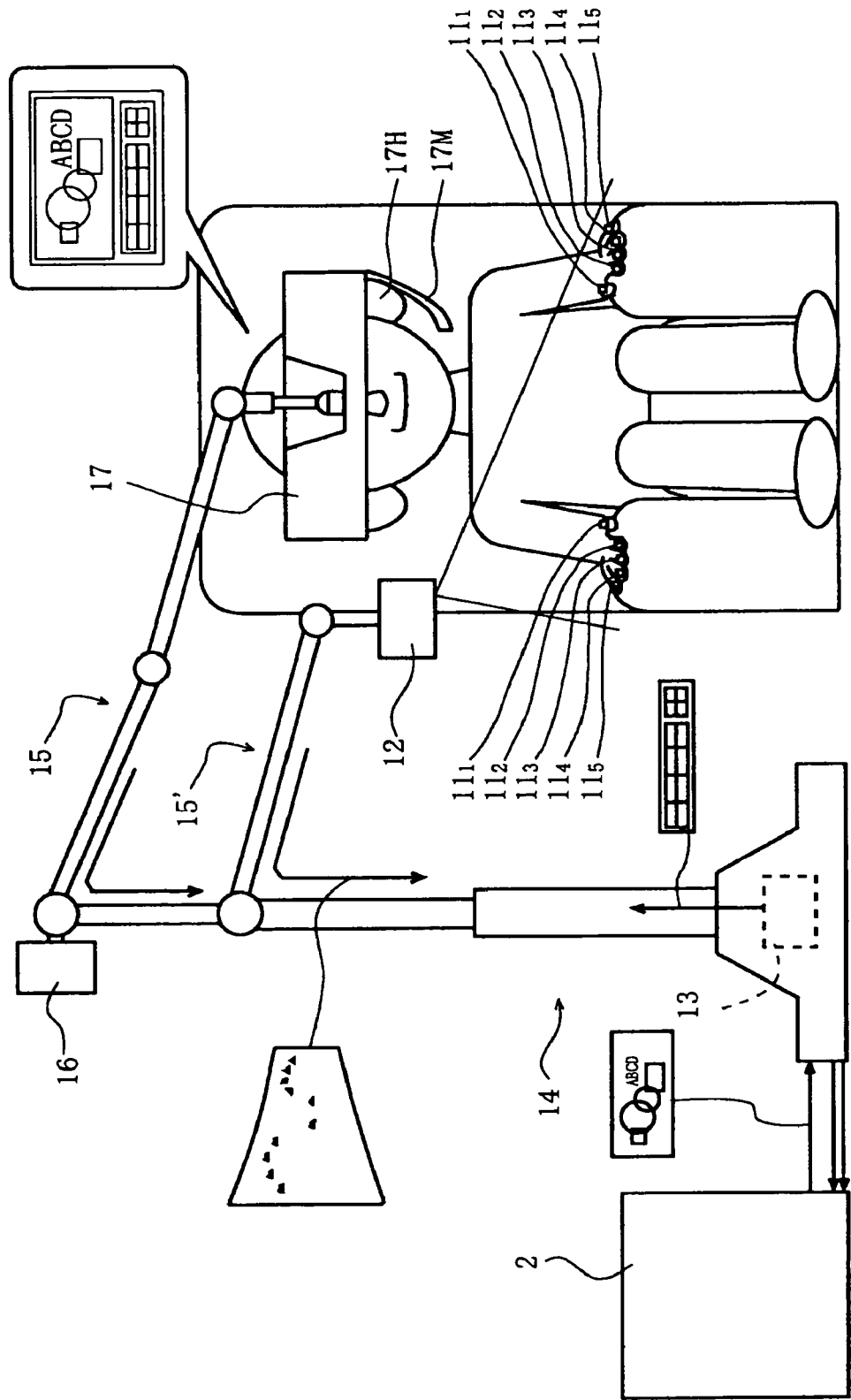
FIG. 1 is an overall configuration drawing of the present embodiment face following type image display system (in the case where an operator takes a posture of sitting).

In the following, an embodiment of the present invention will be described referring to the drawings.

The embodiment is an embodiment of a face following type image display system to which an information inputting tool, information inputting device, storage device, and information processing equipment of the present invention are applied.

As shown in FIG. 1, in this face following type image display system are disposed display 17 (which corresponds to "display," "storage device," and "face following type display" in the claims) that displays images, finger clips $11_1$, $11_2$, $11_3$, $11_4$, and $11_5$ (which correspond to "information inputting tool" in the claims) that are attachable to each finger end of the right and left hands of an operator, finger end detection device 12 (which correspond to "information inputting device" in the claims) that images the images of the finger regions of the right and left hands of the operator, a mechanism (which is constituted by telescopic pole 14 set on the floor, vibration isolation type, telescopic, rotationally movable arms 15 and 15' having a plurality of joints, counter balance portion 16, etc.) that supports display 17 and finger end detection device 12, general-purpose external device 2, main controller 13 (which correspond to "information processing equipment" in the claims) that exercises control over each portions, etc.

The operator is sitting in, e.g., a sofa in a comfortable posture and is placing his or her right and left hands on, e.g., the armrests of the sofa. To each of the thumbs, index fingers, middle fingers, ring fingers, and little fingers of the right and left hands is attached finger clips $11_1$, $11_2$, $11_3$, $11_4$, and $11_5$, respectively. The operator can perform key touch actions and pointing actions, with finger clips $11_1$, $11_2$, $11_3$, $11_4$, and $11_5$ being attached to his or her fingers.

On display 17 are provided headphones 17H and microphone 17M by use of elastic members, a leaf spring, etc. Headphones 17H have a function of softly covering, with display 17, the operator's face.

In finger end detection device 12 is provided an optical system (of which details will be described later) for forming the images of the finger regions of the operator.

Arm 15 and arm 15' are respectively attached to common pole 14 and support display 17 and finger end detection device 12, respectively.

Each of the joint portions of arm 15 is structured such that display 17 follows the operator's head in accordance with the change of the orientation and position of the head.

Each of the joint portions of arm 15' operates such that the position and orientation of finger end detection device 12 is changed in accordance with external forces exerted on finger end detection device 12. Thus, the operator can change at will the position and orientation of finger end detection device 12.

Counter balance portion 16 is a so-called weight-free balancer; its weight and disposed position are optimized; and it bears a function of canceling the weight of display 17. Thus, even if the orientation and position of the head changes, the operator is free from a sense of the weight of display 17. So, display 17 may be heavy in weight.

Main controller 13 is constituted, e.g., by circuit boards electrically connected with display 17, finger end detection device 12, and general-purpose external device 2 and is disposed in a position, e.g., the stand portion of pole 14, where relatively small vibrations occur.

General-purpose external device 2 is a device desired by the operator among general-purpose devices that are capable of generating images for display, including a DVD player, a video player, a television set, a computer, and a television game machine. In the following, by assuming that general-purpose external device 2 is computer 2, the following description will be made.

The input/output ports of computer 2 (hereinafter, keyboard ports, mouse ports, and image ports) are connected with main controller 13.

Main controller 13 takes an image for display (hereinafter, referred to as "computer image") from the image ports of computer 2, transforms the computer image into an image suitable for display 17, and inputs the transformed image to display 17.

Further, main controller 13 recognizes, based on output signals from finger end detection device 12, the operator's key touch actions (actions made when operating a keyboard device) and pointing actions (actions made when operating a mouse), transforms input information from the operator indicated by those actions into signals suitable for computer 2, and inputs those signals to the computer.

Further, main controller 13 generates a keyboard image indicating a key top layout of a keyboard and a pointer image of a mouse and inputs those images along with the computer image to display 17.

On display 17 are displayed the keyboard image, the pointer image, and the computer image. Main controller 13 reflects in real time the aspect of the key touch actions and the pointing actions on those images (of which manner will be described in detail later).

Therefore, the operator can input desired information unerringly, only by, while viewing images displayed on display 17, performing key touch actions and pointing actions with a feeling that the operator was using a real keyboard.

Figure 2:
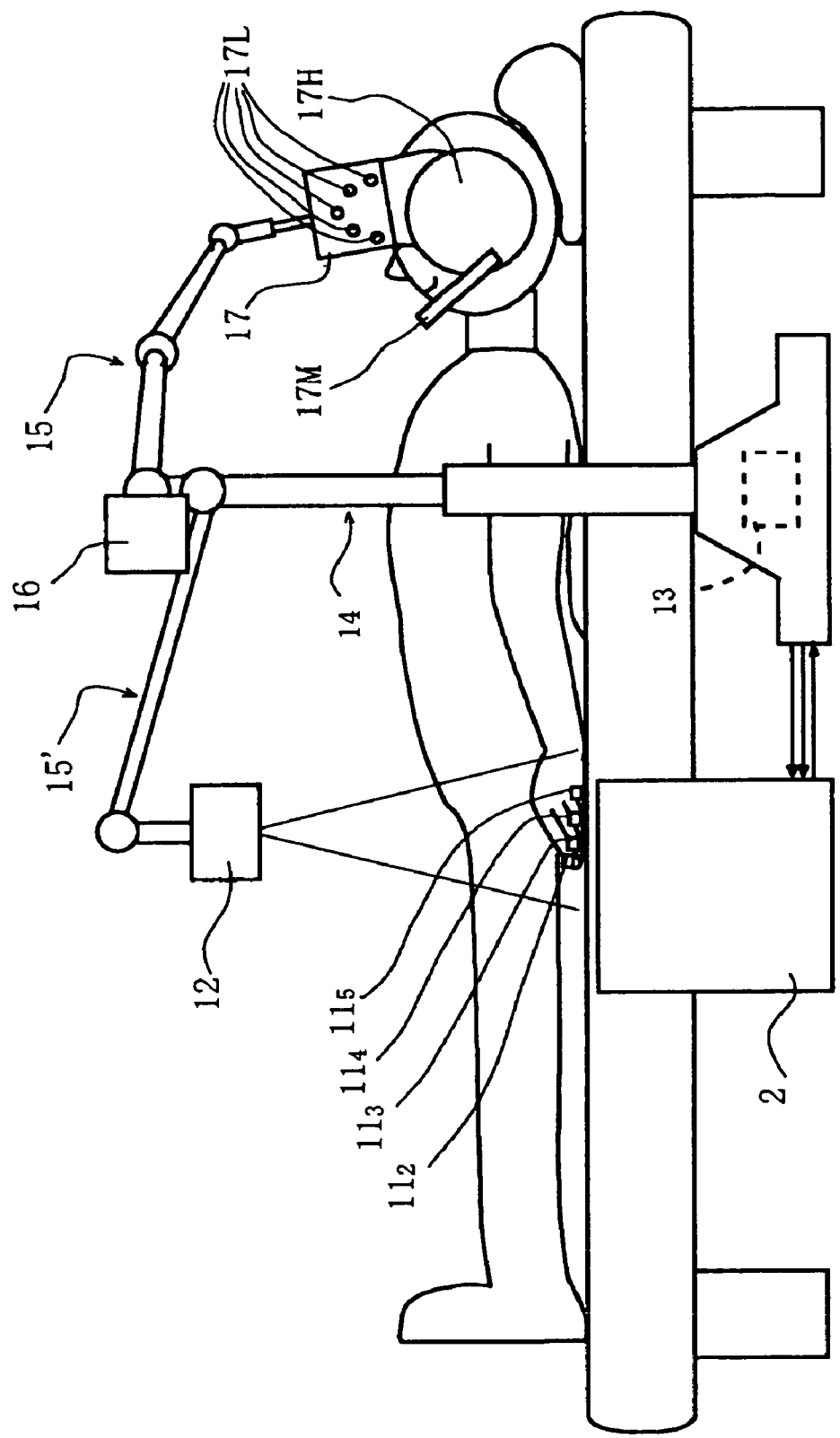
FIG. 2 is an overall configuration drawing of the present embodiment face following type image display system (in the case where an operator takes a posture of lying).

It is to be noted that the operator can implement, e.g., such a type of usage as shown in FIG. 2, by moving finger end detection device 12 and display 17.

In this type of usage, the operator is lying on a bed. The operator can also take a relaxed posture as in this way.

Furthermore, since this embodiment does not require a real keyboard and has a large freedom with respect to the placing positions of the right and left hands, the operator can place both hands on his or her abdomen or, e.g., as shown in FIG. 2, on each side of both flanks and thus can input information in a relaxed posture.

In this regard, the position and orientation of finger end detection device 12 are set so that the right and left hands are assuredly caught by finger end detection device 12.

By the way, when the operator's posture is changed as indicated by the change of from the state of FIG. 1 to that of FIG. 2 or when the position or direction of the operator's face is changed, the positional relationship between display 17 and arm 15 changes.

Figure 3:
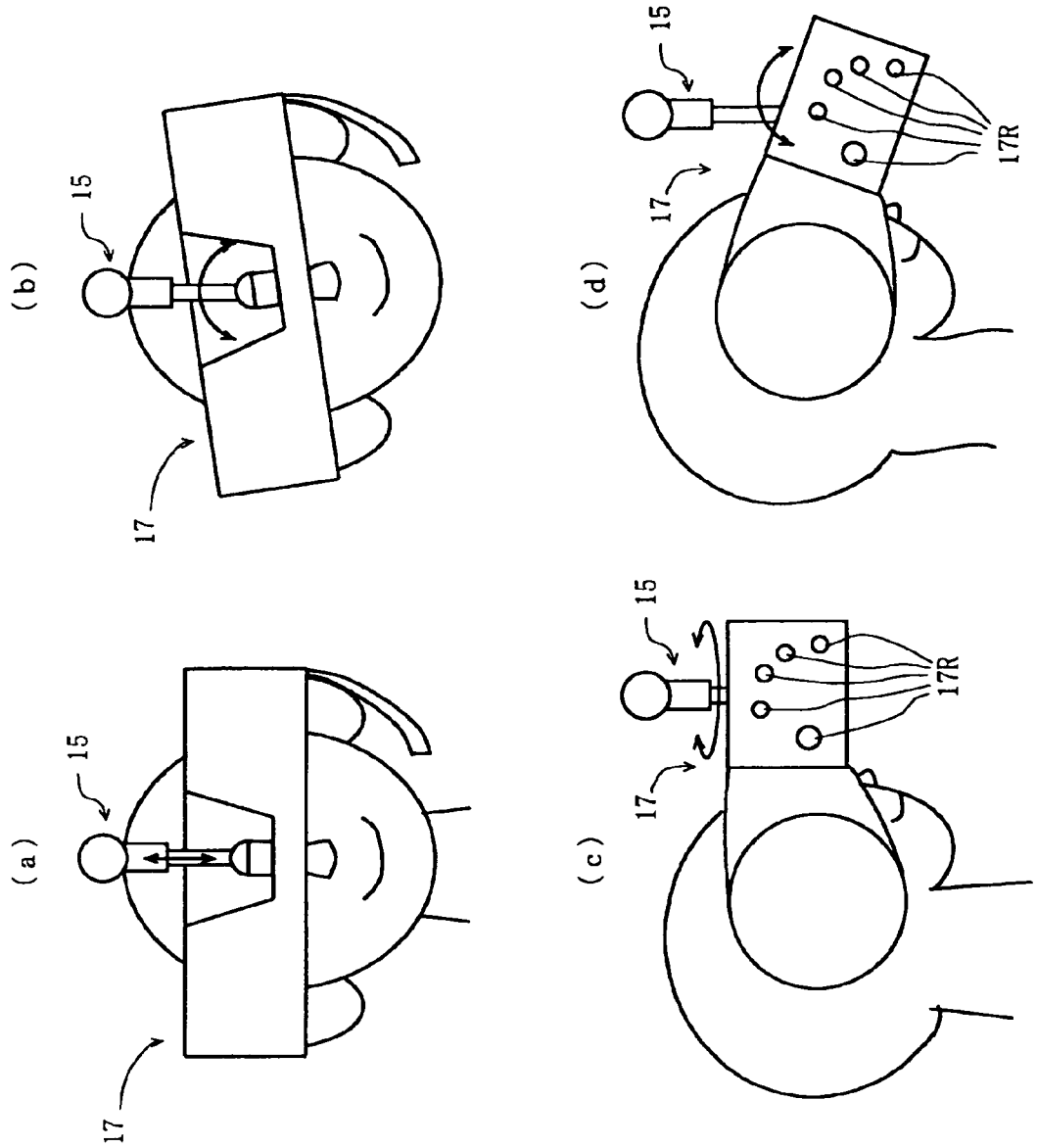
FIG. 3 is a drawing illustrating the change of position and orientation of display 17.

Next, the change of the positional relationship between display 17 and arm 15 will be described in detail based on FIG. 3.

As described above, arm 15 is telescopic. In addition, the portion where arm 15 and display 17 are combined coincides with the gravity center of display 17. Further, this connection portion is constituted by a universal joint as shown in FIG. 3.

First, by virtue of the telescopic motions of arm 15 in the arrow directions of FIG. 3(a), display 17 is movable in the directions in which the operator changes his or her head height.

Further, by virtue of the rotational movements of the universal joint in the arrow directions of FIG. 3(b), display 17 is rotationally movable in the directions in which the operator inclines his or her head. At least, this rotational movement range thereof is secured up to the angle range within which the operator inclines his or her head.

Further, by virtue of the rotational movements of arm 15 in the arrow directions of FIG. 3(c), display 17 is rotationally movable in the directions in which the operator turns his or her head in the right or left direction. This rotational movement range thereof is secured at least up to the angle range within which the operator inclines turns his or her head in the right or left direction.

Further, by virtue of the rotational movements of the universal joint in the arrow directions of FIG. 3(d), display 17 is rotationally movable in the directions in which the operator nods his or her head. Note that the rotational movement range in these directions is set to be sufficiently large (90 degrees or so) so that the operator can not only nod but also change his or her posture from the state of FIG. 1 to that of FIG. 2. Display 17 is configured such that it does not interfere with the trajectories of arm 15 during the rotational movements in all of the directions.

It should be noted that, for example, the relationship between the portion where arm 15 and display 17 are combined and the gravity center of display 17 is not limited to the content described above. For example, when it is expected that the operator views display 17 and intensively moves, it may be configured such that with the gravity center of display 17 being made located near the operator, the gravity center is intentionally set to be separated from the portion where arm 15 and display 17 are combined.

Next, the optical system in display 17 will be described based on FIGS. 4-7. This optical system is designed, as shown in, e.g., FIG. 4, such that virtual images of liquid crystal display devices 17$f$ and 17$f'$ are formed in a remote position sufficiently distant from the operator's eyes, and a wide field of view angle (e.g., ±60 degrees) is realized. In this connection, when virtual images are formed in a remote position, decrease of eyesight can be prevented because even if the operator continues to stare at the virtual images, eyestrain is not much induced.

Figure 4:
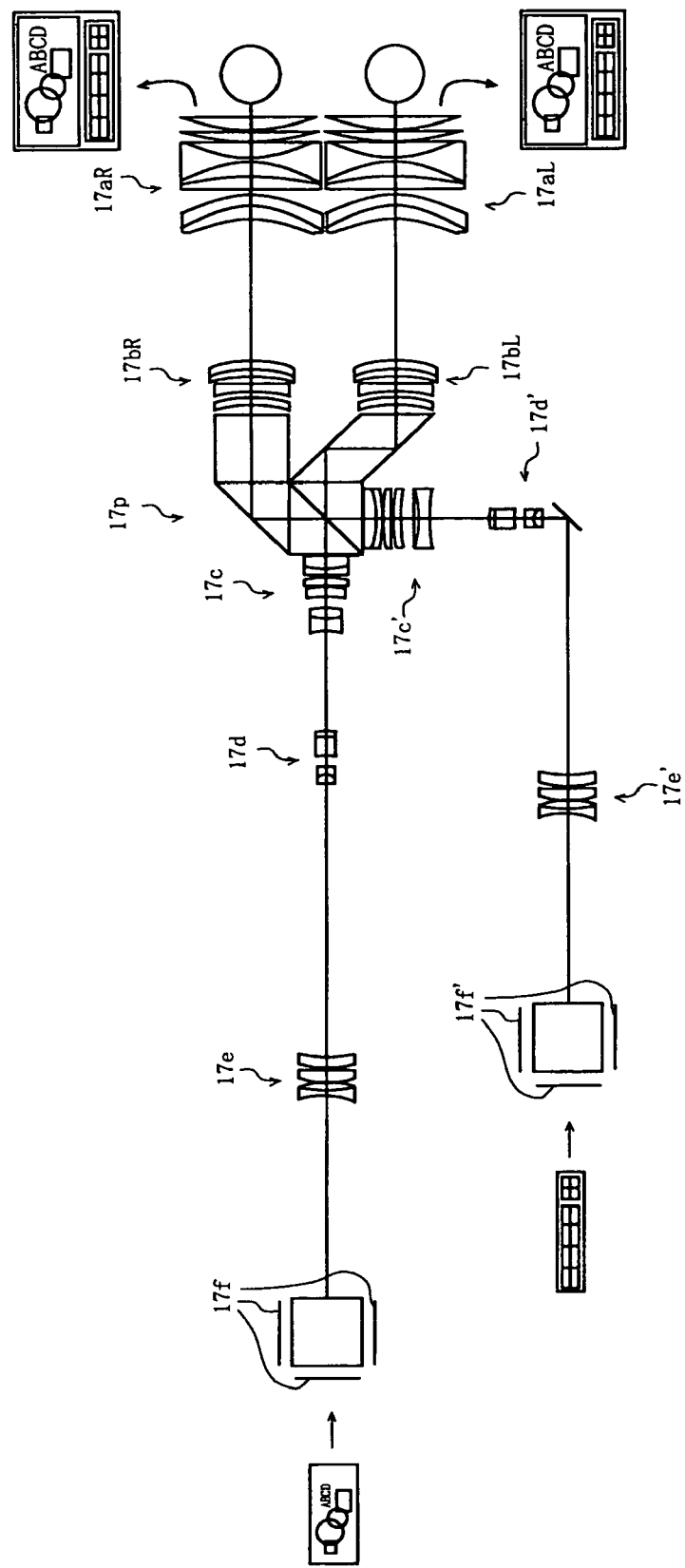
FIG. 4 is a configuration drawing of the optical system in display 17.
Figure 5:
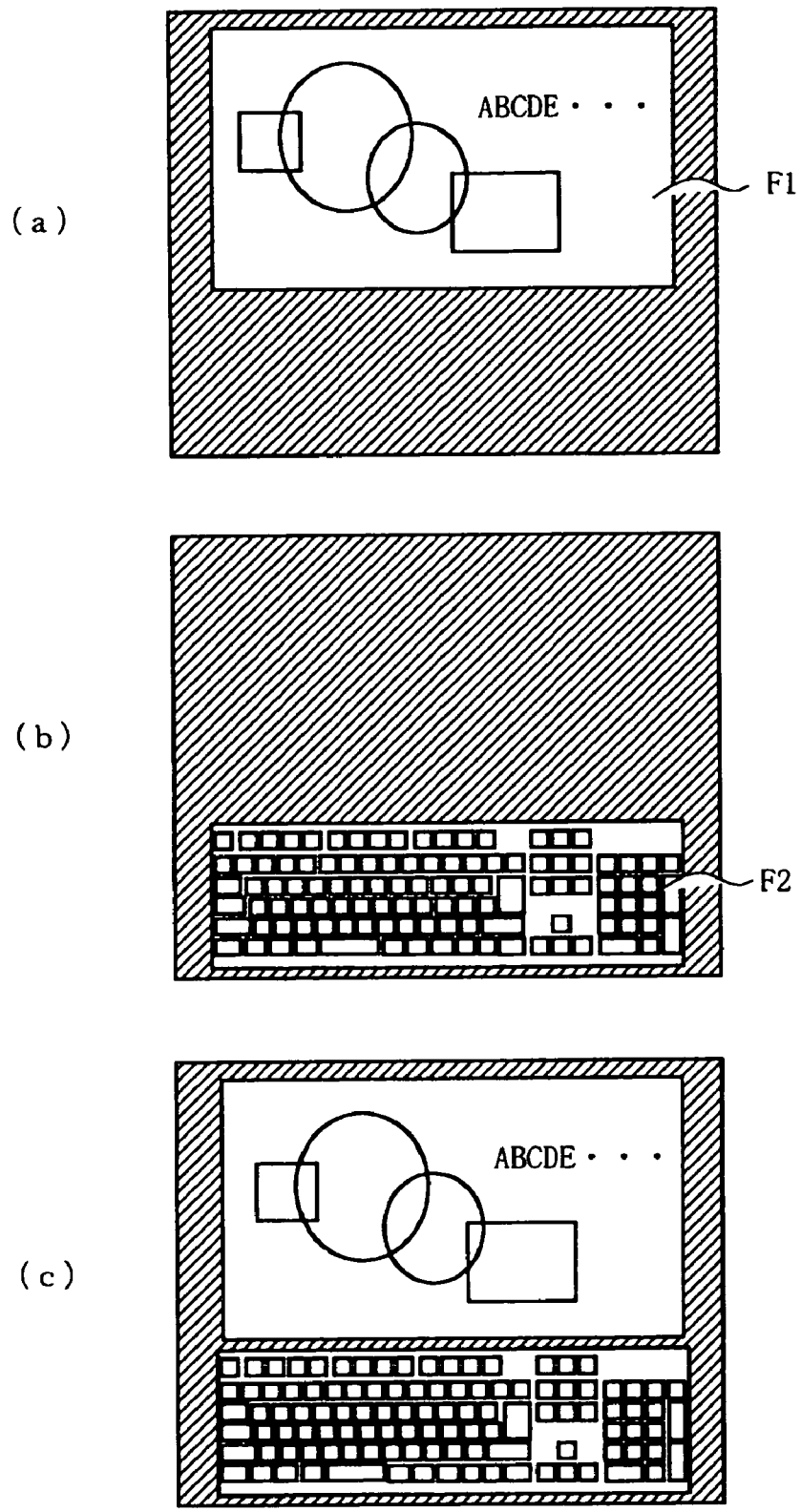
FIG. 5 is a drawing illustrating display images in display 17.

By the way, the optical system shown in FIG. 4 is the optical system disclosed in Japanese Patent Application No. 2002-313466, and thus only the outline thereof will be described below.

In the optical system are provided eyepiece optical systems 17$a$R and 17$a$L, zoom optical systems (lens groups 17$b$R, 17$b$L, 17$c$, 17$c'$, 17$d$, 17$d'$, 17$e$, and 17$e'$), liquid crystal display devices 17$f$ and 17$f'$, prism 17$p$, screens, etc.

To one liquid crystal display device 17$f$ is inputted, from main controller 13, such a computer image as shown in FIG. 5(a), and to the other liquid crystal display device 17$f'$ is inputted, from main controller 13, such a keyboard image as shown in FIG. 5(b).

As shown in FIG. 5(a), the computer image is located in first field (which corresponds to "special field" in the claims) F1 that corresponds to the upper portion of the field of view; as shown in FIG. 5(b), the keyboard image is located in second field (which corresponds to "general field" in the claims) F2 that corresponds to the lower portion of the field of view.

A light emitted from one liquid crystal display device 17$f$ (light for imaging the computer image to the retinas of the eyes) is, after passing through lens group 17$e$, lens group 17$d$, and lens group 17$c$, divided by prism 17$p$ into two lights; one of the two light passes through the two lens groups 17$b$R and 17$a$R and is led to the right eye, and the other light passes through the two lens groups 17$b$L and 17$a$L and is led to the left eye.

A light emitted from the other liquid crystal display device 17$f'$ (light for imaging the keyboard image to the retinas of the eyes) is, after passing through lens group 17$e'$, lens group 17$d'$, and lens group 17$c'$, divided prism 17$p$ into two lights; one of the two light passes through the two lens groups 17$b$R and 17$a$R and is led to the right eye, and the other light passes through the two lens groups 17$b$L and 17$a$L and is led to the left eye.

Accordingly, the operator sees a display image in which the computer image and the keyboard image are lined up vertically, as shown in FIG. 5(c).

Main controller 13 (see FIG. 1) keeps control, with a common coordinate system, over each position on the first field on the display image and each position on the second field on the display image.

In this connection, by adopting, as the display size of liquid crystal display device 17$f'$, a display size smaller than the size corresponding to the full frame of the second field and, at the same time, by setting the enlarging magnification (zoom magnification) with respect to the exit optical path of liquid crystal display device 17$f'$ to be larger than the enlarging magnification (zoom magnification) with respect to the exit optical path of liquid crystal display device 17$f$ by an amount corresponding to the display size made smaller, the computer image, which is to be finely displayed, can be finely displayed, and the keyboard image, which may be coarsely displayed, can be coarsely displayed. By doing so, the liquid crystal display device can be made inexpensive.

Further, since the size of each of the images formed by the lights emitted from liquid crystal display devices 17$f$ and 17$f'$ can be, independently of each other, changed by changing the zoom magnifications through the lens groups of 17$e$, 17$d$, and 17$c$ and the lens groups of 17$e'$, 17$d'$, and 17$c'$, the images can be projected in accordance with various demands of the operator.

It is to be noted that, in this case also, when these enlarging magnifications set are known, main controller 13 can keeps control, with a common coordinate system, over each position on the first field and each position on the second field.

Figure 6:
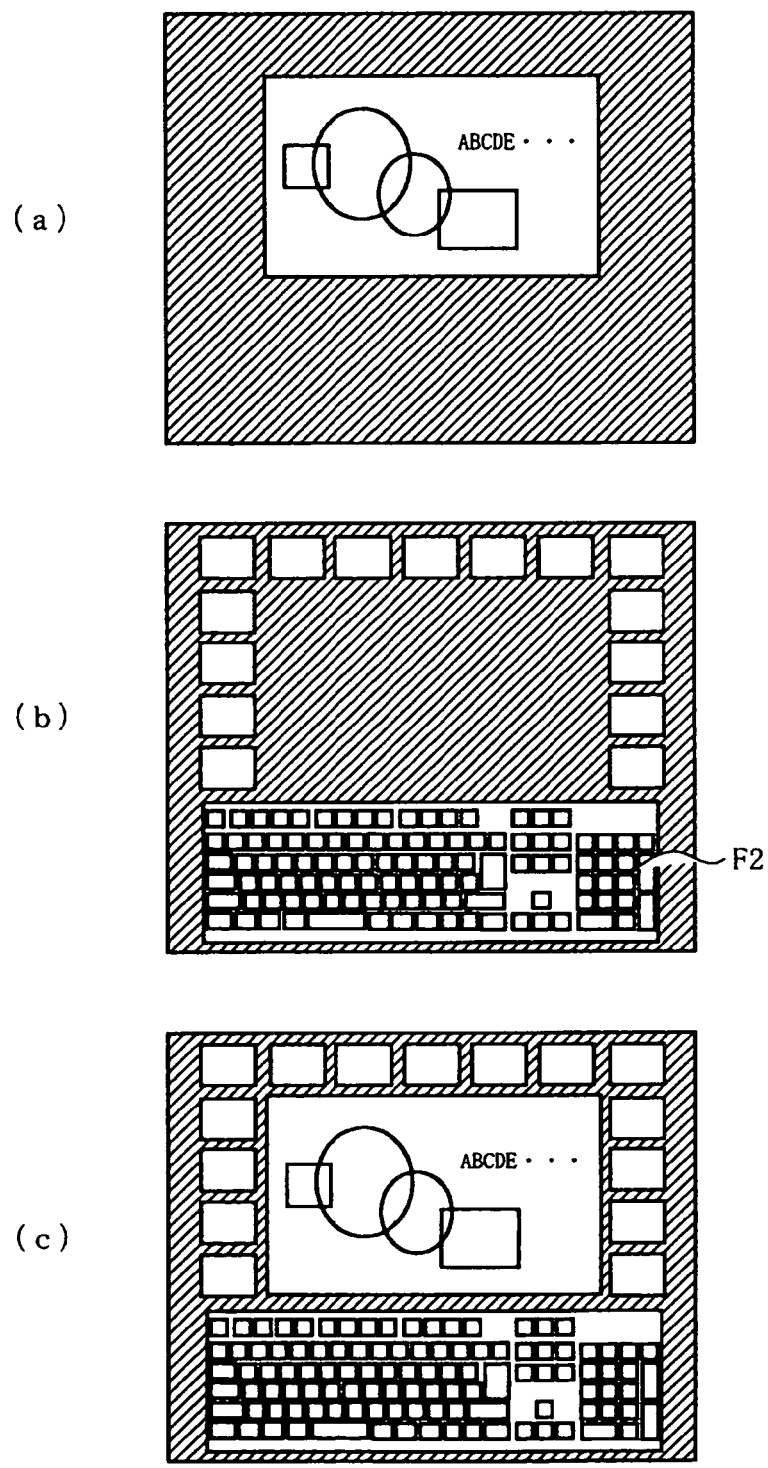
FIG. 6 is a drawing illustrating another example of display images in display 17.

It should be noted that as shown in FIG. 6, as with the keyboard image, another operation button image (e.g., CAD keys in a CAD system) may be displayed.

Further, while in the above, the superimposition (integration) of the computer image and the keyboard image is realized by the optical system in display 17 (here, prism 17$p$), the superimposition may also be realized through image processing by main controller 13. In that case, the optical system can be simplified compared with that shown in FIG. 4.

Figure 7:
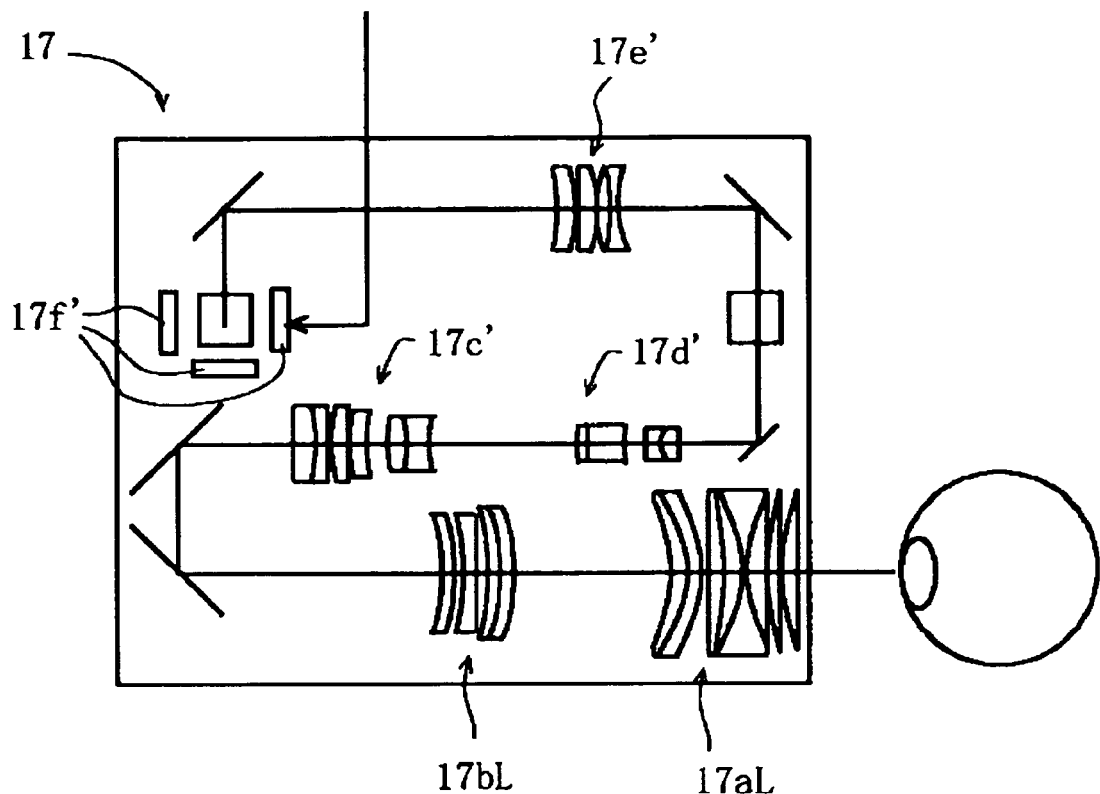
FIG. 7 is an outline cross-sectional drawing of the optical system in display 17.

In addition, when the optical system shown in FIG. 4 is incorporated in display 17, the optical path thereof is appropriately folded as shown, e.g., in FIG. 7. Note that in FIG. 7, only the optical system viewed from the left side of the operator, i.e., the optical system for the left eye, is illustrated.

When arranging the optical path, a space required for the above-described movements of arm 15 (see FIG. 3) is secured inside display 17. Further the optical path arrangement is made such that the gravity center position of the optical system is located as near to eyepiece optical systems 17$a$R and 17$a$L as possible.

Because with the gravity center position being located near the operator's neck position in this way, the inertia of display 17, which follows the face movements around the neck, becomes small, the display's following motions can be made smooth.

Next, the configuration of finger end detection device 12 and the relationship between finger end detection device 12 and finger clips $11_1$, $11_2$, $11_3$, $11_4$, and $11_5$ will be described in detail based on FIG. 8. Note that while only the finger clips $11_1$, $11_2$, $11_3$, $11_4$, and $11_5$ which are respectively attached to each finger of one hand, similar finger clips $11_1$, $11_2$, $11_3$, $11_4$, and $11_5$ are respectively attached to each finger of the other hand.

Figure 8:
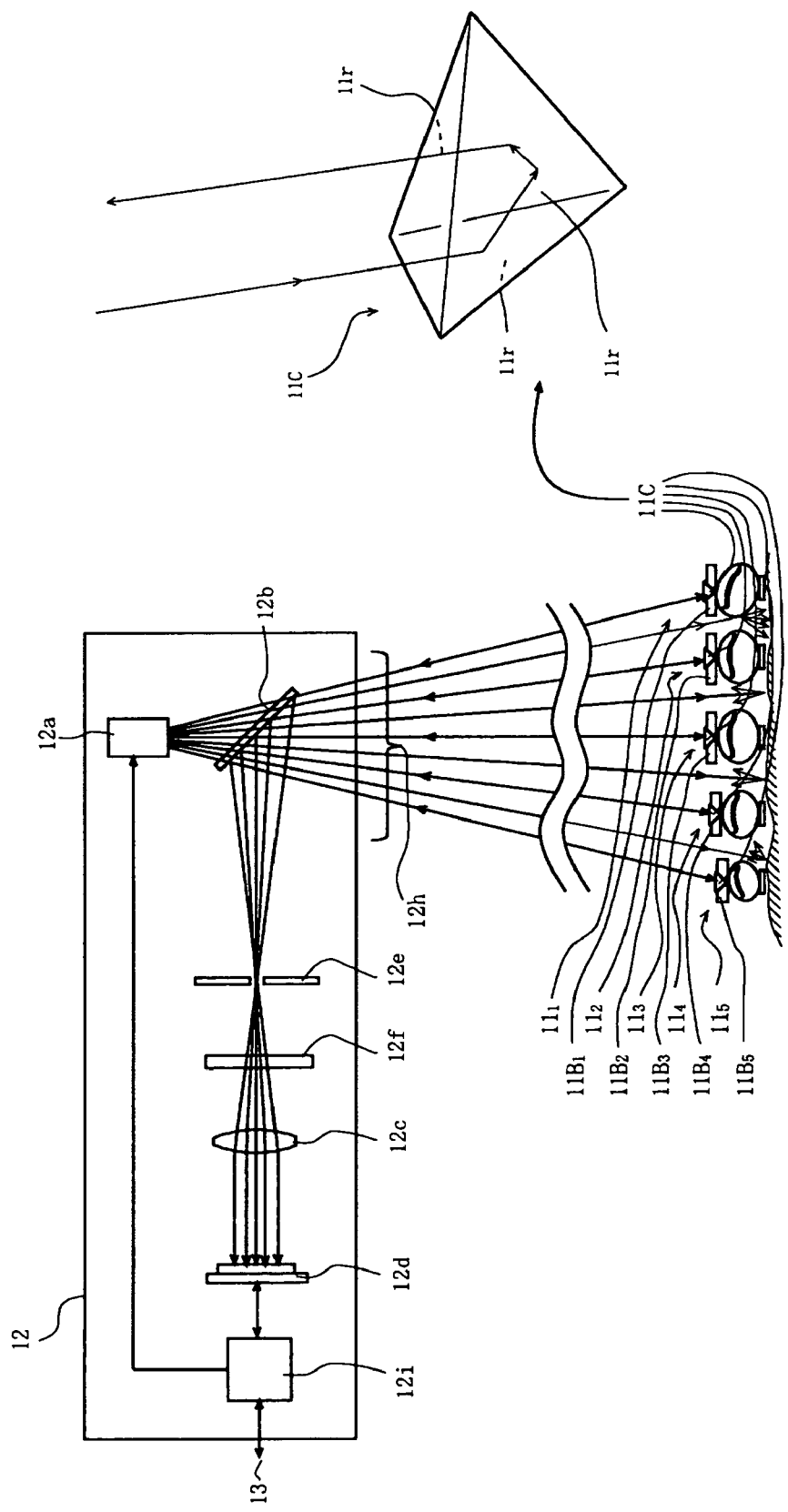
FIG. 8 is a drawing showing the configuration of finger end detection device 12 and the relationship between finger end detection device 12 and finger clips $11_1$, $11_2$, $11_3$, $11_4$, and $11_5$.

As shown in FIG. 8, finger end detection device 12 is provided with illumination optical system 12$a$, half mirror 12$b$, stop 12$e$, color filter 12$f$, projection lens 12$c$, exit window 12$h$, two-dimensional light receiving device 12$d$, and circuit 12$i$ prepared for the control of each portion of finger end detection device 12 and for simple signal processings (e.g., A/D conversion). Output signals from this finger end detection device 12 (output signals from two-dimensional light receiving device 12$d$) are given, via circuit 12$i$, to main controller 13 (see FIG. 1).

On each of the portions, of finger clips $11_1$, $11_2$, $11_3$, $11_4$, and $11_5$, that correspond to the upper portions of the fingernails is provided either one of reflection element substrates (which correspond to "reflection portion" in the claims) $11B_1$, $11B_2$, $11B_3$, $11B_4$, and $11B_5$.

Reflection element substrates $11B_1$, $11B_2$, $11B_3$, $11B_4$, and $11B_5$ are each made by providing on a substrate corner cube 11C constituted by three reflection surfaces that are perpendicular to each other (corner-shaped reflection surfaces) in an orientation that the corner is directed to the fingernail side.

As this corner cube 11C, not only a corner cube constituted by a prism of which three inner surfaces 11$r$ are each a reflection surface as shown in a magnified scale in the right side space of FIG. 8, but also any type of corner cubes including a corner cube constituted by three metal reflecting surfaces and a corner cube constituted by an aggregate of micro corner cubes may be applied.

Further, in addition to these corner cubes, a reflecting member having retroreflectivity which is disclosed in Japanese Unexamined Patent Publication Sho 55-75938 and on which glass spherical bodies are disposed in a scattered manner may also be utilized. In the embodiment, however, description will be continued by way of an example in which a corner cube is used.

In finger end detection device 12, the illumination light (monochromatic light) emitting from illumination optical system 12$a$ passes through half mirror 12$b$, divergingly passes through exit window 12$h$, and illuminates in a lump the operator's finger regions (although only the one hand's region is illustrated in FIG. 8, both hands' regions) where finger clips $11_1$, $11_2$, $11_3$, $11_4$, and $11_5$ are attached.

Each of corner cubes 11C that are provided to the right and left sides' finger clips $11_1$, $11_2$, $11_3$, $11_4$, and $11_5$ reflects the illumination light, irrespective of the incidence angle thereof, in the reverse direction (in the reverse and parallel direction) as shown in a magnified scale in the right side space of FIG. 8.

The light reflected by each of corner cubes 11C is incident again on half mirror 12$b$, is reflected by half mirror 12$b$, passes through stop 12$e$, color filter 12$f$, and projection lens 12$c$, in this order, and is incident on two-dimensional light receiving device 12$d$.

Here, stop 12$e$ is located in a position substantially conjugate with the exit position of the illumination light and cuts off unwanted light other than the illumination light reflected by corner cubes 11C. Further, color filter 12$f$ cuts off light having a wavelength different from that of the illumination light. Projection lens 12$c$ forms the image of the operator's hand regions on two-dimensional light receiving device 12$d$.

Thus, light (diffused light) reflected by surfaces other than those of corner cubes 11C, e.g., the operator's fingers and the substrate faces of reflection element substrates $11B_1$, $11B_2$, $11B_3$, $11B_4$, and $11B_5$ can hardly be imaged on two-dimensional light receiving device 12$d$.

Therefore, what is sharply imaged on two-dimensional light receiving device 12$d$ is the images of corner cubes 11C on reflection element substrates $11B_1$, $11B_2$, $11B_3$, $11B_4$, and $11B_5$ (hereinafter, referred to as "corner cube group image").

Main controller 13 (see FIG. 1) can recognize this corner cube group image, based on output signals from finger end detection device 12.

It is to be noted that the position and orientation of the above-described finger end detection device 12 are adjusted beforehand so that the illumination light emitting from the finger end detection device 12 can illuminate the entirety of reflection element substrates $11B_1$, $11B_2$, $11B_3$, $11B_4$, and $11B_5$ attached to the right and left hands.

In this regard, it is preferable that the illumination is performed obliquely rather than from right above. By doing so, for example, the surfaces of hands are less likely to directly face the illumination beam; unwanted direct reflection light having a high intensity is also less likely to be incident on two-dimensional light receiving device 12$d$; and, as a result, the S/N of two-dimensional light receiving device 12$d$ increases.

Further, since the position and orientation of finger end detection device 12 can be changed at will by arm 15', obstacles (e.g., the operator's head and the operator's elbows) can be assuredly excluded from the required optical path of the illumination light.

Figure 9:
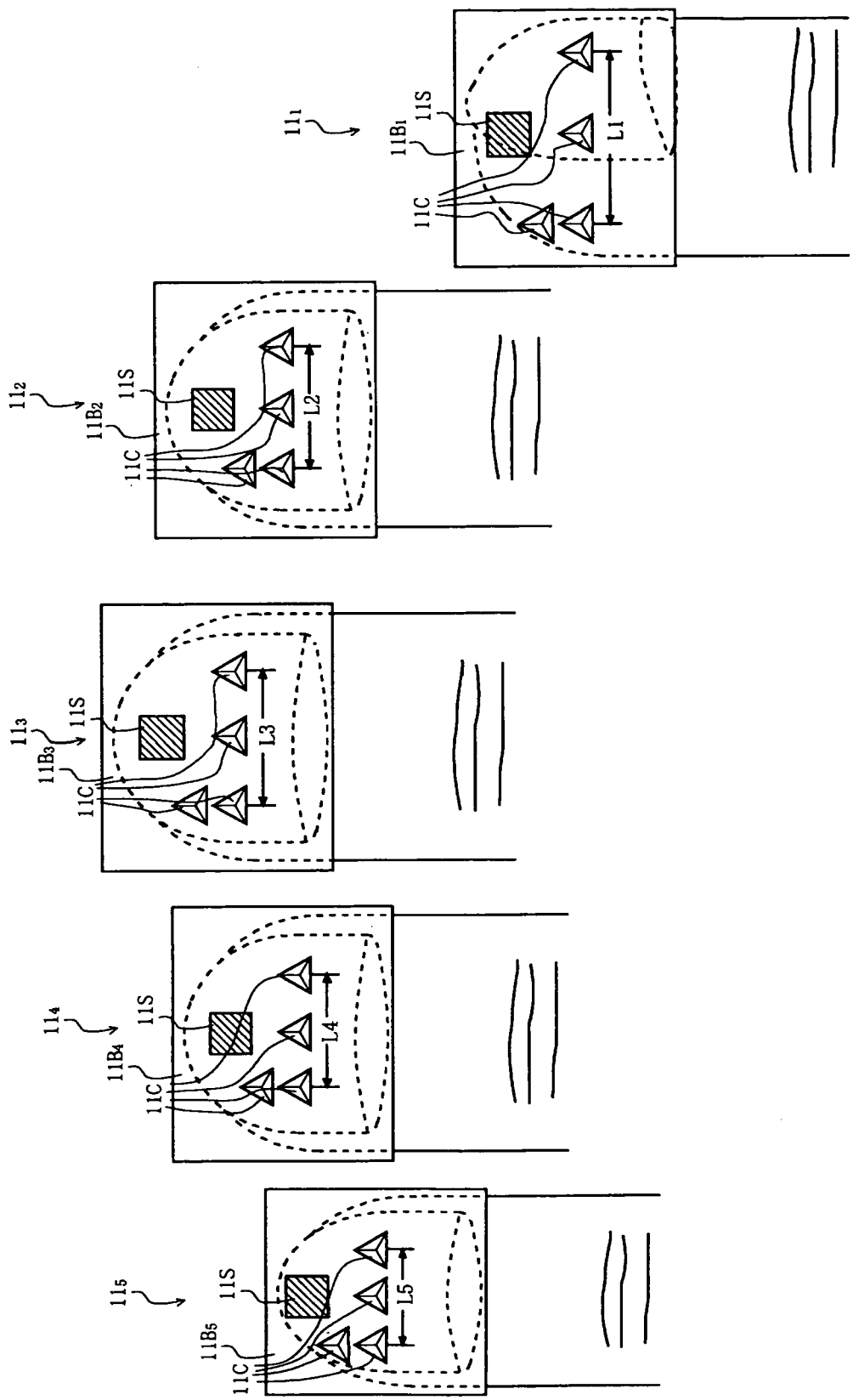
FIG. 9 is a drawing showing the optical system portion of reflection element substrates $11B_1$, $11B_2$, $11B_3$, $11B_4$, and $11B_5$.
Figure 10:
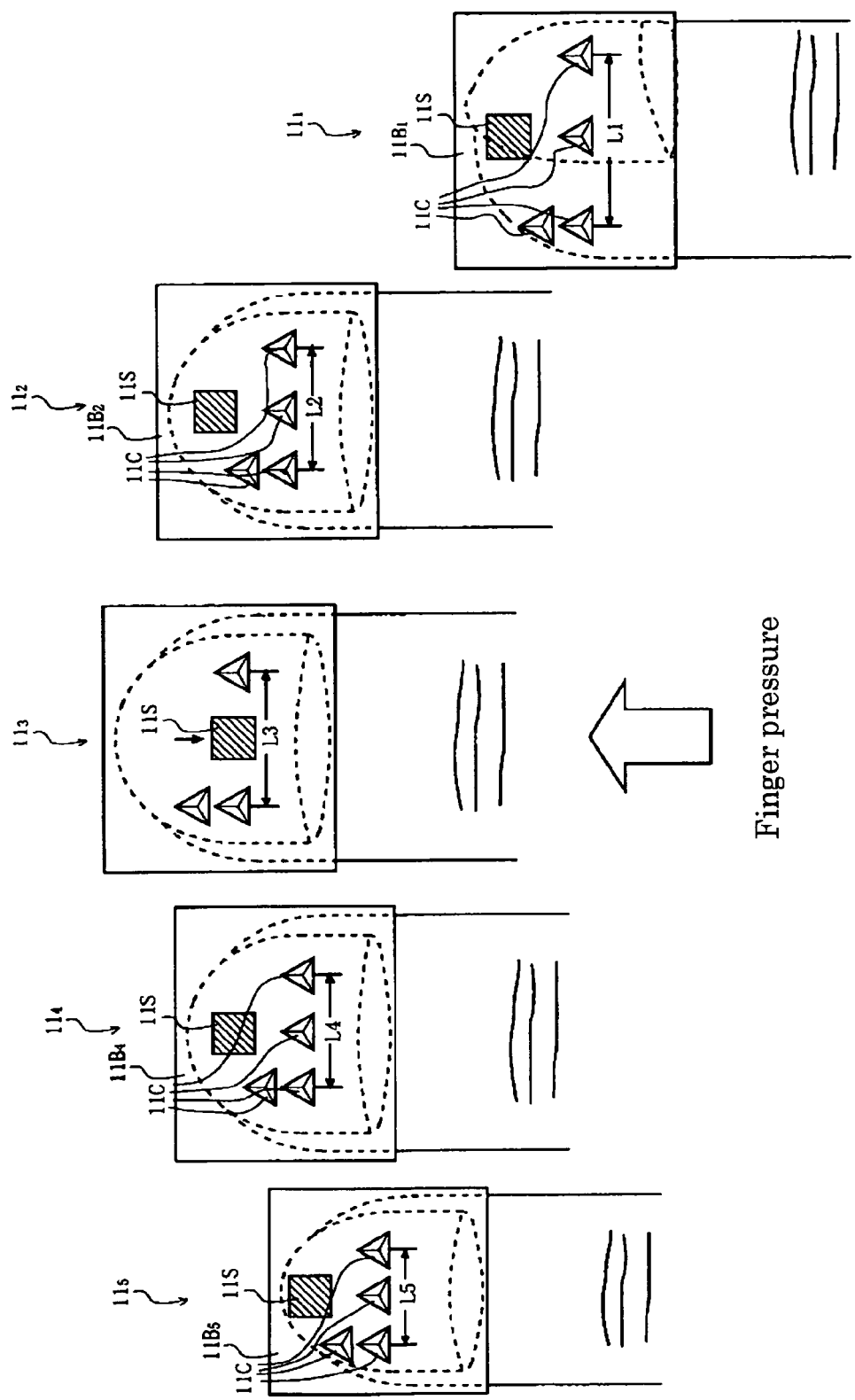
FIG. 10 is a drawing showing another state of the optical system portion of reflection element substrates $11B_1$, $11B_2$, $11B_3$, $11B_4$, and $11B_5$.

Next, the optical portion of reflection element substrates $11B_1$, $11B_2$, $11B_3$, $11B_4$, and $11B_5$ will be described in detail based on FIGS. 9-11. Note that in FIGS. 9 and 10, illustration of the other portion (mechanism portion) other than the optical portion, among the portions, is omitted (but the mechanism portion will be described later). In addition, although in FIGS. 9 and 10, only the reflection element substrates $11B_1$, $11B_2$, $11B_3$, $11B_4$, and $11B_5$ respectively provided on the finger clips $11_1$, $11_2$, $11_3$, $11_4$, and $11_5$ for the left hand are illustrated, also on the finger clips $11_1$, $11_2$, $11_3$, $11_4$, and $11_5$ for the right hand are provided similar reflection element substrates $11B_1$, $11B_2$, $11B_3$, $11B_4$, and $11B_5$.

On each of reflection element substrates $11B_1$, $11B_2$, $11B_3$, $11B_4$, and $11B_5$ are aligned in the lateral direction viewed from the operator a plurality of, three or more (in this case, three) corner cubes 11C.

Further, to each of reflection element substrates $11B_1$, $11B_2$, $11B_3$, $11B_4$, and $11B_5$ is provided shutter member (which is a light shielding plate and corresponds to "change mechanism" in the claims) 11S.

If a finger pressure is applied to the finger end of a certain reflection element substrates $11B_i$, then the shutter member 11S provided to the reflection element substrates $11B_i$ shields the corner cube 11C disposed in the center of the reflection element substrates $11B_i$. If the application ends, then the corner cube 11C is released again. (The mechanism relating to this shielding/releasing will be describe later.)

For example, if a finger pressure is applied only to the finger end of the middle finger of the left hand, then the state of FIG. 9 changes into the state of FIG. 10; if the application ends, then the state of FIG. 10 changes into the state of FIG. 9.

Figure 11:
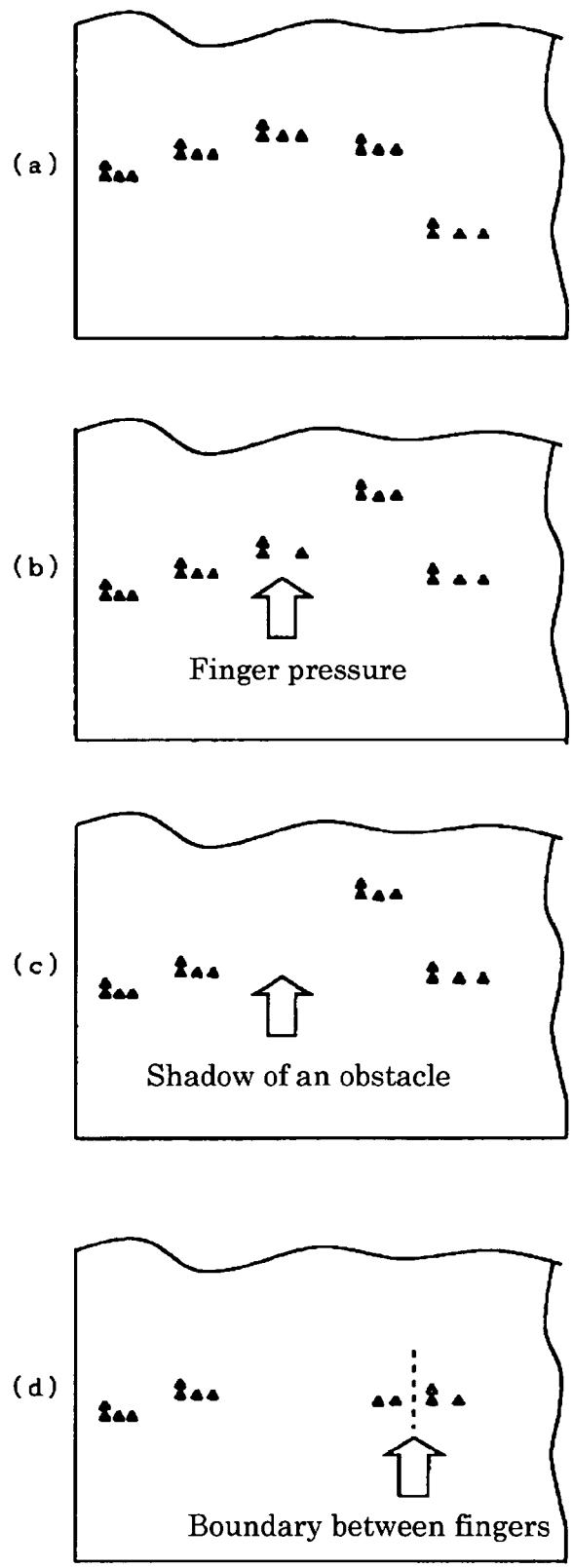
FIG. 11 is a drawing showing each state of the images of corner cube groups.

When, in this way, in response to a finger pressure applied to the finger end of a certain finger, the reflectance distribution of the reflection element substrates $11B_i$ corresponding to the finger changes, the corner cube group image formed on two-dimensional light receiving device 12d also changes, for example, from the state of (a) of FIG. 11 to the state of (b) of FIG. 11. Thus, main controller 13 can recognize from the corner cube group image whether there is a finger pressure applied for each finger.

Further, since, as the object to be shielded/released, a corner cube 11C that is located between two or more corner cubes 11C (in this case, the center corner cube 11C, which is located between the two corner cubes 11C) is chosen, the corner cube group image when a finger pressure is applied (FIG. 11(b)) and the corner cube group image when an obstacle shield the optical path of the illumination light become distinctively different from each other. Accordingly, main controller 13 can precisely distinguish, based upon corner cube group images, the state in which a finger pressure is being applied from the state in which an obstacle is shielding the optical path.

In this regard, the size of reflection element substrates $11B_1$, $11B_2$, $11B_3$, $11B_4$, and $11B_5$ is approximately of fingernail size, corner cubes 11C are sufficiently small compared with those reflection element substrates $11B_1$, $11B_2$, $11B_3$, $11B_4$, and $11B_5$, and the disposition distances between corner cubes 11C are sufficiently small; and thus, the controller can precisely distinguish between the state, except in the case that there exists a very small obstacle (an obstacle smaller than the disposition distances between corner cubes 11C).

Still further, as shown in FIG. 9, the distances L between the two end corner cubes 11C disposed in the lateral direction are set to be L1, L2, L3, L4, and L5 that differ from each other, i.e., the distances differ from each other, among reflection element substrates $11B_1$, $11B_2$, $11B_3$, $11B_4$, and $11B_5$ (i.e., among the fingers).

When the distribution of corner cubes 11C differs among the fingers, main controller 13 can identify each finger from the corner cube group image, even if the fingers are not placed in the order of "little finger, ring finger, middle finger, index finger, and thumb."

Further, as shown in FIG. 9, with respect to each of reflection element substrates $11B_1$, $11B_2$, $11B_3$, $11B_4$, and $11B_5$, two corner cubes 11C are aligned in the longitudinal direction on only one of the right and left sides (in this case, on only the left side).

By making, in this way, the distribution of corner cubes 11C (the distribution of reflection surfaces) of each of reflection element substrates $11B_1$, $11B_2$, $11B_3$, $11B_4$, and $11B_5$ left-right asymmetric, main controller 13 can recognize the boundary between adjacent fingers from the corner cube group image, also, e.g., when the adjacent fingers come close to each other (FIG. 11(d)).

Next, modification examples of the above-described finger end detection device 12 (finger end detection devices 12' and 12"), a modification example of corner cube 11C (corner cube 11C'), and a modification example of reflection element substrates 11B (reflection element substrates 11B') will be successively described based on FIGS. 12-15.

Figure 12:
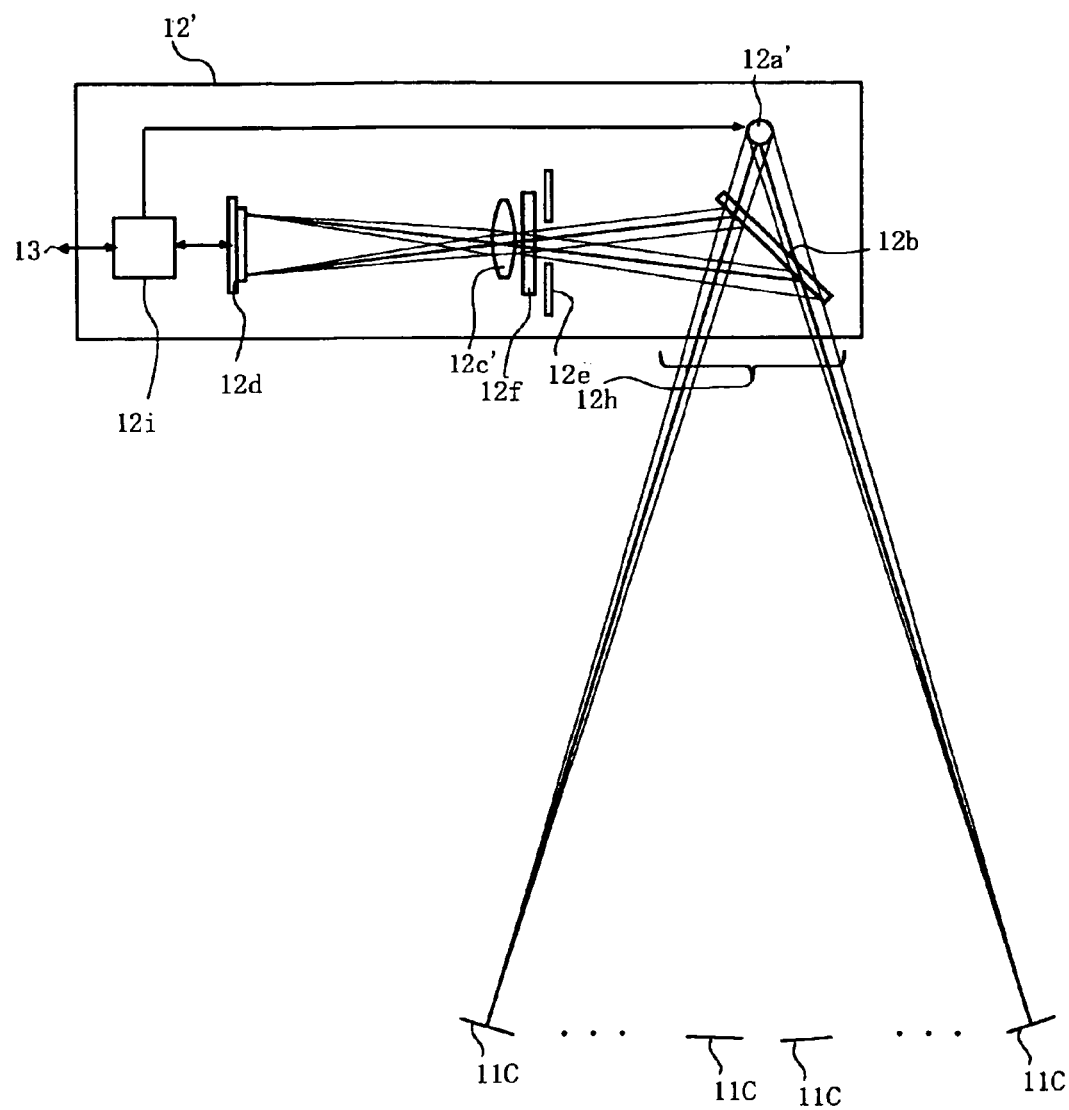
FIG. 12 is a configuration drawing of finger end detection device 12' (a modification example of finger end detection device 12).

FIG. 12 is a configuration drawing of finger end detection device 12'. It is to be noted that in FIG. 12, the same constituent elements as those of finger end detection device 12 shown in FIG. 12 are denoted by the same reference symbols. Further, for the sake of simplicity, in FIG. 12, each of corner cubes 11C is shown as a single surface reflection surface. Still further, in FIG. 12, only the light beams that focus on a certain point of each of certain two corner cubes 11C are shown.

Illumination optical system 12a' of finger end detection device 12' is provided with a finite light source, typically a light emitting LED, and with an optical system that uniformizes the exit beam from the finite light source. (It is to be noted that the illumination NA of the focusing light beams is determined based on the sizes of the finite light source and the optical system and on the distance up to corner cubes 11C.)

Projection lens 12c', stop 12e, and color filter 12f are inserted in a position (focusing position) substantially conjugate with the exit position of illumination optical system 12a'.

By optimizing the curvature radii of projection lens 12c' inserted in this focusing position, the light beams reflected by corner cubes 11C can be imaged on two-dimensional light receiving device 12d disposed in a desired position. Further, by optimizing the position in which projection lens 12c is inserted, the size of the image formed on two-dimensional light receiving device 12d (the size of corner cube group image) can be set to be a desired size. Thus, finger end detection device 12' has a high degree of freedom of optical design.

Figure 13:
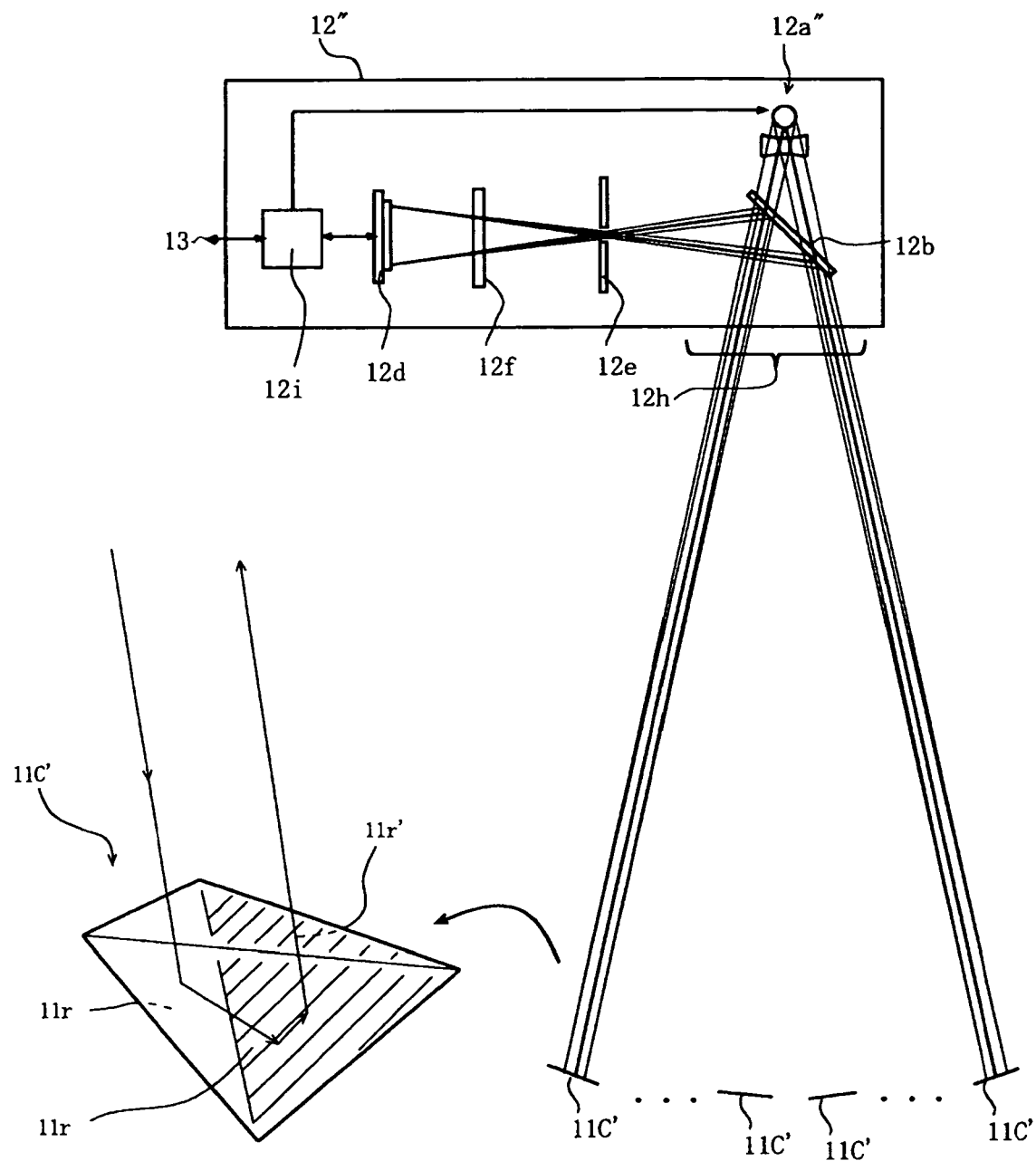
FIG. 13 is a drawing showing the configuration of finger end detection device 12" (another modification example of finger end detection device 12) and the configuration of corner cube 11C' (a modification example of corner cube 11C).

FIG. 13 shows the configuration of finger end detection device 12" and the configuration of corner cube 11C'.

In FIG. 13, the same constituent elements as those of finger end detection device 12 shown in FIG. 12 are denoted by the same reference symbols. Further, for the sake of simplicity, in FIG. 13, each of corner cubes 11C is shown as a single surface reflection surface. Still further, in FIG. 13, only the light beams that are incident on certain two corner cubes 11C are shown.

Illumination optical system 12a" of finger end detection device 12" is provided with a light source that emits an illumination light that has a high coherency and is made a parallel light beam (typically, a solid-state laser) and with a concave lens that diverges the illumination light.

Further, in this finger end detection device 12", there is no projection lens. Instead, at least one surface 11r' of corner cube 11C' is made a reflection type diffractive optical surface (DOE surface).

The illumination light beam emitting from this finger end detection device 12" becomes, at corner cubes 11C', substantially parallel light beam with a high coherency.

The wavefront of this illumination light beam is transformed at reflection type diffractive optical surface 11r'; and, thereafter, this transformed illumination light beam is, via half mirror 12b, stop 12e, and color filter 12f, incident on two-dimensional light receiving device 12d.

By merely optimizing the diffractive pattern of reflection type diffractive optical surface 11r', the image of corner cube 11C' can be imaged on two-dimensional light receiving device 12d disposed in a desired position.

Figure 14:
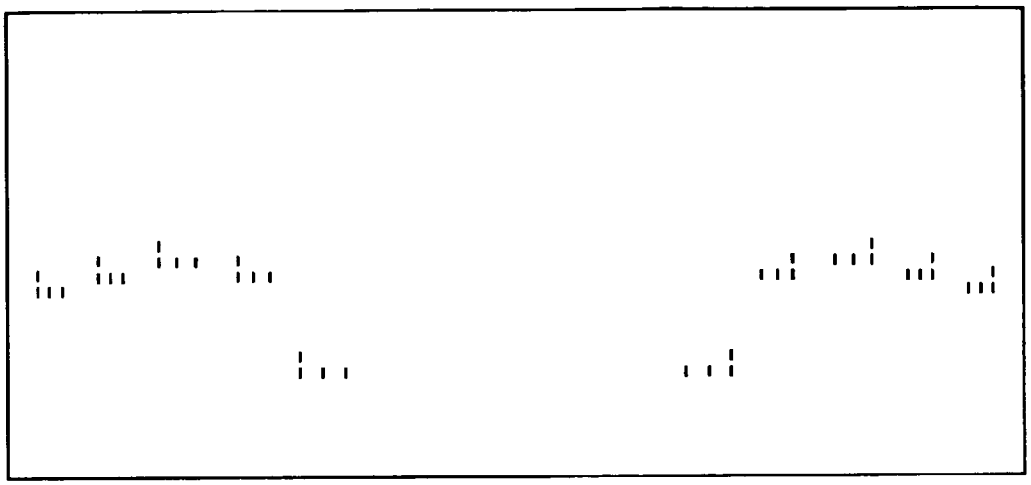
FIG. 14 is a drawing showing an example of the image of corner cube 11C'.

Further, by changing the diffractive pattern, the image of corner cube 11C' can also be made to be of a desired shape, e.g., of a rectangular shape as shown in FIG. 14.

Stated another way, by changing the diffractive pattern, the corner cube group image formed on two-dimensional light receiving device 12d can be optimized into an easily recognizable, desired shape. By doing so, main controller 13 can perform the recognition at a high speed.

Figure 15:
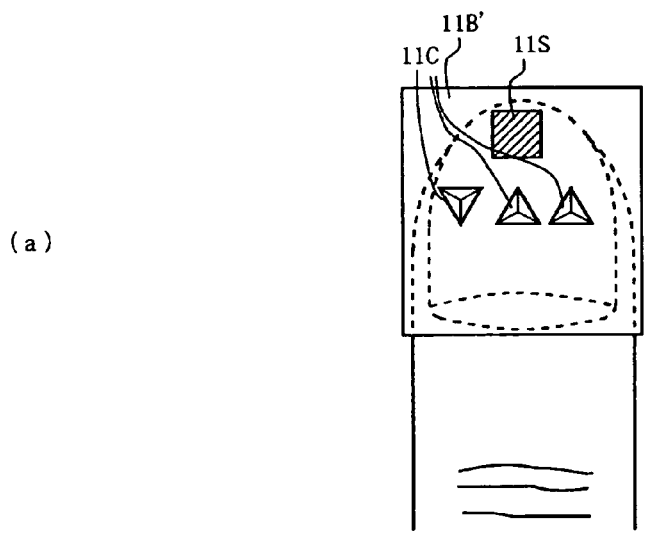
FIG. 15 is a drawing illustrating reflection element substrates 11B'.
Figure 15:
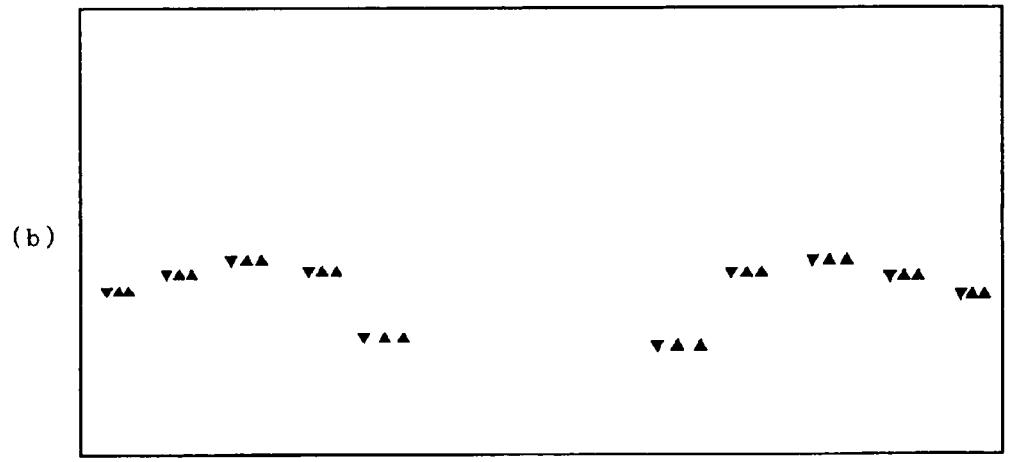

FIG. 15 illustrates reflection element substrates 11B'.

With respect to the above-described reflection element substrates 11B (see FIG. 9), differentiation is made between the number of corner cube 11C on the left side of the finger and that on the right side; in contrast, with respect to this reflection element substrates 11B', differentiation is made between the disposition orientation of corner cube 11C on the left side and that on the right side (FIG. 15(a)).

Also when, in this way, differentiation is made as to the disposition orientation, the distribution of corner cubes 11C (the distribution of reflection surfaces) on reflection element substrates 11B becomes left-right asymmetric. In this regard, the corner cube group image formed on two-dimensional light receiving device 12d in this case becomes is illustrated in FIG. 15(b).

It is to be noted that it may also be configured such that with differentiation being made between the size of corner cube 11C on the left side and that on the right side, the distribution of corner cubes 11C (the distribution of reflection surfaces) on reflection element substrates 11B is made left-right asymmetric.

Figure 16:
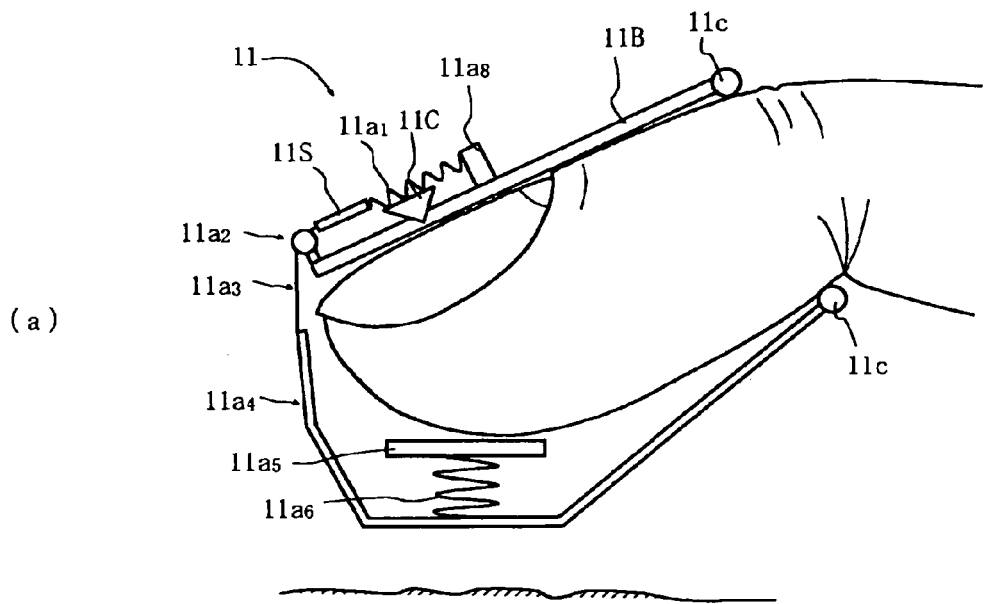
FIG. 16 an outline cross-sectional drawing showing the mechanism portion of finger clips $11_1$, $11_2$, $11_3$, $11_4$, and $11_5$.
Figure 16:
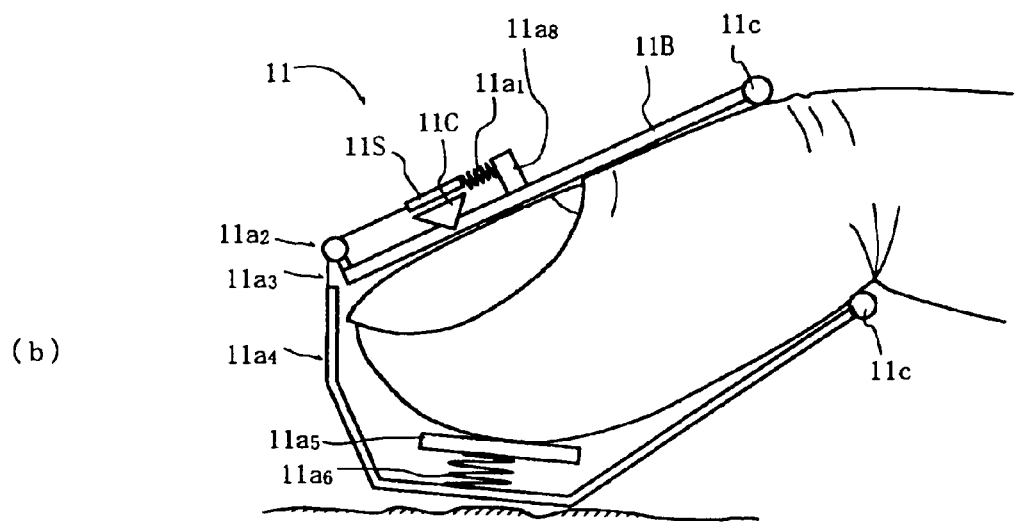

Next, the mechanism portion of finger clips $11_1$, $11_2$, $11_3$, $11_4$, and $11_5$ will be described based on FIG. 16.

FIGS. 16(a) and (b) are outline cross-sectional drawings showing the mechanism portion relating to shutter member 11S of finger clips $11_1$, $11_2$, $11_3$, $11_4$, and $11_5$. Here, since all of the right and left finger clips $11_1$, $11_2$, $11_3$, $11_4$, and $11_5$ are the same with respect to the mechanism portion, description will be made collectively (with suffixes for identification being omitted).

Finger clip 11 is provided with reflection element substrate 11B to which the above-described corner cube 11C and shutter member 11S are provided and which is placed on the fingernail side, with drive base $11a_4$ which covers the finger ball, with micro-plate-shaped contact plate $11a_5$ that is disposed between drive base $11a_4$ and the finger, with spring $11a_6$ that provided between contact plate $11a_5$ and drive base $11a_4$, etc. The expansion/contraction direction of spring $11a_6$ coincides with the direction in which the distance between drive base $11a_4$ and contact plate $11a_5$ varies.

Further, to make shutter member 11S movable, to reflection element substrate 11B are provided spring $11a_1$ and spring holding portion $11a_8$ (which are collectively referred to as "change mechanism" in the claims).

One end portion of shutter member 11S in the movement direction thereof (the direction by which corner cube 11C is shielded/released as indicated by the transition from FIG. 9 to FIG. 10, vice versa) is connected, via spring $11a_1$, to spring holding portion $11a_8$, and spring holding portion $11a_8$ is fixed on the substrate of reflection element substrate 11B. The expansion/contraction direction of spring $11a_1$ coincides with the direction in which shutter member 11S moves. Those spring $11a_1$ and spring holding portion $11a_8$ are disposed such that they do not shield corner cube 11C.

Further, the other end portion of shutter member 11S and the end portion of drive base $11a_4$ on the finger end side are connected by a mechanism constituted by pulley $11a_2$ and string-like connecting member $11a_3$. This mechanism controls the movement direction of shutter member 11S.

Further, rubber portions 11c for softly catching the base of the finger end (e.g., the vicinity of the first joint) are respectively provided on the opposite finger end side of reflection element substrate 11B and on the opposite finger end side of drive base $11a_4$. Those rubber portions 11c are biased by a stopper mechanism, described later, in the direction in which the finger is sandwiched. Thus, finger clip 11 is fixed to the finger end.

By the way, when no pressure from the outside (in the present specification, referred to as "finger pressure") is applied to the ball of the finger to which this finger clip 11 is attached, finger clip 11 is in the state shown in FIG. 16(a).

In this state, spring $11a_6$ is extended, and the distance between contact plate $11a_5$ and drive base $11a_4$ is secured to be large. In this state, the distance between drive base $11a_4$ and reflection element substrate 11B is also secured to be large, and connecting member $11a_3$ is in a state of being pulled. In addition, spring $11a_1$ is extended, and shutter member 11S is located outside corner cube 11C. (In advance, shutter member 11S is positioned in this state). Thus, corner cube 11C is released.

On the other hand, when a finger pressure is applied to the ball of the finger to which the finger clip 11 is attached, finger clip 11 is in the state shown in FIG. 16(b).

In this state, spring $11a_6$ is contracted, and the distance between contact plate $11a_5$ and drive base $11a_4$ is reduced. Since, in this state, the distance between drive base $11a_4$ and reflection element substrate 11B is also reduced, connecting member $11a_3$ is slackened. In response to this, spring $11a_1$ is contracted, and shutter member 11S is located over corner cube 11C. Thus, corner cube 11C is shielded.

Figure 17:
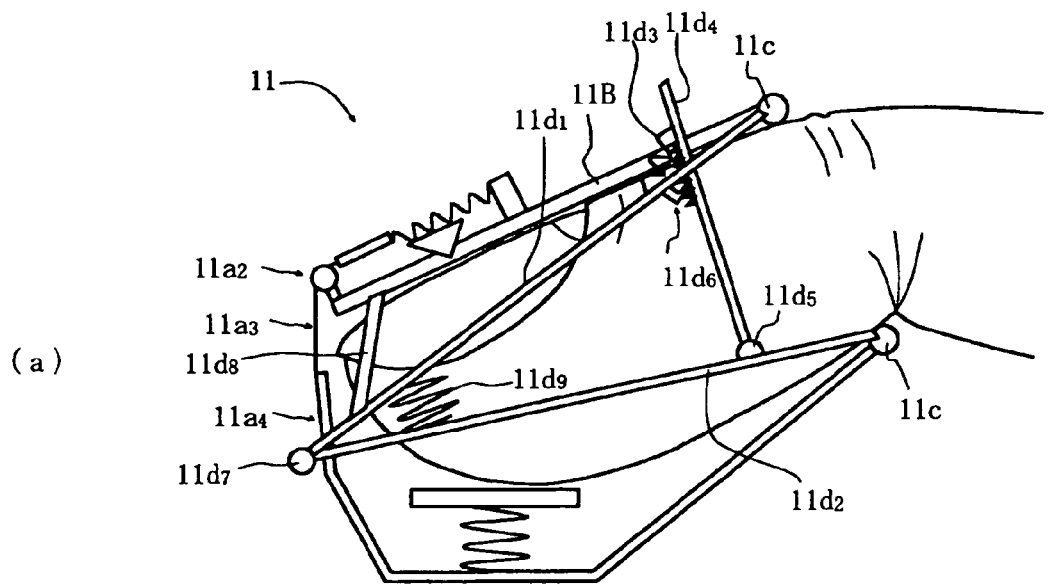
FIG. 17 an outline cross-sectional drawing showing the stopper mechanism of finger clips $11_1$, $11_2$, $11_3$, $11_4$, and $11_5$.
Figure 17:
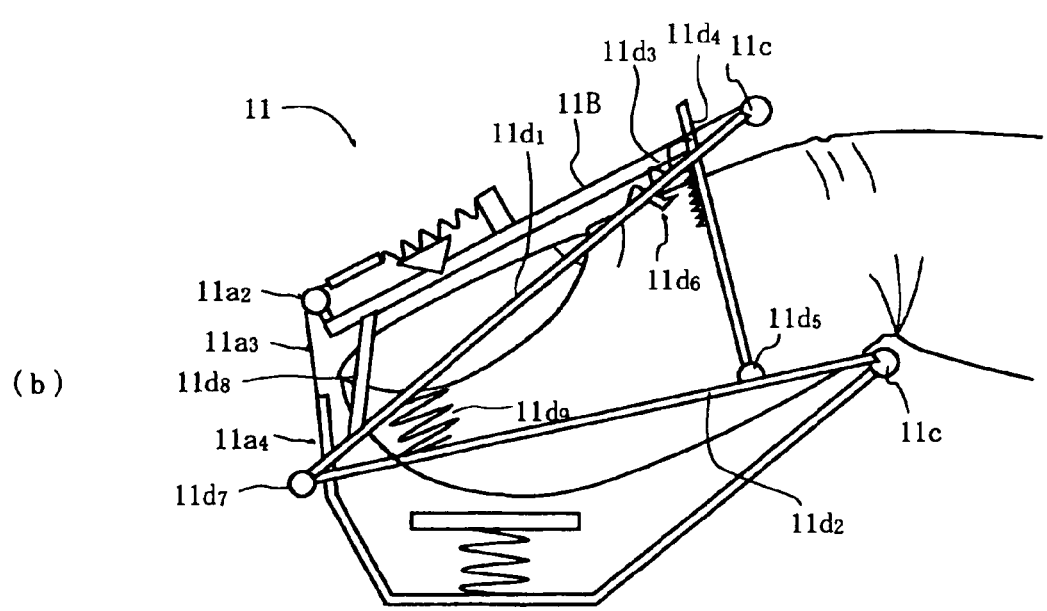

Next, the stopper mechanism of finger clips $11_1$, $11_2$, $11_3$, $11_4$, and $11_5$ will be described based on FIG. 17.

FIGS. 17(a) and (b) are outline cross-sectional drawings showing the stopper mechanism of finger clips $11_1$, $11_2$, $11_3$, $11_4$, and $11_5$. Here, since all of the finger clips $11_1$, $11_2$, $11_3$, $11_4$, and $11_5$ are the same with respect to the stopper mechanism, description will be made collectively (with suffixes for identification being omitted).

The stopper mechanism is provided with link rod $11d_1$ fixed to the rubber portion 11c on the side of reflection element substrate 11B and with link rod $11d_2$ fixed to the rubber portion 11c on the side of drive base $11a_4$.

Further, link rod $11d_1$ and link rod $11d_2$ are linked to common rotational movement shaft $11d_7$. Thus, link rod $11d_1$ and link rod $11d_2$ are rotationally movable around the rotational movement shaft $11d_7$.

Further, between link rod $11d_1$ and link rod $11d_2$ is provided spring (which corresponds to "release mechanism" in the claims) $11d_3$.

Further, a portion of link rod $11d_1$ between the linked portion thereof and the fixed portion thereof and a portion of link rod $11d_2$ between the linked portion thereof and the fixed portion thereof are linked.

In this link portion are provided stopper rod $11d_4$ that has a plurality of sawtooth micro-protrusions and key portion $11d_6$ that engages with the stopper rod $11d_4$.

Stopper rod $11d_4$ is rotationally movable around rotational movement shaft $11d_5$ that is provided to one link rod $11d_2$, among the two link rods. Key portion $11d_6$ is fixed to the other link rod $11d_1$.

Further, between stopper rod $11d_4$ and link rod $11d_1$ is provided spring $11d_3$ that is biased in the direction in which key portion $11d_6$ and the plurality of sawtooth micro-protrusions are made engaged with each other.

Further, a portion, located near rotational movement shaft $11d_7$, of link rod $11d_1$ or link rod $11d_2$ is, via nonflexible member $11d_8$, etc, fixed to the side of reflection element substrate 11B.

By the way, when to the finger end inserted into this finger clip 11 is gradually applied external force from the fingernail side and from the finger ball side, each of link rod $11d_1$ and link rod $11d_2$ rotationally moves in the direction in which the finger is gradually pinched, and key portion $11d_6$ engages, one after another, with the gaps between the micro-protrusions of stopper rod $11d_4$, one after another. When the external force halts, this movement also halts. At this time, finger clip 11 comes to be in the state of FIG. 17(a). Thus, by applying the external force and then halting it at an appropriate position of the finger, the operator can attach finger clip 11 to the finger with a desired strength (loosely or tightly, as desired).

In contrast, when external force is applied to stopper rod $11d_4$ of the finger clip 11 in the direction in which the engagement with key portion $11d_6$ is released, the link rods $11d_1$ and $11d_2$ rotationally move in the direction in which the finger is loosened. At this time, finger clip 11 comes to be in the state of FIG. 17(b). Thus, the operator can detach the finger from finger clip 11.

In short, by applying external force of an appropriate strength from an appropriate direction, finger clip 11 can be attached to or detached from the finger, as desired.

By the way, since the finger clip 11 attached to the finger end is small, it is highly likely to be lost or damaged during the attaching or detaching thereof.

In view of this, in the information inputting device of the present invention, for each finger's finger clip 11 are prepared dedicated storage pits (which correspond to "storage pit" in the claims) $17R_1$, $17R_2$, $17R_3$, $17R_4$, $17R_5$, $17L_1$, $17L_2$, $17L_3$, $17L_4$, and $17L_5$, respectively.

Next, storage pits $17R_1$, $17R_2$, $17R_3$, $17R_4$, $17R_5$, $17L_1$, $17L_2$, $17L_3$, $17L_4$, and $17L_5$ will be described based on FIG. 18.

Figure 18:
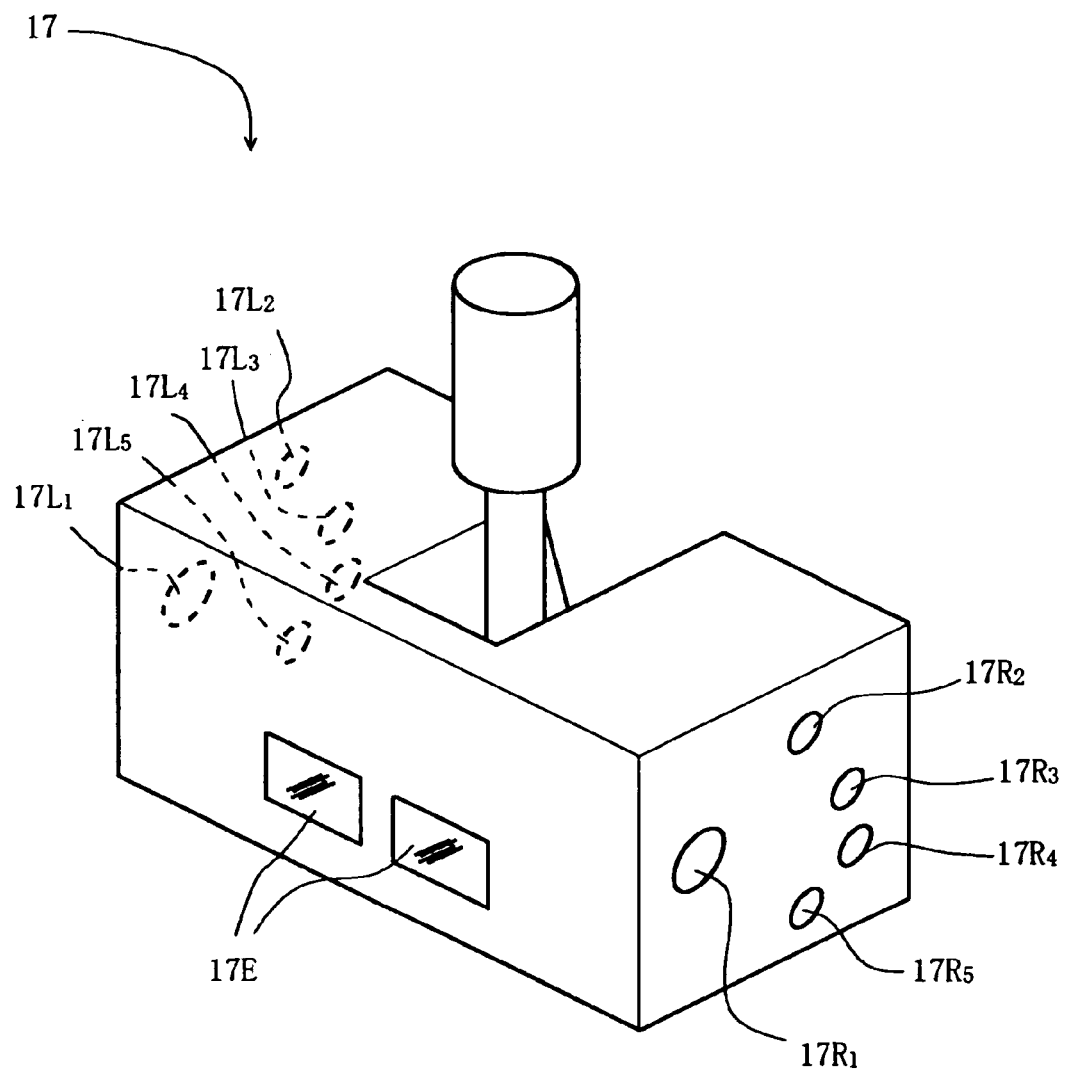
FIG. 18 is a drawing showing the positions where storage pits $17R_1$, $17R_2$, $17R_3$, $17R_4$, $17R_5$, $17L_1$, $17L_2$, $17L_3$, $17L_4$, and $17L_5$ of finger clips $11_1$, $11_2$, $11_3$, $11_4$, and $11_5$ are formed.

As shown in FIG. 18, storage pits $17R_1$, $17R_2$, $17R_3$, $17R_4$, $17R_5$, $17L_1$, $17L_2$, $17L_3$, $17L_4$, and $17L_5$ are provided on the side faces of display 17.

By doing so, no space is required to be additionally prepared. Further, since the position of display 17 can be changed at will, the position of storage pits $17R_1$, $17R_2$, $17R_3$, $17R_4$, $17R_5$, $17L_1$, $17L_2$, $17L_3$, $17L_4$, and $17L_5$ also becomes freely changeable.

Since finger clips $11_1$, $11_2$, $11_3$, $11_4$, and $11_5$ are prepared for each of the right and left hands, storage pits $17R_1$, $17R_2$, $17R_3$, $17R_4$, and $17R_5$ that separately stores finger clips $11_1$, $11_2$, $11_3$, $11_4$, and $11_5$ for the right hand are provided on the right side face of display 17 as viewed from the operator, and storage pits $17L_1$, $17L_2$, $17L_3$, $17L_4$, and $17L_5$ that separately stores finger clips $11_1$, $11_2$, $11_3$, $11_4$, and $11_5$ for the left hand are provided on the left side face of display 17 as viewed from the operator.

As shown in FIG. 18, the positional relationship of the right side storage pits $17R_1$, $17R_2$, $17R_3$, $17R_4$, and $17R_5$ and the positional relationship of the left side storage pits $17L_1$, $17L_2$, $17L_3$, $17L_4$, and $17L_5$ correspond to the positional relationship between the fingers when the operator holds display 17 with the right and left hands from both sides. With these positional relationships being set, the operator can attach to (or detach from) the right and left hands the pair of finger clips $11_1$, $11_2$, $11_3$, $11_4$, and $11_5$ when the operator set the position of display 17 in the best position (or remove display 17 from the best position) with the right and left hands.

Next, the structure of each of storage pits $17R_1$, $17R_2$, $17R_3$, $17R_4$, $17R_5$, $17L_1$, $17L_2$, $17L_3$, $17L_4$, and $17L_5$ will be described based on FIG. 19. Here, since while storage pits $17R_1$, $17R_2$, $17R_3$, $17R_4$, $17R_5$, $17L_1$, $17L_2$, $17L_3$, $17L_4$, and $17L_5$ differ in size from each other, they do not differ in mechanism, description will be made collectively (with reference symbol 17RL being attached thereto).

Figure 19:
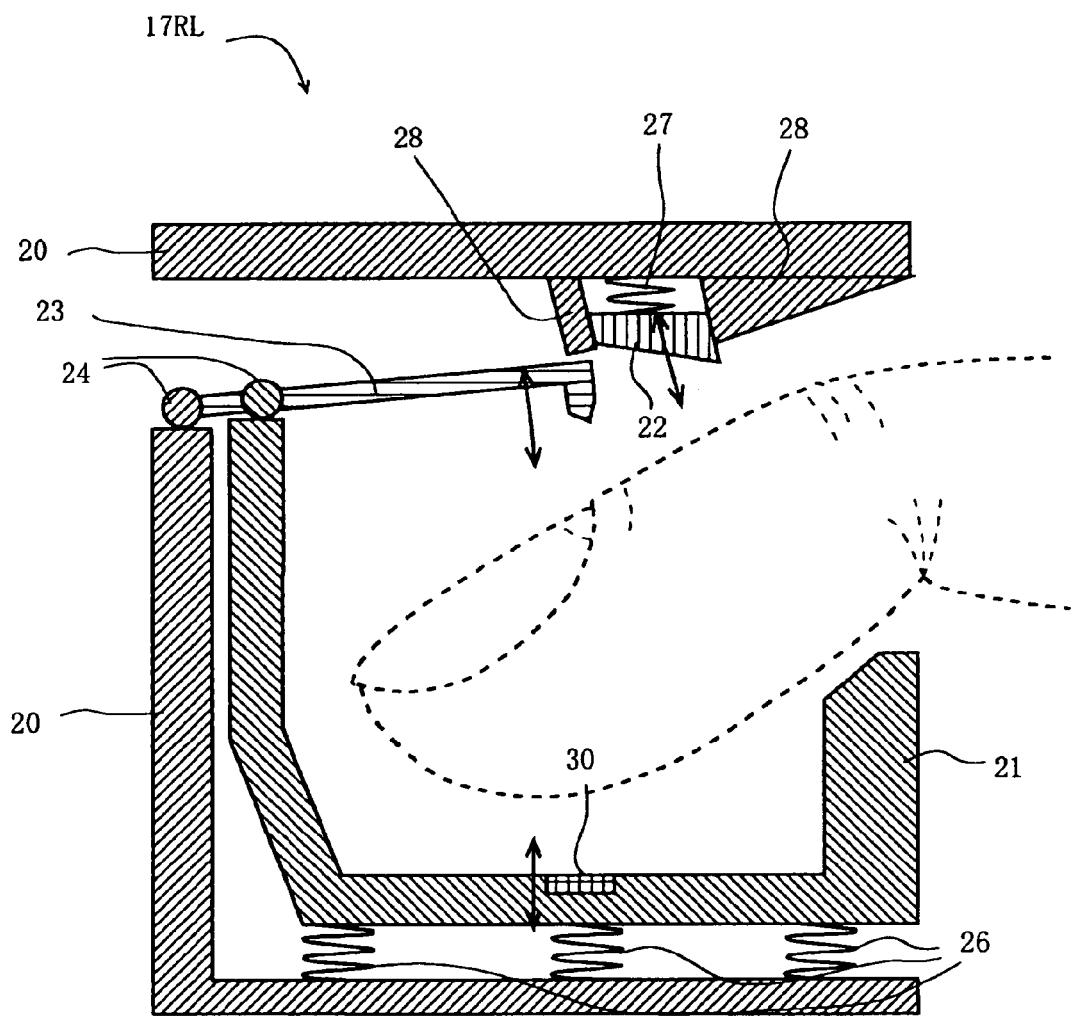
FIG. 19 is an outline cross-sectional drawing showing storage pits $17R_1$, $17R_2$, $17R_3$, $17R_4$, $17R_5$, $17L_1$, $17L_2$, $17L_3$, $17L_4$, and $17L_5$.

FIG. 19 is an outline cross-sectional drawing of storage pit 17RL. Note that in FIG. 19, the members fixed with each other are filled in with the same diagonal lines.

Storage pit 17RL has a space that surrounds the finger end (the dotted line portion in FIG. 19) to which finger clip 11 is attached, and the entirety of the storage pit is embedded in the side face of display 17. In FIG. 19, reference symbol 20 denotes the wall fixed on the side of display 17.

Inside of wall 20 are disposed drive chamber 21 that covers the finger over the portion ranging from its ball side portion to its end portion, rod-shaped lever type presser member 23 for pressing the finger from the fingernail side, release member 22 that protrudes in the vicinity of the entrance/exit portion for the finger, etc. Among these constituent elements, drive chamber 21 and lever type presser member 23 constitute a portion of the means for attaching finger clip 11 to the finger, and release member 22 constitutes a portion of the means for detaching the finger from finger clip 11.

Between the wall 20 on the finger ball side and drive chamber 21 is provided springs 26 that expands and contracts in the direction in which the distance between the wall 20 and drive chamber 21 is elongated or shortened. Thus, this drive chamber 21 moves, in accordance with external force applied from the finger ball, in the direction (the arrow direction in the drawing) in which the space of storage pit 17RL is increased or decreased.

Further, lever type presser member 23 is capable of lever motion, with rotational movement shaft 24 provided on the finger end side portion of drive chamber 21 and rotational movement shaft 24 provided on the finger end side portion of wall 20 being the fulcrum and the force point.

Accordingly, when external force is applied from the finger ball side, drive chamber 21 moves; consequently, the position of the rotational movement shaft 24 provided on the finger end side portion of drive chamber 21 shifts; as a result of, lever type presser member 23 presses the finger from the fingernail side in the arrow direction in the drawing.

Further, between the wall 20 on the fingernail side and release member 22 is provided spring 27. Further, to this wall 20 is provided guide member 28 that restricts the movement direction of release member 22 due to the expansion and contraction of spring 27 to the arrow direction in the drawing (the direction in which release member 22 increases/decreases the size of the entrance portion of storage pit 17RL).

When no external force is applied to this release member 22, it protrudes from wall 20 by a predetermined amount. When external force is applied to release member 22 from the outside of storage pit 17RL toward the inside thereof, release member 22 keeps the state of protrusion; when external force is applied to release member 22 from the inside of storage pit 17RL toward the outside thereof, release member 22 is, in accordance with that external force, stored toward the side of wall 20. To enable such movement, the outer shape is so shaped as shown in the drawing (is provided with a slant surface and s step portion).

Further, drive chamber 21 is provided with sensor (which corresponds to "detection means" in the claims) 30 that detects whether finger clip 11 is stored. Output signals from sensor 30 are inputted to main controller 13 (see FIG. 1).

Through the output signals from each sensor 30 that is individually provided to each of the right and left storage pits $17R_1$, $17R_2$, $17R_3$, $17R_4$, $17R_5$, $17L_1$, $17L_2$, $17L_3$, and $17L_5$, main controller 13 can individually recognize whether each of the finger clips $11_1$, $11_2$, $11_3$, $11_4$, and $11_5$ that are to be attached to the right and left hands is stored.

Figure 20:
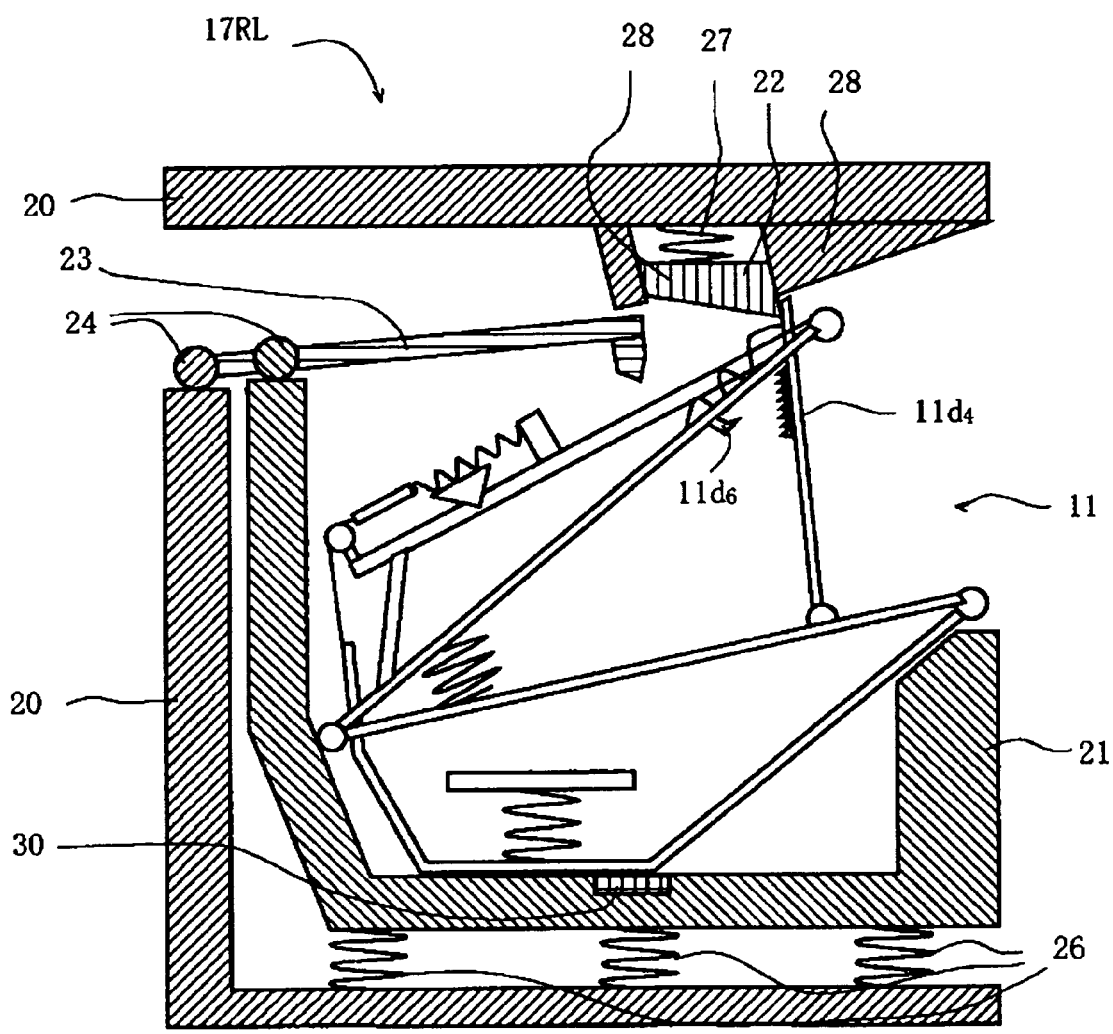
FIG. 20 is an outline cross-sectional drawing illustrating the operation of storage pits $17R_1$, $17R_2$, $17R_3$, $17R_4$, $17R_5$, $17L_1$, $17L_2$, $17L_3$, $17L_4$, and $17L_5$ (at the time of storage).
Figure 21:
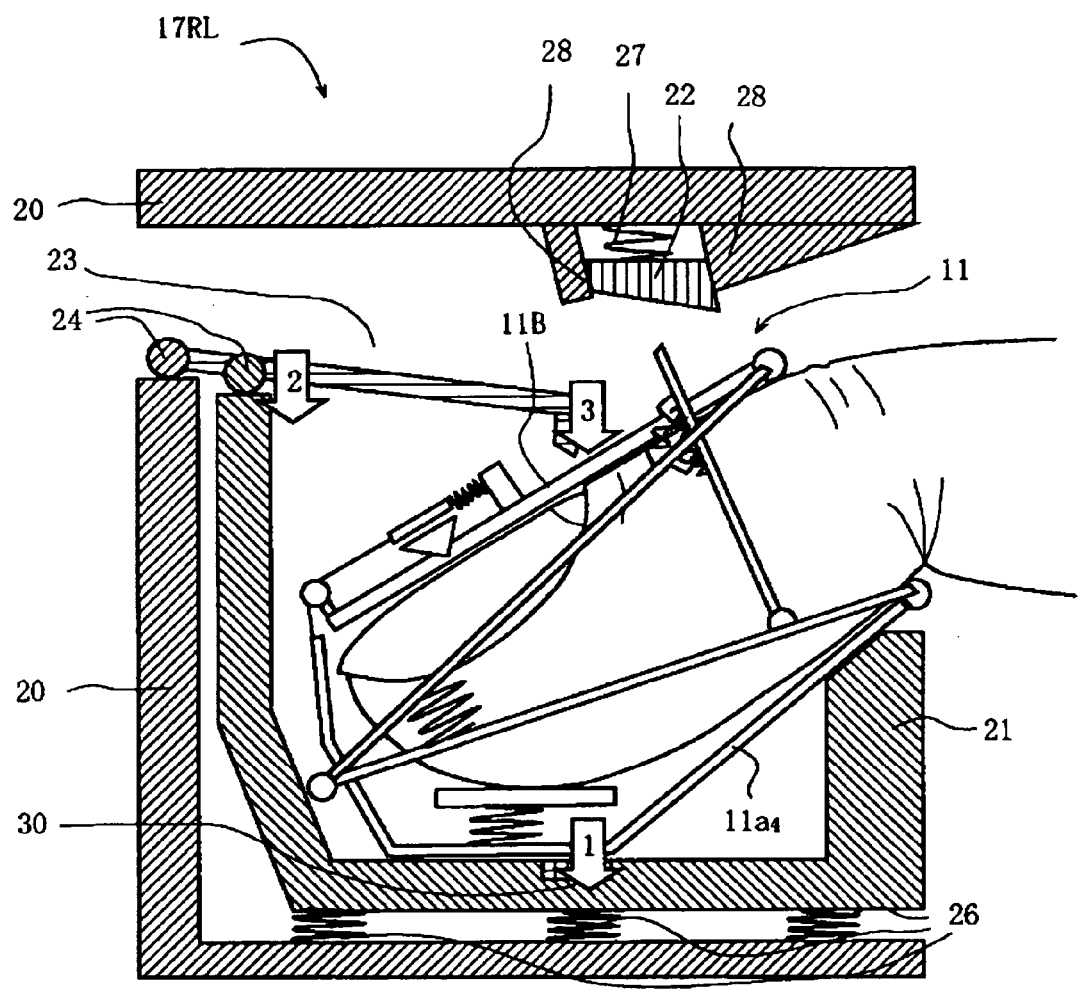
FIG. 21 is an outline cross-sectional drawing illustrating the operation of storage pits $17R_1$, $17R_2$, $17R_3$, $17R_4$, $17R_5$, $17L_1$, $17L_2$, $17L_3$, $17L_4$, and $17L_5$ (at the time of attaching).
Figure 22:
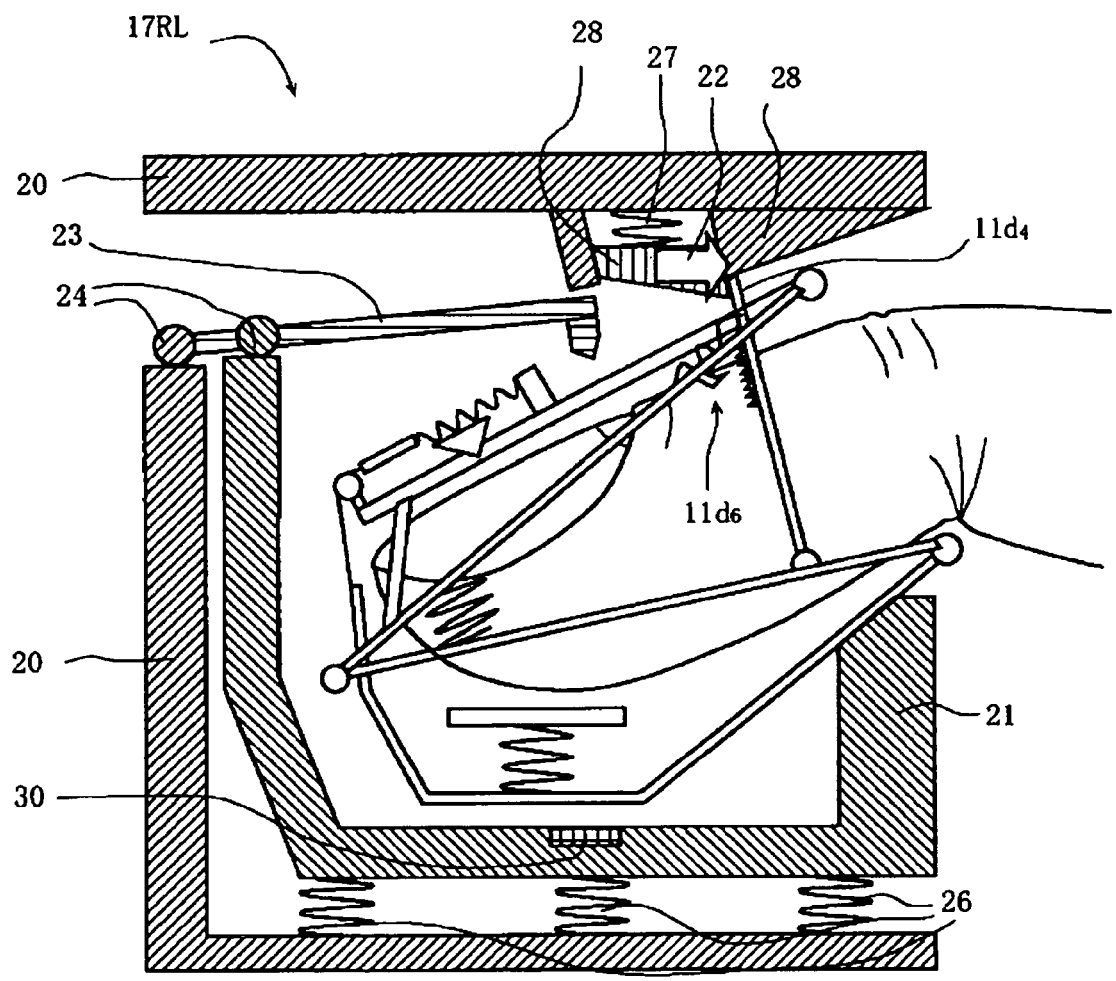
FIG. 22 is an outline cross-sectional drawing illustrating the operation of storage pits $17R_1$, $17R_2$, $17R_3$, $17R_4$, $17R_5$, $17L_1$, $17L_2$, $17L_3$, $17L_4$, and $17L_5$ (at the time of detaching).
Figure 23:
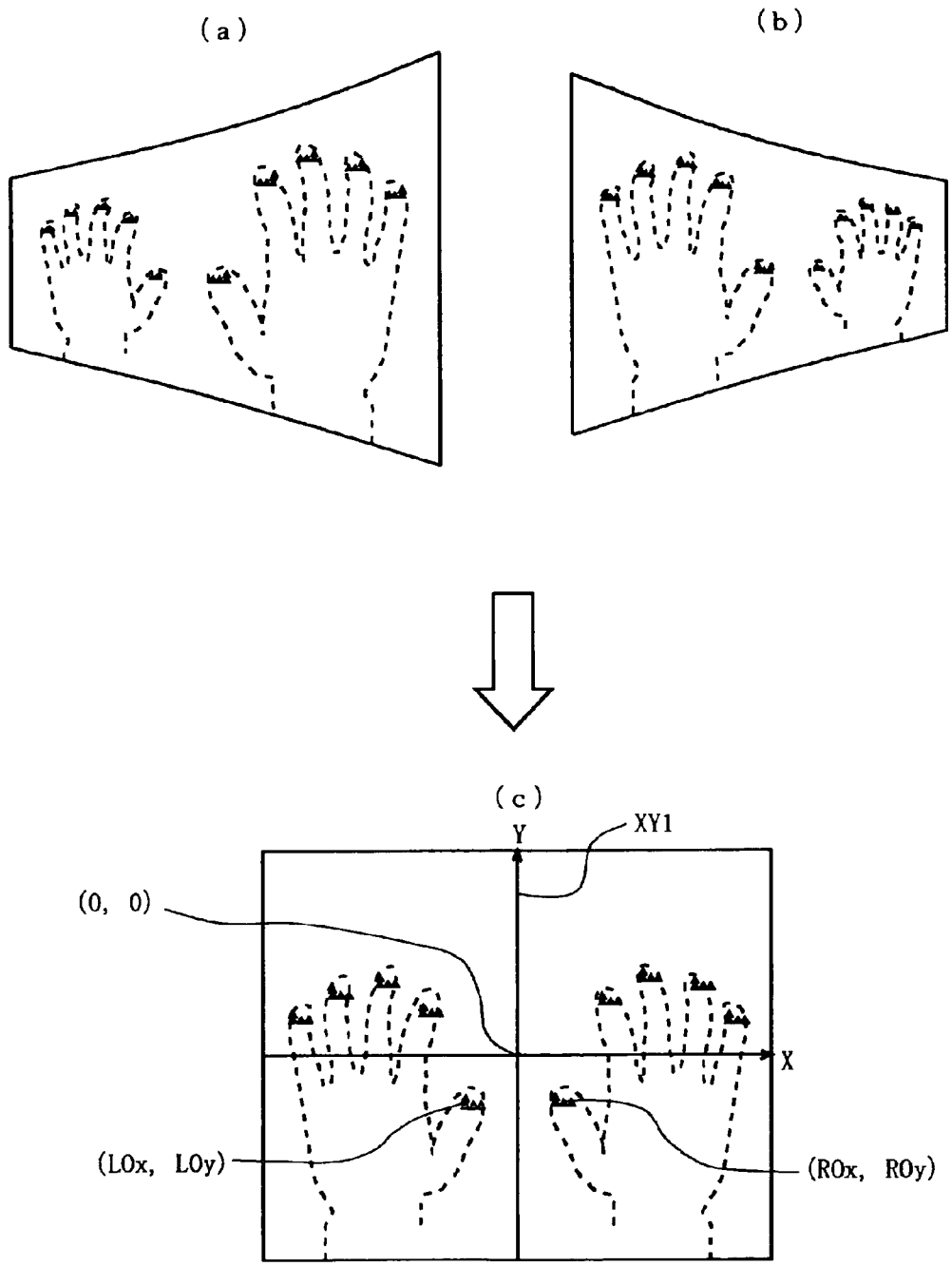
FIG. 23 is a drawing illustrating a main process executed by main controller 13 (distortion correction).

Next, the operation of this storage pit 17RL will be described based on FIGS. 20-22. FIG. 20, FIG. 21, and FIG. 22 respectively show the state at the time of storage in which storage pit 17RL stores finger clip 11, the state at the time of attaching in which storage pit 17RL attaches finger clip 11 to the finger, and the state at the time of detaching in which storage pit 17RL detaches finger clip 11 from the finger.

As shown in FIG. 20, at the time of storage, the engagement between stopper rod $11d_4$ and key portion $11d_6$, both of finger clip 11, is released. (There is also the case where stopper rod $11d_4$ is in contact with the slant portion of release member 22.)

As shown in FIG. 21, at the time of attaching, the finger is inserted into finger clip 11 stored in storage pit 17RL, and, thereafter, external force is applied from the finger ball in the direction of blank arrow 1. At this time, drive chamber 21, springs 26, and rotational movement shaft 24 move in the manner as indicated by blank arrow 2, and lever type presser member 23 presses, in the manner as indicated by blank arrow 3, the substrate of reflection element substrate 11B of finger clip 11. At this time, drive base $11a_4$ of finger clip 11 is pushed back due to the reaction force from the side of drive chamber 21 and wall 20. Thus, the finger is sandwiched between the substrate of reflection element substrate 11B of finger clip 11 and drive base $11a_4$; stopper rod $11d_4$ and key portion $11d_6$ engages with each other at an appropriate position; and thus, finger clip 11 is attached to the finger.

In addition, since while when the finger to which finger clip 11 is attached is extracted from storage pit 17RL, external force works on the slant surface of release member 22 from stopper rod $11d_4$ of finger clip 11, release member 22 is stored toward the side of wall 20 in accordance with the external force, finger clip 11 can be extracted to the outside along with the finger without any resistance.

As shown in FIG. 22, at the time of detaching, the finger to which finger clip 11 is attached is inserted into storage pit 17RL. Since, at this time, stopper rod $11d_4$ of finger clip 11 comes into contact against the step portion of release member 22, the engagement between stopper rod $11d_4$ and key portion $11d_6$ is, with release member 22 being an obstacle, released (as indicated by blank arrow), and thus finger clip 11 detaches from finger.

Thereafter, when the finger is inserted into the penetralia of storage pit 17RL, the end of stopper rod $11d_4$ detaches from the step portion of release member 22 and comes into contact against the slant portion, and the elastic force of spring 27 holds down stopper rod $11d_4$. When the finger is extracted in this state, only the finger clip 11 remains in storage pit 17RL. This state of remaining is the state at the time of storage of FIG. 20.

It is to be noted that the disposition angle relative to display 17 of each of the above-described right and left storage pits $17R_1$, $17R_2$, $17R_3$, $17R_4$, $17R_5$, $17L_1$, $17L_2$, $17L_3$, $17L_4$, and $17L_5$ is set such that drive chamber 21 is positioned to the side of each finger ball.

With the disposition angles being optimized in this manner, the operator can, only by individually inserting each of the right and left fingers to which finger clips $11_1$, $11_2$, $11_3$, $11_4$, and $11_5$ are not attached into each of storage pits $17R_1$, $17R_2$, $17R_3$, $17R_4$, $17R_5$, $17L_1$, $17L_2$, $17L_3$, $17L_4$, and $17L_5$ and by performing the actions of clenching each of the right and left hands, attach the right and left finger clips $11_1$, $11_2$, $11_3$, $11_4$, and $11_5$ to the fingers all at once.

Further, the operator can, only by inserting each of the right and left fingers to which finger clips $11_1$, $11_2$, $11_3$, $11_4$, and $11_5$ are attached into each of storage pits $17R_1$, $17R_2$, $17R_3$, $17R_4$, $17R_5$, $17L_1$, $17L_2$, $17L_3$, $17L_4$, and $17L_5$, detach those finger clips $11_1$, $11_2$, $11_3$, $11_4$, and $11_5$ from the fingers all at once.

As described above, by utilizing storage pits $17R_1$, $17R_2$, $17R_3$, $17R_4$, $17R_5$, $17L_1$, $17L_2$, $17L_3$, $17L_4$, and $17L_5$, the handling of finger clips $11_1$, $11_2$, $11_3$, $11_4$, and $11_5$ is facilitated.

By the way, if dust adheres to the above-described mechanisms and finger clips $11_1$, $11_2$, $11_3$, $11_4$, and $11_5$ provided with corner cube 11C, there arises the possibility that those mechanisms' movements worsen or the optical characteristics of corner cube 11C worsen. To address this problem, it is preferable that the rotational movement portions of the mechanism and corner cube 11C are protected by, e.g., covers having transparency (covers having transparency at least relative to the light source wavelength of finger end detection device 12) for preventing the operator's hands, etc. from coming into contact with the rotational movement portions of the mechanism and corner cube 11C.

Next, main processes executed by main controller 13 (see FIG. 1) will be described based on FIGS. 23-27.

As described earlier, main controller 13 recognizes the key touch actions and pointing actions of the operator based on the output signals from finger end detection device 12 (which are output signals from two-dimensional light receiving device 12d and will be hereinafter referred to as "acquired image").

First, since the illumination angle by finger end detection device 12 is inclined, distortion is present in the corner cube group image represented by the acquired image, as shown in FIGS. 23(a) and 23(b). (Note that the dotted line portions are hands' contours as inferred from the corner cube group image.)

As shown in FIG. 23(c), main controller 13 transforms the acquired image so that the distortion is corrected. It is to be noted that instead of performing this transformation, the distortion may be corrected, by inclining two-dimensional light receiving device 12d.

Further, main controller 13 recognizes the corner cube group image on the acquired image through coordinate system XY1 on the acquired image.

Further, main controller 13 recognizes the position of each finger based on the corner cube group image on the acquired image. Here, since all of the fingers are not necessarily attached with finger clip 11, main controller 13 recognizes, based on the image thereof, the kinds of fingers to which finger clip 11 is attached.

In addition, based on the output signals from each sensor 30 (see FIG. 19) individually provided to each of storage pits $17R_1$, $17R_2$, $17R_3$, $17R_4$, $17R_5$, $17L_1$, $17L_2$, $17L_3$, $17L_4$, and $17L_5$ (see FIG. 18), main controller 13 recognizes the kinds of finger clip 11, among the right and left finger clips 11$_1$, 11$_2$, 11$_3$, 11$_4$, and 11$_5$, in a state of not being stored, i.e., the kinds of fingers that are supposed to be attached with finger clip 11.

Main controller 13 compares the kinds of finger recognized based on the corner cube group image with the kinds of finger recognized based on the output signals from sensors 30 and, when the comparison indicates discrepancy between the former kinds and the latter kinds, notifies the operator of warning information in some way or another (for example, by producing voice information directed to headphones 17H or by displaying image or character information on display 17).

Through this notification, the operator can recognize loss of finger clip 11, attaching error of finger clip 11, etc.

Subsequently, at the time when the former kinds and the latter kinds coincide with each other or at the time when the operator approves, main controller 13 proceeds to the next process.

In the next process, the position (LOx, LOy) of a specified finger end of the left hand (hereinafter, the finger end of thumb), the position (ROx, ROy) of a specified finger end of the right hand (hereinafter, the finger end of thumb), and the positions of the other finger ends are respectively recognized through coordinate system XY1 on the acquired image. (Note that while the distance on coordinate system XY1 between the right and left hands is illustrated to be narrow in FIG. 23, this distance, actually, becomes a distance that corresponds to the distance between the right and left hands of operator.)

Figure 24:
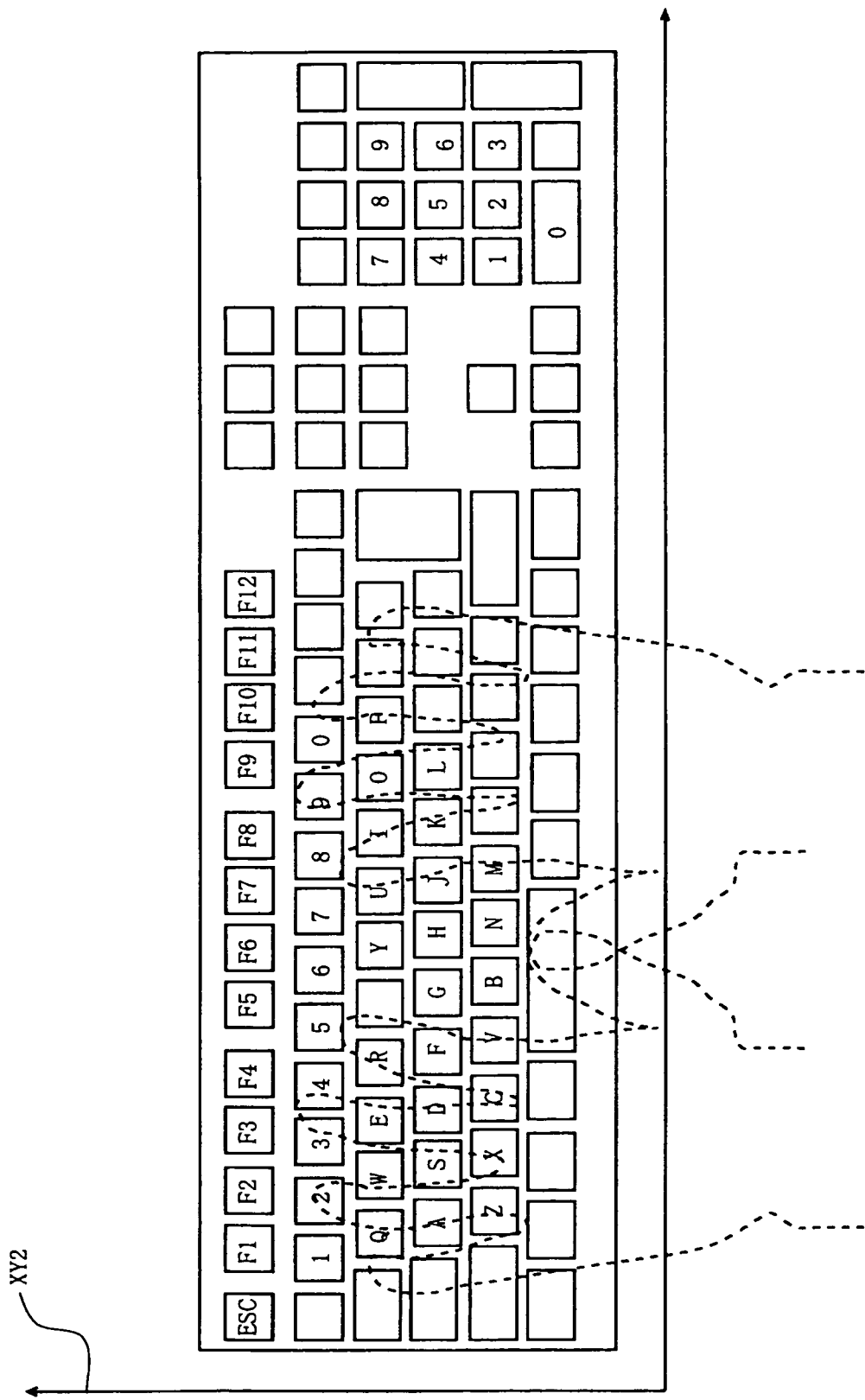
FIG. 24 is a drawing illustrating a main process executed by main controller 13 (hands' contours image display).

Further, main controller 13, after coordinate-transforming each of these positions into each of position coordinates of coordinate system XY2 on the display image of display 17, generates a finger end image indicating the position of each of the right and left finger ends (hereinafter, referred to as "hand contours images") and displays it on the display image in real time as shown in FIG. 24. Note that while a computer image and a keyboard image are displayed on the display image, only the keyboard image is shown in FIG. 24.

In displaying the hand contours images, main controller 13 coordinate-transforms the position of each of the finger end of the left hand on the acquired image by means of a transforming formula by which the position (LOx, LOy) of the thumb of the left hand on the acquired image is transformed into the position coordinates of the space key of the keyboard image on the display image. Further, main controller 13 coordinate-transforms the position of each of the finger end of the right hand on the acquired image by means of a transforming formula by which the position (ROx, ROy) of the thumb of the right hand on the acquired image is transformed into the position coordinates of the space key of the keyboard image on the display image.

It is to be noted that with regard to this coordinate transformation method, in addition to the method in which the transforming formulas are actually applied to the coordinates to calculate the resultant transformed coordinate, a method in which look-up tables storing the correspondence relationships between the coordinates of before and after the transformations are prepared and in which the look-up tables are, with each coordinate being an argument, referenced may be applied, for example.

As a result, when the operator moves the right and left hands, the hand contours images on the display image also move to each of the positions whose reference positions are respectively the positions of the thumbs of the right and left hands at each time. At this time, the displayed positions of the finger ends of the right and left thumbs always coincide with the space key position.

With the hand contours images being displayed in real time, the operator can feel realistically the movement of each of the fingers of the right hand and the movement of each of the fingers of the left hand by only viewing display 17, without actually viewing the real hand regions.

It is to be noted that in these transformations may be, if necessary, included the above-described transformation for distortion correction. Further, in these transformations may be included a transformation for the magnification adjustment between the coordinate system XY1 on the acquired image and the coordinate system XY2 on the display image.

Furthermore, main controller 13 monitors whether there is a finger pressure on each finger end based on the corner cube group image on the acquired image; when a finger pressure is applied to any one of the fingers, memorizes the transforming formulas (or look-up tables) being used at the time of the application; and, irrespective of the positions of the right and left thumbs, continues to use the transforming formulas (or look-up tables).

Accordingly, after the finger pressure application, when the operator moves the right and left hands, the hand contours images on the display image move to each of the positions whose reference positions are respectively the positions of the thumbs of the right and left hands at the time of the application. At this time, the displayed positions of all the finger ends including those of the right and left thumbs move in response to the movements of those finger ends.

In other words, by locating the respective positions of the thumbs of the right and left hands in which key touch actions can be performed most relaxedly and by performing, at the time when each position is established, an action to push any one of the keys, the operator can thereafter perform key touch actions in the vicinities of the positions. Thus, the operator can set at will the distance between the right and left hands.

Figure 25:
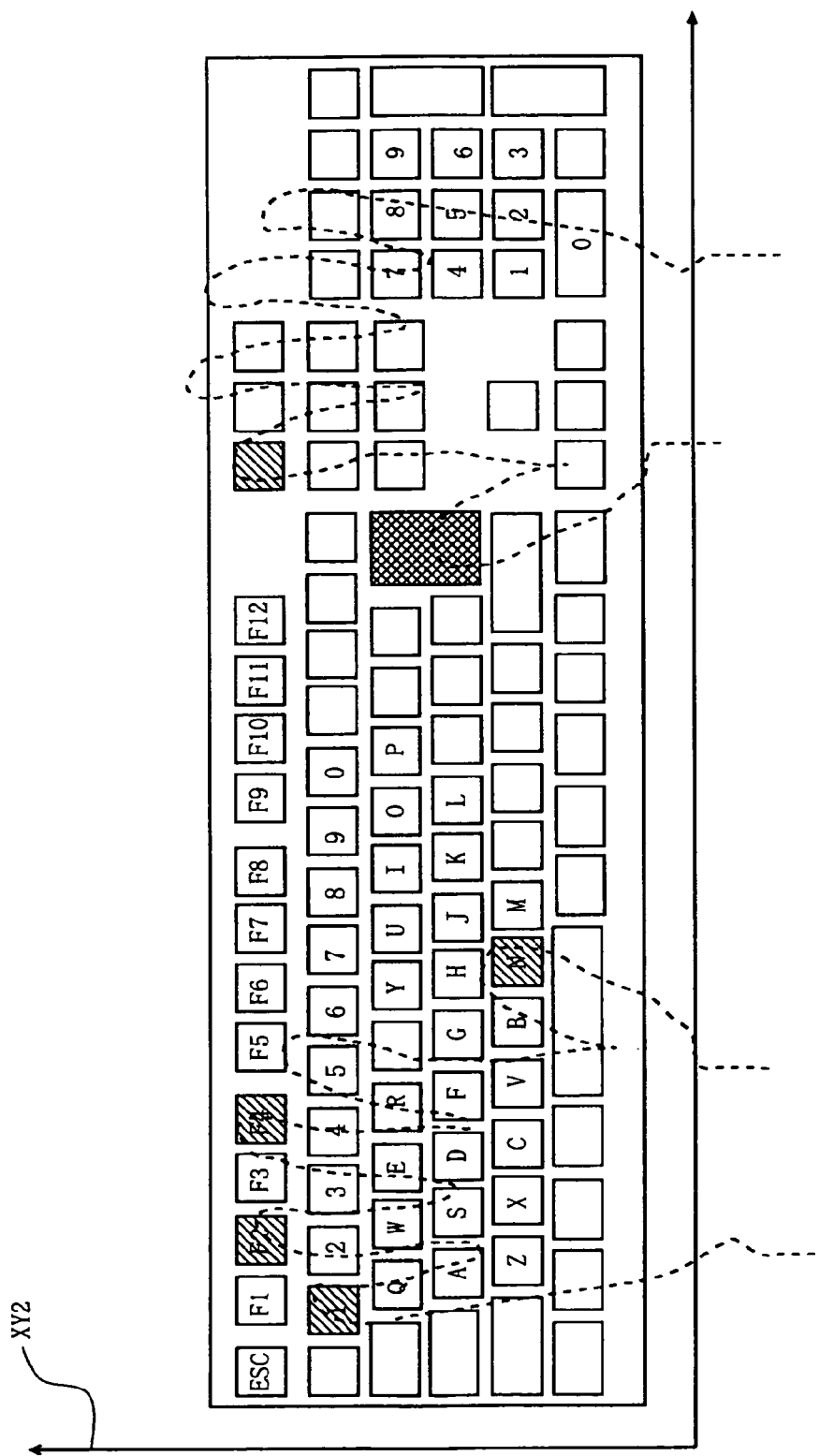
FIG. 25 is a drawing illustrating a main process executed by main controller 13 (color display switching).

Further, when finger ends on the display image overlap with any one of the keys, main controller 13 changes the color of the overlapping keys (in the case of FIG. 25, the keys with which the left hand's thumb, middle finger, ring finger, and little finger and the right hand's thumb and index finger respectively overlap). Further, a finger pressure is applied to any one of the fingers, main controller 13 further changes the color of the key with which the finger overlaps. (In FIG. 25, the condition in which the color of the enter key has further changed is shown.) And, main controller 13 inputs, at the same timing as the finger pressure, the key code to the keyboard ports of computer 2.

Thus, by placing the right and left hands in a manner by which the operator can be most relaxed and then only by performing key touch actions, the operator can input desired information to computer 2.

Next, the recognition method of the corner cube group image, the method for recognizing whether there is a finger pressure exists, and the method for recognizing the kind of a finger, each executed by main controller 13, will be described based on FIG. 26.

In the lower portion of FIG. 26(a) is shown a corner cube group image (with a finger pressure) formed in a portion of two-dimensional light receiving device 12d; In the upper portion FIG. 26(a) is shown the output signals of two-dimensional light receiving device 12d at that time. A certain line $L_i$ on two-dimensional light receiving device 12d and the output signal $S_i$ from that line $L_i$ are attached with the same subindex "i" (i=1, 2, 3, 4, 5).

Figure 26:
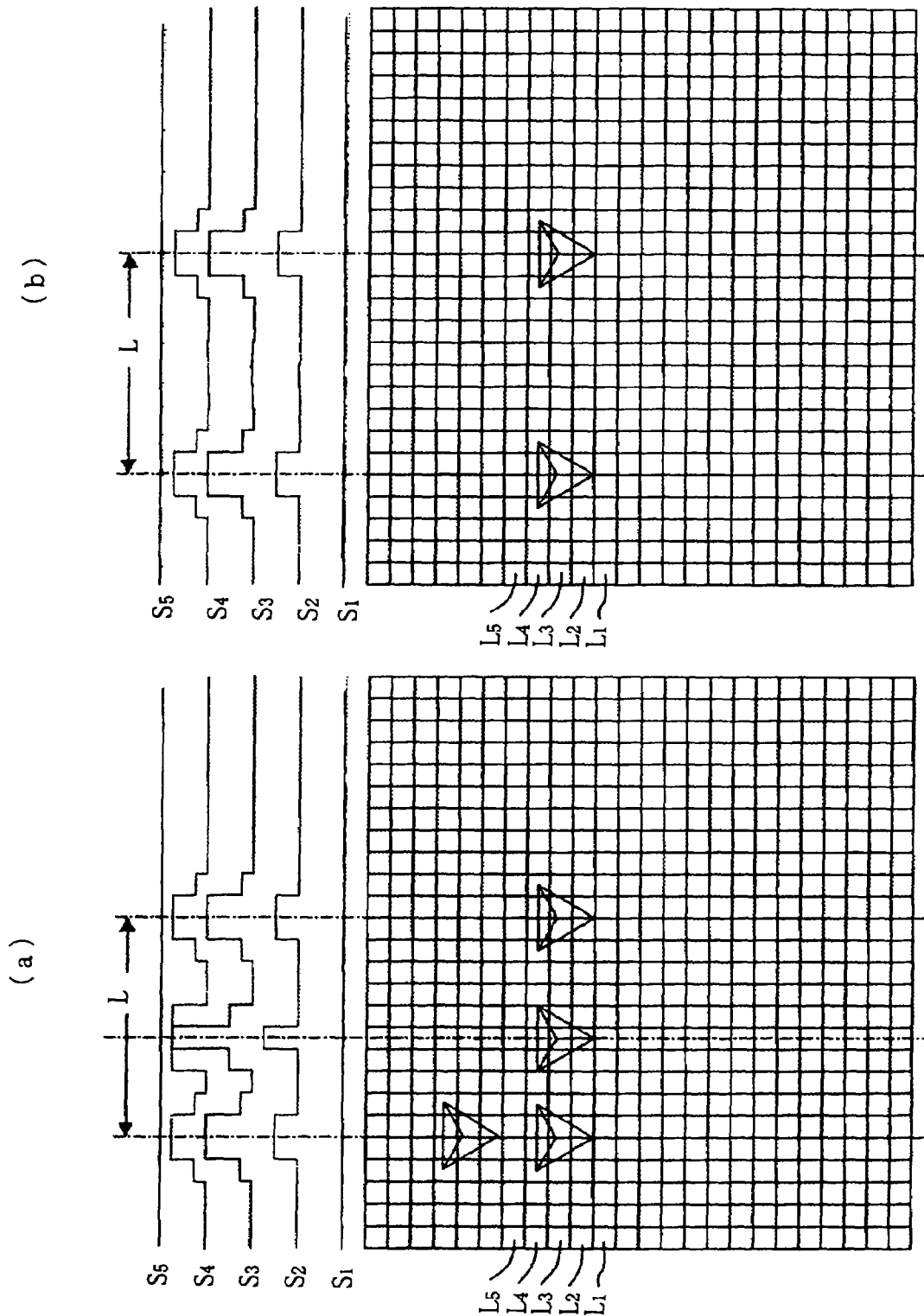
FIG. 26 is a drawing illustrating a recognition method of an image of corner cubes 11C, a method for recognizing whether there is a finger pressure exists, and a method for recognizing the kind of a finger, each executed by main controller 13.

As clearly seen from the lower portion of FIG. 26, the pixel pitch (pixel layout interval) on finger end detection device 12 is made sufficiently dense compared with the image size of a single corner cube 11C. At least, the pixel pitch is smaller than the image width of corner cube 11C.

Under this pixel pitch, it can be assuredly recognized from output signals $S_1$, $S_2$, $S_3$, $S_4$, and $S_5$ that three corner cubes 11C are disposed in the lateral direction. Furthermore, from those output signals $S_1$, $S_2$, $S_3$, $S_4$, and $S_5$, the shape of each corner cube 11C, the width of corner cube 11C, etc. can also be recognized.

Those recognitions can be implemented with ease through a program in which a threshold is set to the output signal values from the respective pixels of two-dimensional light receiving device 12d (i.e., the intensity of the light incident on two-dimensional light receiving device 12d).

In this regard, since, in this embodiment, for example, the illumination beam's illumination direction relative to corner cube 11C is inclined, the intensity of the first-order component superposed on each pixel signal is large, and thus it is difficult to apply a noise reducing method in which all of the pixel signals are averaged. In addition, to display the hand contours images in real time, the recognition thereof is required to be speeded up. Thus, the following method is preferably adopted.

Main controller 13 feeds the output signals of two-dimensional light receiving device 12d through a low-pass filter that is not easily affected by noise or taper components, and thus the higher-order components of the output signals are cut off. Thereafter, main controller 13 converts the resultant output signals into derivative data and regards the position of the pixel that corresponds to the output signal of which derivative data is higher than a threshold as the position of the image of corner cube 11C.

Further, main controller 13 regards the position of a pair of images that are disposed in the lateral direction with a distance corresponding to distance L1 (see FIG. 9) as the position of the thumb, regards the position of a pair of images that are disposed in the lateral direction with a distance corresponding to distance L2 (see FIG. 9) as the position of the index finger, regards the position of a pair of images that are disposed in the lateral direction with a distance corresponding to distance L3 (see FIG. 9) as the position of the middle finger, regards the position of a pair of images that are disposed in the lateral direction with a distance corresponding to distance L4 (see FIG. 9) as the position of the ring finger, regards the position of a pair of images that are disposed in the lateral direction with a distance corresponding to distance L5 (see FIG. 9) as the position of the little finger, and determines the position coordinates of each finger end.

If a pair of images corresponding to a specified finger was not detected, then the finger is regarded as not being able to be detected due to some obstacle.

Thereafter, it is determined whether another image of corner cube 11C exists between each of the detected image pairs; if such corner cube image exists as shown in FIG. 26(a), then the finger corresponding thereto is regarded as not being applied with any finger pressure, and if such corner cube image does not exist as shown in FIG. 26(b), then the finger corresponding thereto is regarded as being applied with a finger pressure.

In accordance with the sequence in which, as described above, the procedure of recognizing the position of each finger end and the procedure of recognizing whether a finger pressure exists are executed in this order, misrecognition of finger pressure (i.e., to misrecognize, due to the existence of an obstacle, that a finger pressure exists, despite the fact that there exists no finger pressure) rarely occurs.

Lastly, other processes executed by main controller 13 will be described based on FIG. 27.

Figure 27:
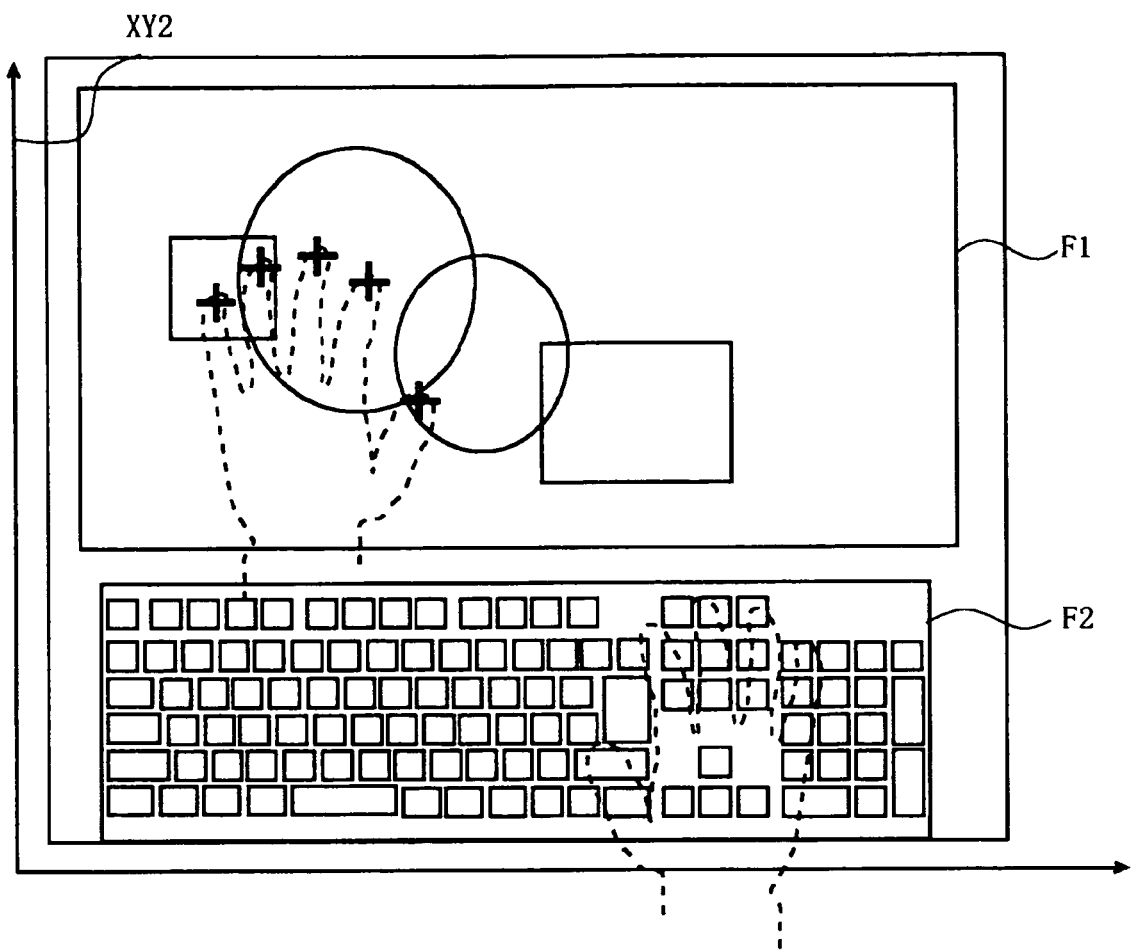
FIG. 27 a drawing illustrating another process executed by main controller 13 (pointer image display).

FIG. 27 shows the keyboard image, computer image, hand contours images, and mouse pointer image on the display image.

As described above, main controller 13 displays the hand contours images on the display image; during this display process, when any one of finger ends moves outside the first field (i.e., the keyboard image), a mouse pointer image (in the case of FIG. 27, a cross image) is displayed in the position of the finger end as shown in FIG. 27. It should be noted that as the pointer image, any of an x mark, an arrow mark, or a rectangle-shaped cursor image may be applied.

Further, main controller 13 generates signals that represent the movement of each finger on the second field (i.e., the computer image) and inputs them to computer 2.

Further, at this time, when a finger pressure is applied to a finger, main controller 13 regards it as a mouse click motion having been performed and inputs a click signal to computer 2.

Thus, the operator can perform pointing actions on the computer image with a feeling similar to that when the operator uses a mouse and can input desired information.

For example, main controller 13 can also carry out the following operation.

That is, when a finger pressure is applied to the right hand's middle finger located on the computer image, main controller 13 regards it as a mouse right-click having been performed and generates a right-click signal to input it to computer 2. In contrast, when a finger pressure is applied to the right hand's index finger located on the computer image, main controller 13 regards it as a mouse left-click having been performed and generates a left-click signal to input it to computer 2.

Further, with respect to one hand only, it has five fingers; thus, by generating various signals in accordance with various combinations of the actions of the five fingers, main controller 13 may input them to computer 2.

(Effect)

As described above, finger clips $11_1$, $11_2$, $11_3$, $11_4$, and $11_5$ that are attached to the right and left hands in the embodiment are constituted by the mechanism portions and the optical system portions and are not provided with any electronic components.

Such finger clips $11_1$, $11_2$, $11_3$, $11_4$, and $11_5$ require neither wiring nor battery. Further, with only those optical system portions and mechanism portions being made light in weight, finger clips $11_1$, $11_2$, $11_3$, $11_4$, and $11_5$ can be made light in weight.

Thus, finger clips $11_1$, $11_2$, $11_3$, $11_4$, and $11_5$ hardly place restraints on the operator's key touch actions, which enables the operator to input information with ease and without getting tired.

Further, with only the optical system portions and mechanism portions being made small-sized, finger clips $11_1$, $11_2$, $11_3$, $11_4$, and $11_5$ can be made small-sized. Thus, the space required for the operator to input information can be reduced.

Further, with finger clips $11_1$, $11_2$, $11_3$, $11_4$, and $11_5$ being made small-sized and light in weight, the operator move them to storage pits $17R_1$, $17R_2$, $17R_3$, $17R_4$, $17R_5$, $17L_1$, $17L_2$, $17L_3$, $17L_4$, and $17L_5$ and detach them from storage pits $17R_1$, $17R_2$, $17R_3$, $17R_4$, $17R_5$, $17L_1$, $17L_2$, $17L_3$, $17L_4$, and $17L_5$ without getting tired.

Further, since, with regard to the optical portions, a piece of reflection element substrate 11B indicates a plurality of pieces of information (in the embodiment, the position of each finger, the kind of each finger, and the existence/nonexistence of finger pressure on each finger), finger clips $11_1$, $11_2$, $11_3$, $11_4$, and $11_5$ can be made simple and small-sized, considering the fact that they indicate a lot of information. Further, since, with regard to the mechanism portions also, they are mainly directed to the mechanism for opening/closing the shutter member, they can be made simple and small-sized.

Therefore, finger clips $11_1$, $11_2$, $11_3$, $11_4$, and $11_5$ can be made small-sized, light in weight, and low in cost.

Further, since in finger clips $11_1$, $11_2$, $11_3$, $11_4$, and $11_5$, ingenuity is exercised with respect to the reflectance distribution (in the embodiment, the disposition of corner cubes 11C) of their respective reflection element substrate 11B, the position of each finger, the kind of each finger, and the existence/nonexistence of finger pressure on each finger are respectively recognized through a simple algorithm.

Further, since in accordance with finger clips $11_1$, $11_2$, $11_3$, $11_4$, and $11_5$, the state in which a finger pressure is applied can be precisely distinguished from the state in which the optical path is blocked by an obstacle, the probability of misinput of information can be decreased.

Further, since finger clips $11_1$, $11_2$, $11_3$, $11_4$, and $11_5$ can be individually attached to and detached from each of the right and left fingers, the finger clips may be attached only to selected fingers in accordance with an intended use. With finger clips 11 being attached only to the fingers requiring them, the freedom of the hands during key touch actions and pointing actions can be improved.

Further, with only the specifications of the optical system portions and mechanism portions being standardized, finger clips $11_1$, $11_2$, $11_3$, $11_4$, and $11_5$ of various designs and various sizes can be prepared and can have used by each operator.

Further, since in accordance with storage pits $17R_1$, $17R_2$, $17R_3$, $17R_4$, $17R_5$, $17L_1$, $17L_2$, $17L_3$, $17L_4$, and $17L_5$, the detaching and storage processes of finger clips $11_1$, $11_2$, $11_3$, $11_4$, and $11_5$ are simultaneously performed, and the attaching and extracting processes of finger clips $11_1$, $11_2$, $11_3$, $11_4$, and $11_5$ are simultaneously performed, the labors associated with those processes are saved, and the probabilities that loss and damage of the finger clips and error of fingers to be properly attached with the finger clips (e.g., an error in which finger clip $11_1$ for the thumb is erroneously attached to the index finger) occur can also be decreased.

Further, since to each of storage pits $17R_1$, $17R_2$, $17R_3$, $17R_4$, $17R_5$, $17L_1$, $17L_2$, $17L_3$, $17L_4$, and $17L_5$ is provided sensor 30 that detects whether the finger clip is stored and since by this, the use conditions of finger clips $11_1$, $11_2$, $11_3$, $11_4$, and $11_5$ are monitored, the operator can, even in case of loss of the finger clips, know the fact immediately. Further, based on the information on the use conditions, pieces of information including the position of each finger, the kind of each finger, and the existence/nonexistence of finger pressure on each finger can also be acquired with high accuracy.

Further, since storage pits $17R_1$, $17R_2$, $17R_3$, $17R_4$, $17R_5$, $17L_1$, $17L_2$, $17L_3$, $17L_4$, and $17L_5$ are provided to display 17 of which position and orientation can be changed at will, the operator can easily attach/detach the finger clips to/from the fingers and can easily store/extract the finger clips in/from the storage pits.

Further, since the keyboard image and the finger end image are both displayed on the display image of display 17, the operator can feel realistically the movement of each of the fingers of the right hand and the movement of each of the fingers of the left hand by only viewing the display image.

In this regard, display 17 displays the display image with a wide field of view angle. In other words, the display image is displayed over the full field of view of the operator. In this state, the operator cannot view the operator's hand regions while viewing the display image. Thus, the fact that the finger end image is displayed is extremely meaningful in smoothly inputting information.

Further, since when the finger end image is displayed, the position coordinates of each of the fingers of the left hand and the position coordinates of each of the fingers of the right hand are respectively, independently of each other, brought into correspondence to the keyboard image, the operator is not required to place the right and left hands on a specified space and can place each of the hands in a desired space. In other words, so long as there exist, somewhere around the operator, two small spaces on which the right and left hands can be respectively placed, the operator can input information.

Furthermore, since finger clips $11_1$, $11_2$, $11_3$, $11_4$, and $11_5$ are able to be made small-sized and light in weight, the positional freedom of the two spaces where the right and left hands are placed is also increased. Thus, in particular, as a means by which a handicapped operator inputs information, those finger clips effectively work.

Further, for an operator who has lost the use of both hands, similar effect can be obtained by introducing a mechanism that is adapted for toes or movable body portions.

(Modification Example of the Layout Pattern of Corner Cubes 11C)

A modification example of the layout pattern of corner cubes 11C will be described.

Since following description may be applied to any of the right and left finger clips $11_1$, $11_2$, $11_3$, $11_4$, and $11_5$, suffixes are omitted below.

While with respect to the finger clips 11 shown in FIGS. 9, 10, and 15, a plurality of corner cubes 11C are disposed with gaps being provided therebetween, they may also be densely disposed with no gap being provided therebetween, as shown in, e.g., FIG. 28(a).

Figure 28:
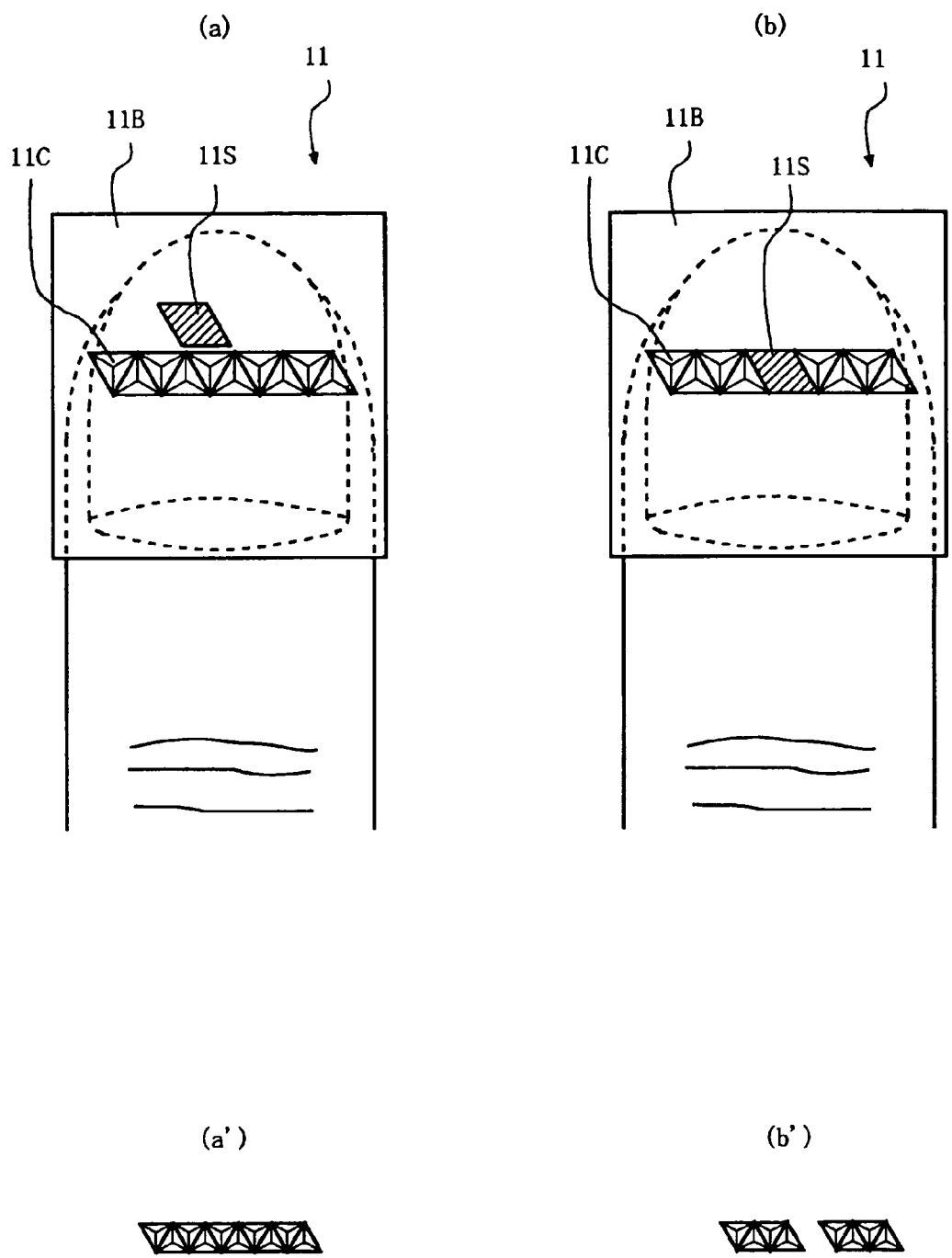
FIG. 28 is a drawing illustrating a modification example of the layout pattern of corner cubes 11C. (a) and (b) are drawings showing reflection element substrate 11B; (a') and (b') are drawings showing images formed on two-dimensional light receiving device 12d; (a) and (a') show a situation in which no finger pressure is applied; (b) and (b') show a situation in which a finger pressure is applied.

In this case, the corner cube group image formed on two-dimensional light receiving device 12d becomes, as shown in FIG. 28(a'), a continuous figure (in the case of FIG. 28(a'), a parallelogram), not a discrete figure.

Since, in this way, by densely disposing a plurality of corner cubes 11C, the outline of the corner cube group image can be made simple, the recognition speed by main controller 13 can be made higher.

Further, the reflection element substrate 11B on which a plurality of corner cubes 11C are densely disposed can be made with ease and with a sufficient degree of accuracy by means of a well-known molding technique used for manufacturing so-called corner cube arrays (corner reflector arrays).

Further, for example, with shutter member 11S being configured such that it shields/releases two corner cubes 11C adjacent to each other as shown in 28(a), the state of reflection element substrate 11B when a finger pressure is applied becomes the state of FIG. 28(b), and the corner cube group image at that time becomes the state of FIG. 28(b') (in the case of FIG. 28(b'), two parallelograms).

Figure 29:
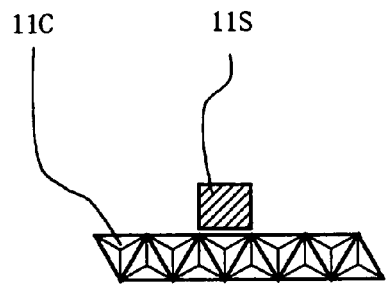
FIG. 29 is a drawing illustrating a modification example of the shape of shutter member 11S.
Figure 29:
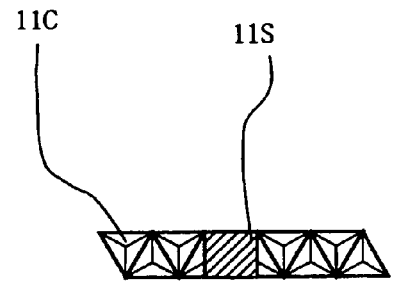
Figure 29:

Further, for example, with shutter member 11S being configured such that it shields/releases the entirety of a certain corner cube 11C and one reflecting surface of each of the two corner cubes 11C directly adjacent to the former corner cube as shown in 29(a), the state of reflection element substrate 11B when a finger pressure is applied becomes the state as shown in FIG. 29(b), and the corner cube group image at that time becomes the state of FIG. 29(b') (in the case of FIG. 29(b'), a trapezoid and a parallelogram).

For corner cube 11C to reflect the illumination light in the reverse and parallel direction, it is required that all of the three reflecting surfaces of corner cube 11C are released; and thus, when at least one of the reflecting surfaces of a certain corner cube 11C is shielded, the corner cube 11C is not imaged on two-dimensional light receiving device 12d. Accordingly, in the case of FIG. 29(b), where the entirety of a certain corner cube 11C and one reflecting surface of each of the two corner cubes 11C directly adjacent to the former corner cube are shielded, the entirety of all the three corner cubes are not imaged on two-dimensional light receiving device 12d, as shown in FIG. 29(b').

(Modification Example of the Shape of Corner Cubes 11C)

A modification example of the shape of corner cubes 11C will be described.

Figure 30:
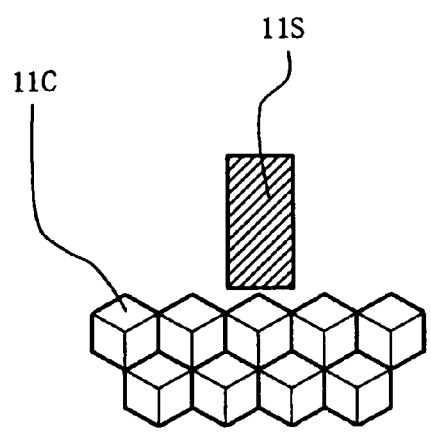
FIG. 30 is a drawing illustrating a modification example of the shape of corner cubes 11C.
Figure 30:
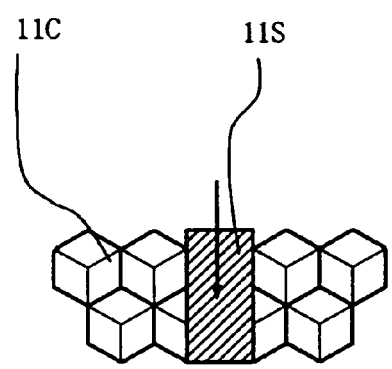
Figure 30:
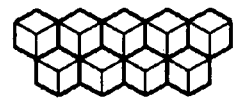
Figure 30:
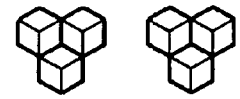

While in each of the above drawings, the outline of the three reflecting surfaces of corner cube 11C has a shape of a triangle, it may also have a shape of a quadrangle, as shown in FIG. 30. When viewed from the direction of the midline of the reflecting surfaces, this corner cube 11C looks like a hexagon.

Since the space surrounded by the reflecting surfaces of this corner cube 11C is deep, the light incident angle range within which this corner cube 11C can reflect the illumination light in the reverse and parallel direction is a little wider.

Further, the reflection element substrate 11B on which such corner cubes 11C are densely disposed can be made with ease and with a sufficient degree of accuracy by means of a well-known molding technique used for manufacturing so-called corner cube arrays (corner reflector arrays).

By the way, FIG. 30(a) shows an example in which a plurality of such corner cubes 11C are formed densely and in two lines.

FIG. 30(a') shows the corner cube group image of such corner cubes 11C; FIG. 30(b) shows the state (an example state) of the corner cubes 11C when a finger pressure is applied; FIG. 30(b') shows the state (an example state) of the corner cube group image.

It is to be noted that it may also be configured such that instead of corner cubes, with, for example, a reflecting sheet having retroreflectivity being formed in a predetermined pattern and with a portion thereof being shielded, the image on two-dimensional light receiving device 12d is deformed.

(Modification Example of the Arrangement Orientation of Corner Cubes 11C)

A modification example of the arrangement orientation of corner cubes 11C will be described.

While the above-described finger clip 11 is provided with only one kind of corner cubes 11C, all of which have the same orientation, multiple kinds of corner cubes 11C, each kind of which has an orientation different from that of the other kinds, may be provided, as shown in FIG. 31(a). In the following, a case where two kinds of corner cubes (first corner cubes 11C-1 and second corner cubes 11C-2), each kind of which has an orientation different from that of the other kind, are provided will be described.

For example, finger clip 11 is configured in the following manner.

As shown in FIG. 31(a), reflection element substrate 11B is made to have a form of two pieces and is constituted by first substrate 11B-1 and second substrate 11B-2. The angle θA made by the normal of first substrate 11B-1 and second substrate 11B-2 is set to be a little smaller than 90 degrees. This reflection element substrate 11B is attached to the finger in a state that one substrate (hereinafter, this substrate being assumed to be first substrate 11B-1) lies along the nail surface.

On first substrate 11B-1 are provided a plurality of corner cubes 11C in an orientation state in which the midline of the reflecting surfaces of each of the corner cubes is aligned with the direction of normal of first substrate 11B-1. These corner cubes constitute first corner cubes 11C-1.

On second substrate 11B-2 are provided a plurality of corner cubes 11C that are the same as those provided on first substrate 11B-1 in an orientation state in which the midline of the reflecting surfaces of each of the corner cubes is aligned with the direction of normal of second substrate 11B-2. These corner cubes constitute second corner cubes 11C-2.

Accordingly, the angle made by the midline of the reflecting surfaces of first corner cube 11C-1 and the midline of the reflecting surfaces of second corner cube 11C-2 (the difference between the orientation angles of the former and latter corner cube) is equal to θA (an angle that is a little smaller than 90 degrees).

Further, the layout pattern of first corner cubes 11C-1 on first substrate 11B-1 is the same as that of second corner cubes 11C-2 on second substrate 11B-2. When viewed from the front, these corner cubes look like as seen in FIG. 31(a), for example.

Further, to first substrate 11B-1 is provided shutter member 11S-1 that shields/releases a portion of the layout region of first corner cubes 11C-1 in response to a finger pressure, and to second substrate 11B-2 is provided shutter member 11S-2 that shields/releases a portion of the layout region of first corner cubes 11C-2 in response to a finger pressure. The shield pattern by shutter member 11S-1 and the shield pattern by shutter member 11S-2 are the same.

Next, the effect produced by this finger clip 11 will be described.

Here, for the sake of simplicity, a case in which the illumination light is incident substantially perpendicularly to the back of the operator's hand will be considered.

First, when the finger end is not bent on purpose as shown in FIG. 32(a), the illumination light is incident on the surface of first substrate 11B-1 at an incident angle near to an incident angle of 0 degree and is incident on the surface of second substrate 11B-2 at an incident angle near to an incident angle of 45 degrees.

Figure 32:
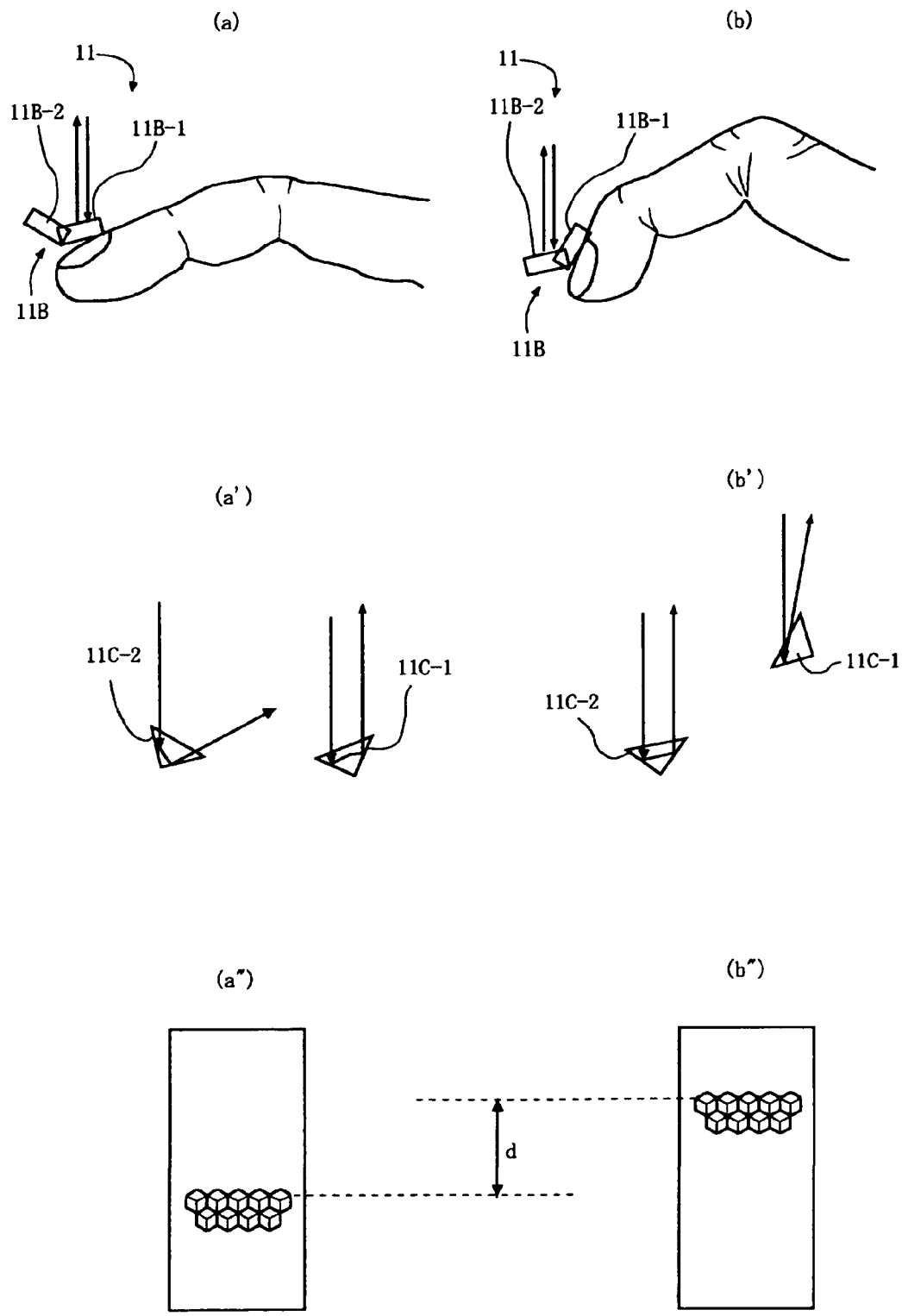
FIG. 32 is a drawing illustrating an effect produced by both of using first corner cube 11C-1 and second corner cube 11C-2 that have different orientations.

In this condition, while second corner cubes 11C-2 may not be able to reflect the illumination light in the reverse and parallel direction as shown in the left side space in FIG. 32(a'), first corner cubes 11C-1 can assuredly reflect the illumination light in the reverse and parallel direction as shown in the right side space in FIG. 32(a').

In this situation, on two-dimensional light receiving device 12d is assuredly formed a corner cube image constituted by a plurality of first corner cubes 11C-1 as shown in FIG. 32(a").

On the other hand, when the finger end is bent as shown in FIG. 32(b), the illumination light is incident on the surface of first substrate 11B-1 at an incident angle near to an incident angle of 45 degrees and is incident on the surface of second substrate 11B-2 at an incident angle near to an incident angle of 0 degree.

Thus, while first corner cubes 11C-1 may not be able to reflect the illumination light in the reverse and parallel direction as shown in the right side space in FIG. 32(b'), second corner cubes 11C-2 can assuredly reflect the illumination light in the reverse and parallel direction as shown in the left side space in FIG. 32(b').

In this situation, on two-dimensional light receiving device 12d is assuredly formed a corner cube image constituted by a plurality of second corner cubes 11C-2 as shown in FIG. 32(b").

Thus, in accordance with this finger clip 11, irrespective of the bending actions of the finger end, a corner cube group image is assuredly formed on finger end detection device 12.

Further, in both of the case where the finger end is bent and the case where the finger end is not bent, the corner cube group image changes in response to a finger pressure in a similar manner. Thus, irrespective of the bending actions of the finger end, the finger clip 11 can assuredly make main controller 13 recognize key touch actions.

By the way, between the case in which the finger end is bent and the case in which the finger end is not bent, the positions where the images are formed are a little misaligned as shown in FIGS. 32($a''$) and 32($b''$); however, since the misalignment amount d is much smaller than the size of the key top of one key, the possibility that main controller 13 misrecognizes key touch actions (the possibility that it recognizes that another key is pressed) is low so long as the finger end is properly placed on the key (virtual key) intended by the operator.

Next, detailed description on the angle θA will be made.

The incident angle range of an incident light within which one corner cube 11C can reflect the light in the reverse and parallel direction is from 0 to about 45 degrees. Thus, by disposing on the incidence surface of the light two kinds of first corner cube 11C-1 and second corner cube 11C-2, of which relative orientations differ by 90 degrees, it can be configured such that one corner cube (first corner cube 11C-1 or second corner cube 11C-2) reflects lights of incident angle range of from 0 to about 45 degrees in the reverse and parallel direction and the other corner cube (first corner cube 11C-1 or second corner cube 11C-2) reflects lights of incident angle range of from 45 to about 90 degrees in the reverse and parallel direction.

However, it is preferable that the former incident angle range and the latter incident angle range overlap with each other so that even when the illumination light has an incident angle of just the boundary angle between the two ranges (i.e., 45 degrees), the intensity of the light reflected in the reverse and parallel direction does not become zero. In view of this, it is best that the angle θA is set not to be 90 degrees but to an angle that is a little smaller than 90 degrees.

Figure 31:
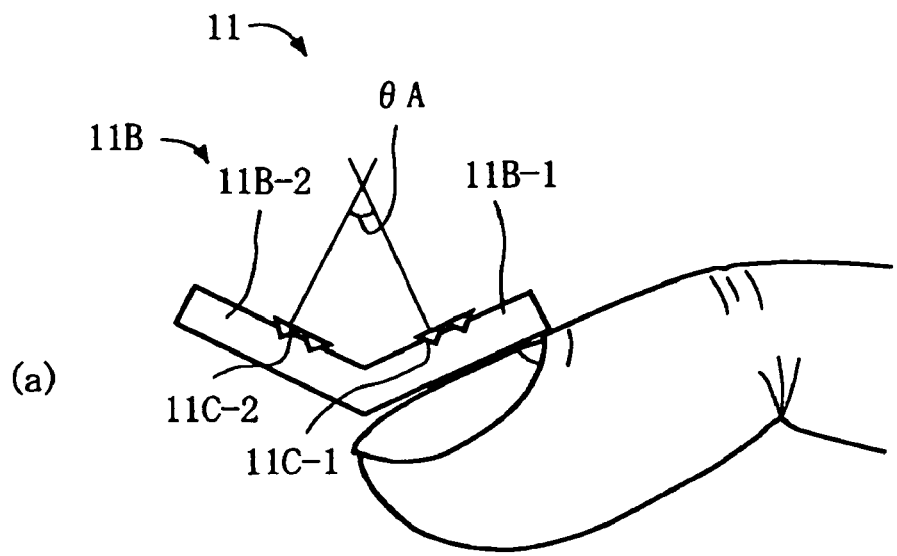
FIG. 31 is a drawing illustrating a modification example of the arrangement orientation of corner cubes 11C.
Figure 31:
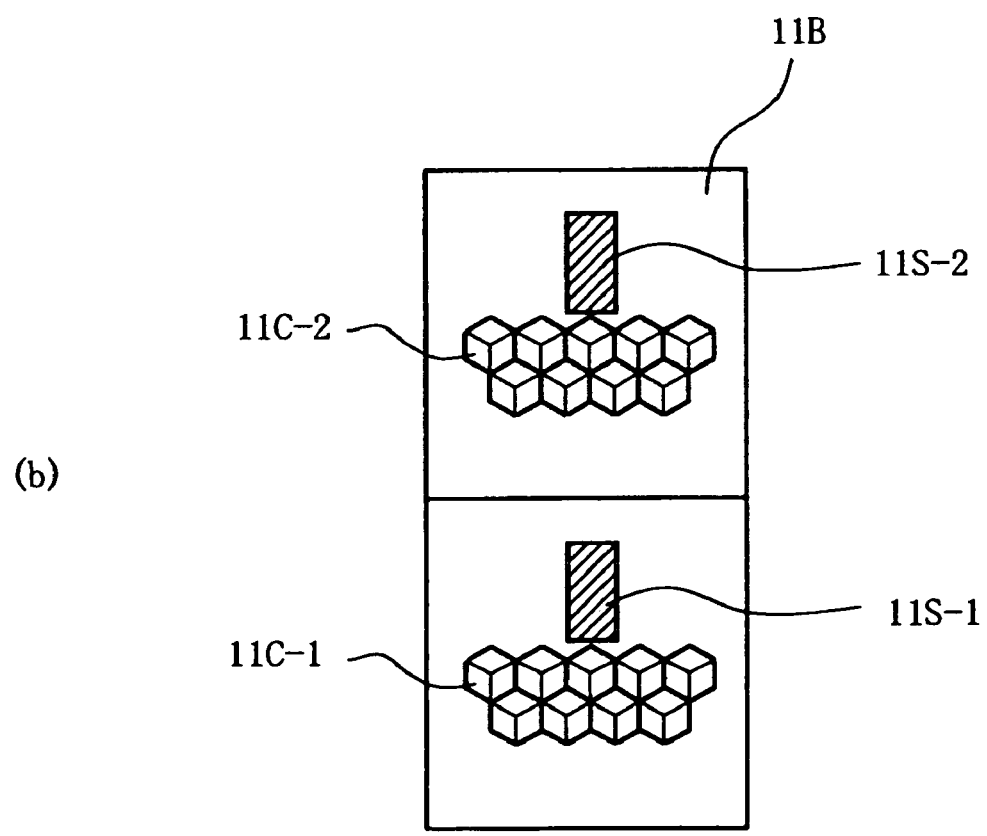
Figure 33:
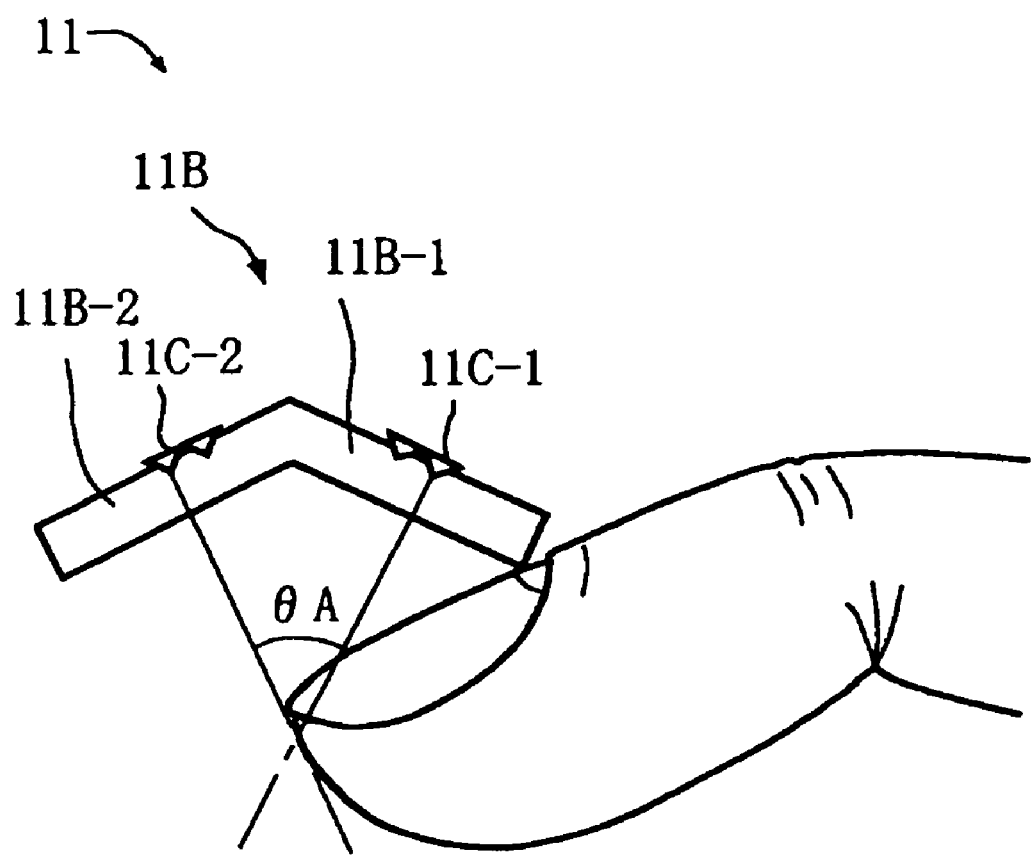
FIG. 33 is a drawing showing an example in which reflection element substrate 11B is made inverted V-shaped.

It is to be noted that while in FIGS. 31 and 32, the example in which reflection element substrate 11B is V-shaped, it may be inverted V-shaped as shown in FIG. 33.

Figure 34:
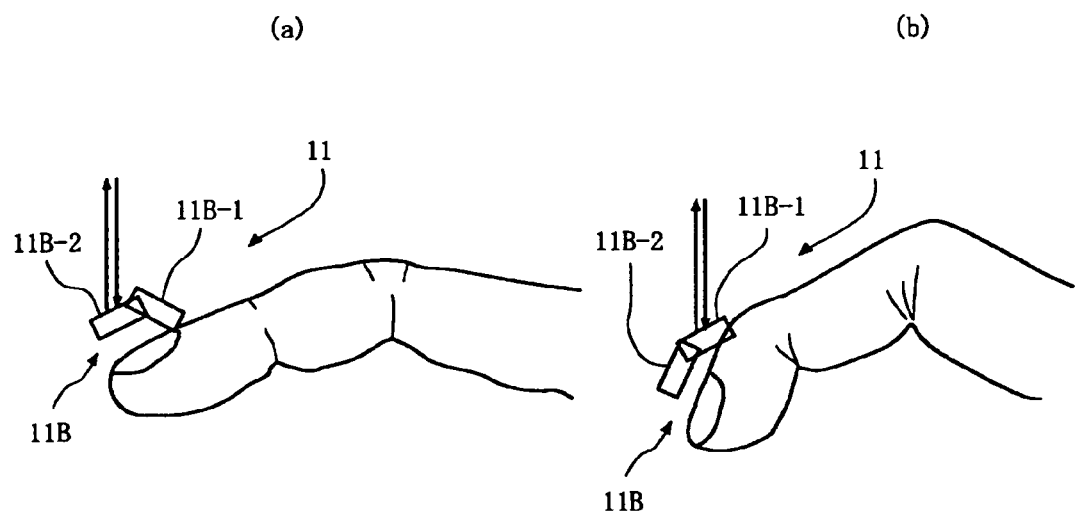
FIG. 34 is a drawing showing the effect of the example in which reflection element substrate 11B is made inverted V-shaped.
Figure 34:
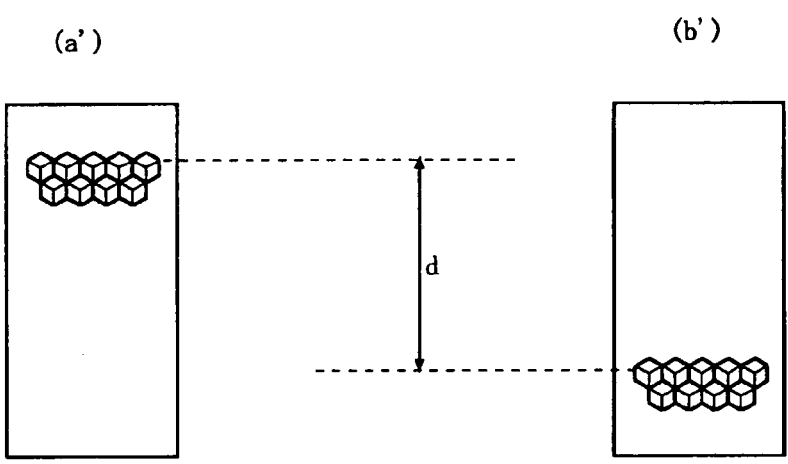

In this case, while when the finger end is not bent (see FIG. 34($a$)), only the corner cube image constituted by second corner cubes 11C-2 is formed (see FIG. 34($a'$)), and when the finger end is bent (see FIG. 34($b$)), only the corner cube image constituted by first corner cubes 11C-1 is formed (see FIG. 34($b'$)), the same effect as the V-shaped example (see FIGS. 31 and 32) can be obtained.

However, since, in the case of V-shaped example (see FIGS. 31 and 32), the image-formed-position misalignment amount d due to the bending actions of the finger end is smaller compared with that in the case of the inverted V-shaped example (see FIGS. 33 and 34), the misrecognition probability of main controller 13 can be made lower in the case of V-shaped example.

Figure 35:
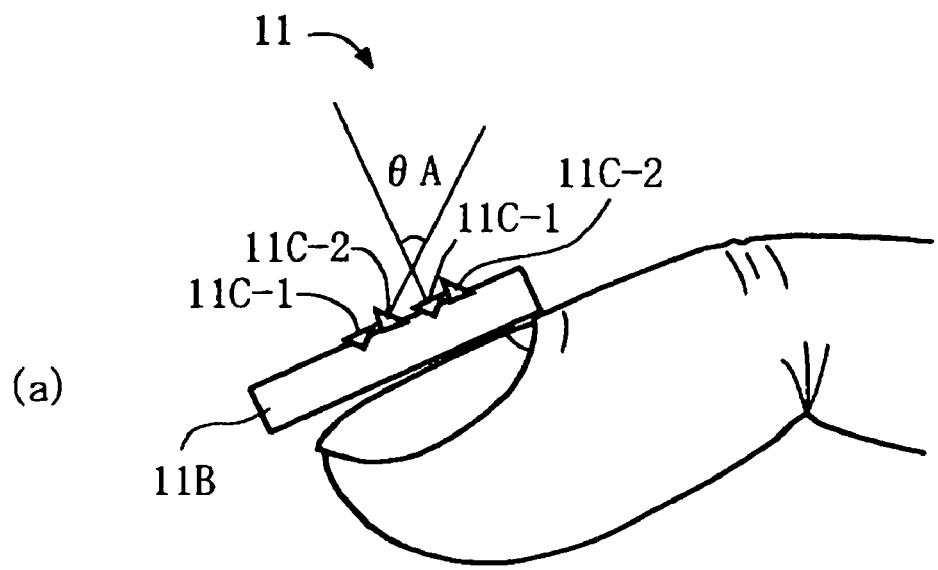
FIG. 35 is a drawing illustrating an example in which on a single reflection element substrates 11B are provided both of first corner cube 11C-1 and second corner cube 11C-2 whose orientations are different from each other.
Figure 35:
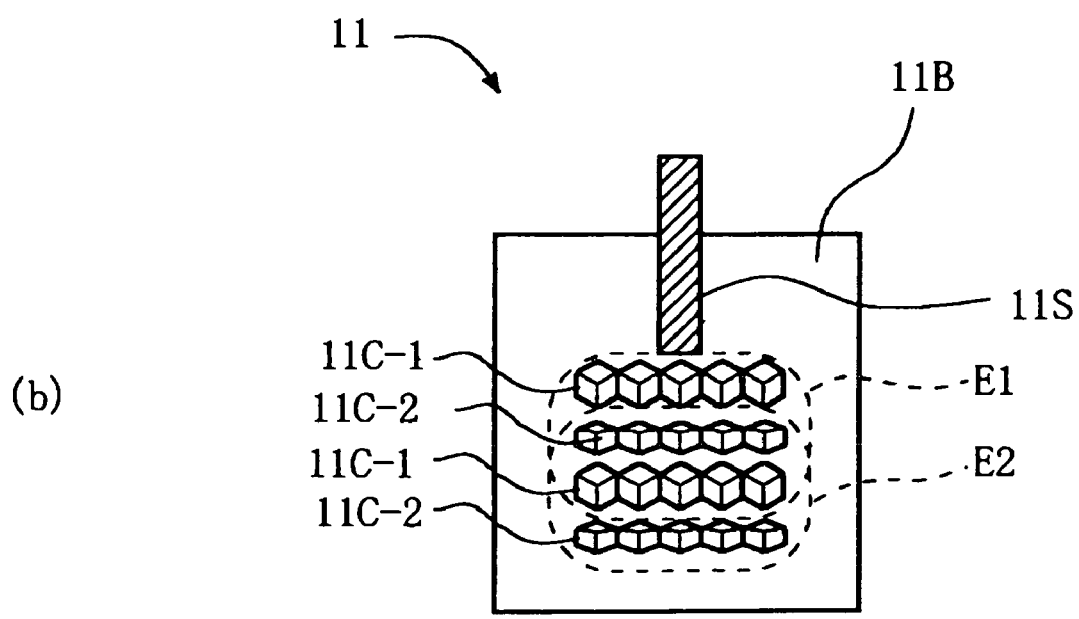

Further, while in FIGS. 31-34, in order to provide first corner cubes 11C-1 and second corner cubes 11C-2, each of which has an orientation different from that of the other, reflection element substrate 11B is made to have a form of two pieces, it may also be configured such that both of first corner cubes 11C-1 and second corner cubes 11C-2 are provided on a piece of reflection element substrate 11B as shown in FIG. 35($a$).

In this case also, the layout pattern of multiple first corner cubes 11C-1 and the layout pattern of multiple second corner cubes 11C-2 are set to be the same as shown, e.g., in FIG. 35($b$). Further, the shield pattern of the multiple first corner cubes 11C-1 by shutter member 11S and the shield pattern of the multiple second corner cubes 11C-2 by shutter member 11S are set to be the same.

In this regard, in the case where both of first corner cubes 11C-1 and second corner cubes 11C-2 are provided on a piece of reflection element substrate 11B, the shielding/releasing can be realized by means of a single shutter member 11S as shown in FIG. 35($b$).

By the way, when, as shown in FIG. 35($b$), the region E1 where first corner cubes 11C-1 are formed and the region E2 where second corner cubes 11C-2 are formed overlap with each other, the image-formed-position misalignment amount d due to the bending actions of the finger end becomes very small, and thus the misrecognition probability of main controller 13 can be made extremely low.

It is to be noted that it is preferable that first corner cubes 11C-1 and second corner cubes 11C-2 that are adjacent to each other are disposed with a sufficient distance being provided therebetween so that the illumination lights that are respectively incident on each of the corner cubes are not mutually blocked by the corner cubes.

By the way, the above-described finger clip 11 may either be applied to all of the right and left finger clips $11_1$, $11_2$, $11_3$, $11_4$, and $11_5$ or be applied to only a part of those finger clips. In this regard, the bending motions of the thumb occur in a horizontal plane parallel to the back of the hand; thus even if the finger clips $11_1$ for the thumb is provided with corner cubes 11C of a single kind of orientation, the possibility that the finger clips $11_1$ comes to be unable to reflect the illumination light in the reverse direction is low. Thus, the above-described finger clip 11 is particularly suitable for the finger clips $11_2$, $11_3$, $11_4$, and $11_5$ for the other fingers than the thumb.

(Others)

It is to be noted that while finger end detection device 12 captures in a lump the entirety of the right and left hand regions, a finger end detection device that captures only the left hand region and a finger end detection device that captures only the right hand region are used, instead of the finger end detection device 12.

Further, while it is preferable that as the light source of finger end detection device 12, monochromatic light is used, white light or invisible light (e.g., infrared light) may also be used.

Further, in the case of using white light, it may be configured, for example, such that different color filters are respectively attached to each of the finger clips $11_1$, $11_2$, $11_3$, $11_4$, and $11_5$ for each of the right and left fingers, and a color light receiving device is used as finger end detection device 12. Since, by doing so, the images of corner cubes 11C are detected with different colors on finger-by-finger basis, the recognition of the kind of finger can be facilitated.

Further, while for finger clip 11, as a biasing means and as a movement transmission means, springs and a combination of a connecting member and a pulley (see, e.g., FIG. 16) are respectively used, a means, e.g., a leaf spring, that is used together with those parts may also be used. Further, as the biasing means, a non-contact type biasing means, e.g., a permanent magnet may also be used. Further, as the movement transmission means, a lever, a pulley, or gears may also be used.

Further, while finger clip 11 is configured such that drive base $11a_4$ rotationally moves with reference to rubber portions 11c, it may also be configured such that drive base $11a_4$ shifts or slides in the lateral direction.

Further, while finger clip 11 is configured such that when no finger pressure is applied, shutter member 11S releases a specified corner cube 11C, and when a finger pressure is applied, shutter member 11S shields the corner cube 11C, it may also be configured such that when no finger pressure is applied, shutter member 11S shields a specified corner cube 11C, and when a finger pressure is applied, shutter member 11S releases the corner cube 11C.

Further, while to finger clip 11 is provided, as a change mechanism for changing the reflectance distribution of reflection element substrate 11B, a mechanism that shields/releases a specified corner cube 11C is provided, a mechanism that changes the positional relationship between a plurality of corner cubes 11C or a mechanism that changes the intensity of reflected light from corner cube 11C may also be provided.

Further, main controller 13 may change, in accordance with the operator's instruction, the ratio of magnification adjustment between coordinate system XY1 on the acquired image and coordinate system XY2 on the display image so that the operator can adjust the relationship between the actual finger size and the finger size on the display image. By doing so, the operator can change the stroke of the actual finger in accordance with the operator's own taste.

For example, since by adjusting such that the finger size on the keyboard image becomes larger, the stroke of the actual finger can be made smaller, an increased space-saving effect can also be obtained.

Further, while, in the above-described description, main controller 13 sets the timing at which transition from key touch actions to pointing action to be the time point at which a finger end moves the first field (i.e., the keyboard image), main controller 13 may also set the timing of transition to be a time point at which a predetermined signal (e.g., a time point at which a plurality of keys are simultaneously pressed) is issued from the operator.

From that time point on, the above-described transforming formulas (or look-up tables) are replaced by new ones (e.g., such ones by which the position coordinates of the right hand's index finger on the acquired image at that time point are transformed into the position coordinates of the computer image center on the display image). Since by doing so, the operator can make transition between key touch actions and pointing actions without moving the hands, an increased space-saving effect can be produced.

Further, by taking advantage of the fact that separate transforming formulas (or look-up tables) are respectively applied to each of the right and left hands, main controller 13 may operates so that each of the right and left hands can independently perform separate actions (for example, with key touch actions being performed by the right hand and with pointing actions being performed by the left hand).

Further, while, in the above-described description, main controller 13 changes the color of a key in order to notify the operator that a finger pressure is applied, main controller 13 may make display 17 generate a sound. Also, main controller 13 may draw a thick box enclosing the key.

Further, a part of or the entirety of the processes executed by main controller 13 may be executed by circuit 12i in finger end detection device 12.

Further, a part of or the entirety of the processes executed by main controller 13 may be executed by computer 2 or by a separate computer.

Further, the programs relating to a part of or the entirety of the processes executed by the computer may be ones that have been written beforehand in a ROM in the computer or ones that have been read into a hard disk of the computer from a transportable recording medium. Further, the programs may also be ones that have been downloaded into a hard disk of the computer from a separate computer via a communication network such as the Internet.

Further, by configuring finger end detection device 12 to be switchable to a video camera, the surrounding setting can also be displayed on display 17 at a timing desired by the operator.

For example, by setting the video camera lens to be a wide lens or a fish-eye lens and, at the same time, by connecting a DVD player, as general-purpose external device 2, to the system to display the image from the video camera in a small window in the end area of the image screen of display 17, the operator can see a film while monitoring the surrounding setting.

Further, by setting the video camera lens to be a normal lens (e.g., a zoom lens) and, at the same time, by capturing the operator's hand regions to display the output signals from the video camera on the image screen of display 17, the operator can, while turning leaves of a book placed in the hand regions, read the book with the head being directed to a direction to the operator's taste. Thus, the operator can also read a book in a state of lying on the back without holding up the book.

INDUSTRIAL APPLICABILITY

As described above, the face following type image display system of the embodiment plays a role of a full-scale information inputting device that is superior to wearable displays and wearable computers.

Thus, the development of leading-edge softwares such as new sense game softwares, DVDs with a wide a large image size, video tapes wide a large image size, virtual reality systems, all of which effectively utilize the display performance (here, a wide field of view angle) is prospectively facilitated.

Further, besides leading-edge systems, with display system-being combined with general-purpose devices such as existing desktop computers or television sets and with furniture such as a chair in a movie theater, a chair in an airplane, or a chair for relaxation, the operator will be freed from a sense of discomfort.

Further, with the display system being combined with a bed (e.g., a nursing bed), a person in a state of lying on the bed can input information with ease and can bring out his or her communication skills.

In addition, as the application area of the face following type image display system of the embodiment, the markets of high confidentiality information display systems for individual use, remote controllable large screen displays, digital newspaper reception systems with a wide screen, educational materials, display games in an amusement facility, etc. can be listed.

The invention claimed is;

1. An information inputting tool comprising,
a reflection portion provided with a single or a plurality of reflection members having retroreflectivity,
an attaching gadget that attaches said reflection portion to a finger of an operator, and
a change mechanism that changes the reflectance distribution of said reflection portion in accordance with a finger pressure applied to the finger end of said finger.

2. An information inputting tool according to claim 1, characterized in that said change mechanism shields/releases at least a portion of said reflection portion.

3. An information inputting tool according to claim 2, comprising a plurality of reflection members having retroreflectivity are provided side by side on said reflection portion, and said change mechanism shields/releases at least one reflection member of said plurality of reflection members having retroreflectivity.

4. An information inputting tool according to claim 3, comprising a plurality of, three or more reflection members having retroreflectivity are provided side by side on said reflection portion, and said change mechanism shields/releases at least one reflection member thereof having retroreflectivity that is located between two or more reflection members having retroreflectivity of said plurality of reflection members.

5. An information inputting tool according to any one of claims 1-4, characterized in that at least one of the reflection surfaces constituting said reflection member is a reflection type diffractive optical surface that transforms, relative to the wavefront shape of the incident light, the wavefront shape of the reflection light.

6. An information inputting tool according to any one of claims 1-4, characterized in that said reflection member also functions as an identification mark that indicates the kind of said finger.

7. An information inputting tool according to any one of claims 1-4, characterized in that said reflection portion is provided with at least two kinds of corner-shaped reflection surfaces whose postures are different from each other.

8. An information inputting tool according to claim 7, characterized in that said reflection portion is provided with said at least two kinds of corner-shaped reflection surfaces having orientation angle difference θ that satisfies 0°<90°.

9. An information inputting tool according to any one of claims 1-4, characterized in that said attaching gadget has a stopper mechanism that fixes said reflection portion to said finger of the operator and a release mechanism that releases said reflection portion from said finger of the operator.

10. A storage device comprising, a storage pit that stores an information inputting tool according to claim 9, means for driving said stopper mechanism of said information inputting tool, and means for driving said release mechanism of said information inputting tool.

11. A storage device comprising, storage pits that individually store a plurality of information inputting tools according to any one of claims 1-4 that are individually attached to each of a plurality of fingers of an operator and detection means that individually detects whether each of said plurality of information inputting tools is stored.

12. A storage device according to claim 10, characterized in that it is provided to a face following type display.

13. An information inputting device comprising, an illumination optical system that illuminates with an illumination light the hand region of an operator to which an information inputting tool according to claims 1-4 is attached, an optical system that leads from said hand region of the operator the reflection light of said illumination light and forms an image of said reflection portion in a predetermined position, and a two-dimensional light receiving device that images said image in the predetermined position.

14. An information processing equipment comprising, a control portion that is applied to an information inputting device according to claim 13 and that recognizes, based on the position and the luminance distribution, of said image of said reflection portion, on said image acquired by said two-dimensional light receiving device, the finger end actions of said operator with the coordinates on said two-dimensional light receiving device.

15. An information processing equipment according to claim 14, characterized in that said control portion recognizes, along with said finger end actions, the kind of said finger.

16. An information processing equipment according to claim 14, characterized in that said control portion, at least, performs said recognition of said finger end actions by, after recognizing the position of said finger end, recognizing whether there is said finger pressure.

17. An information processing equipment according to claim 14, characterized in that said control portion displays on an outside or inside display a keyboard image indicating a key top layout of a keyboard device and, at the same time, while coordinate-transforming the position of said finger end on said two-dimensional light receiving device into the coordinates on said display, displays in real time on said display a finger end image indicating said finger end actions, adopts a coordinate transformation that transforms the position of said finger end into reference coordinates on said display in a time period that ends when a predetermined signal is given from said operator, and after said predetermined signal is given from said operator, adopts a coordinate transformation that transforms the position of said finger end at the timing when said signal is given into said reference coordinates on said display.

18. An information processing equipment according to claim 17, characterized in that said control portion accepts, via said information inputting device, said predetermined signal from said operator.

19. An information processing equipment according to claim 17, characterized in that said control portion displays a key, among said keyboard image, at least the position of which overlaps with said finger end image with a color different from that of the other keys.

20. An information processing equipment according to claim 19, characterized in that said control portion changes the display color of said key at a timing when a finger pressure is applied to said finger end.

21. An information processing equipment according to claim 17, characterized in that in the display area displayed by said display is secured, in addition to a special field on which said keyboard image is to be displayed, a general field on which an image and/or a letter inputted from the outside are to be displayed, and said control portion displays, when said finger end image is displayed on said general field, a pointer image of a pointing device at the position of the finger end, in addition to or instead of the finger end image.

22. An information processing equipment according to claim 17, characterized in that said control portion, when it recognizes said finger end actions of a plurality of finger ends, adopts for the coordinate transformation of the position of each finger end a coordinate transformation that transforms the position of a specified finger end into reference coordinates on said display in a time period that ends when a predetermined signal is given from said operator and after said predetermined signal is given from said operator, adopts for the coordinate transformation of the position of each finger end a coordinate transformation by which the position of said specified finger end at the timing when said signal is given is transformed into said reference coordinates on said display.

23. An information processing equipment according to claim 17, characterized in that said control portion, when it recognizes said finger end actions of the right and left hands, performs said coordinate transformations independently with respect to the right and left hands.

24. An information processing equipment comprising a control portion, said control portion being applied to an information inputting device that acquires information of the right and left finger actions of an operator and processes the information, wherein said control portion displays on an outside or inside display a keyboard image indicating a key top layout of a keyboard device and, at the same time, while coordinate-transforming the positions of each finger end on the right and left hand regions of said operator into the coordinates on said display, displays in real time on said display finger end images indicating said finger end actions, adopts, in a time period that ends when a predetermined signal is given from said operator, a coordinate transformation that transforms the position of a specified left finger end into left reference coordinates on said display for the coordinate transformation of the position of each of said left finger ends and adopts, at the same time, a coordinate transformation that transforms the position of a specified right finger end into right reference coordinates on said display for the coordinate transformation of the position of each of said right finger ends, and after said predetermined signal is given from said operator, adopts for the coordinate transformation of the position of each of said left finger ends a coordinate transformation by which the position of said specified left finger end at the timing when said signal is given is transformed into said left reference coordinates on said display and adopts, at the same time, for the coordinate transformation of the position of each of said right finger ends a coordinate transformation by which the position of said specified right finger end at the timing when said signal is given is transformed into said right reference coordinates on said display.

25. A storage device comprising, storage pits that individually store a plurality of information inputting tools that are individually attached to a plurality of fingers of an operator and a detection means that individually detects whether each of said plurality of information inputting tools is stored.

26. A storage device according to claim 25, further comprising means that attaches said information inputting devices to said fingers of the operator and a means that detaches said information inputting devices from said fingers of the operator.

27. A storage device according to claim 25 or 26, characterized in that it is provided to a face following type display.

28. A storage device according to claim 11, characterized in that it is provided to a face following type display.

29. An information processing equipment according to claim 15, characterized in that said control portion, at least, performs said recognition of said finger end actions by, after recognizing the position of said finger end, recognizing whether there is said finger pressure.

* * * * *